United States Patent
Forstall et al.

(10) Patent No.: US 7,954,064 B2
(45) Date of Patent: May 31, 2011

(54) MULTIPLE DASHBOARDS

(75) Inventors: Scott Forstall, Mountain View, CA (US); Imran A. Chaudhri, San Francisco, CA (US); John O. Louch, San Luis Obispo, CA (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 11/346,603

(22) Filed: Feb. 1, 2006

(65) Prior Publication Data
US 2007/0101297 A1    May 3, 2007

Related U.S. Application Data

(60) Provisional application No. 60/737,942, filed on Nov. 18, 2005.

(51) Int. Cl.
*G06F 3/048* (2006.01)
(52) U.S. Cl. .................. 715/779; 715/765; 715/778
(58) Field of Classification Search .................. 715/779
See application file for complete search history.

(56) References Cited

U.S. PATENT DOCUMENTS

| | | | |
|---|---|---|---|
| 4,752,893 A | 6/1988 | Guttag et al. | |
| 5,168,441 A | 12/1992 | Ornaheim et al. | |
| 5,289,574 A | 2/1994 | Sawyer | |
| 5,297,250 A | 3/1994 | Leroy et al. | |
| 5,351,995 A | 10/1994 | Booker | |
| 5,357,603 A | 10/1994 | Parker | |
| 5,379,057 A | 1/1995 | Clough et al. | |
| 5,388,201 A | 2/1995 | Hourvitz et al. | |
| 5,416,890 A | 5/1995 | Beretta | |
| 5,481,665 A | 1/1996 | Okada et al. | |
| 5,490,246 A | 2/1996 | Brotsky et al. | |
| 5,522,022 A | 5/1996 | Rao et al. | |
| 5,537,630 A | 7/1996 | Berry et al. | |
| 5,564,002 A * | 10/1996 | Brown | 715/778 |
| 5,564,022 A | 10/1996 | Debnath et al. | |
| 5,588,098 A | 12/1996 | Chen et al. | |
| 5,602,997 A | 2/1997 | Carpenter et al. | |
| 5,638,501 A | 6/1997 | Gough et al. | |
| 5,644,737 A | 7/1997 | Tuniman et al. | |
| 5,644,739 A | 7/1997 | Moursund | |
| 5,651,107 A | 7/1997 | Frank et al. | |

(Continued)

FOREIGN PATENT DOCUMENTS

DE         102 42 378         3/2004

(Continued)

OTHER PUBLICATIONS

VMWare, "VMWare Workstation User's Manual," 2002, pp. 12-13.*

(Continued)

*Primary Examiner* — William L Bashore
*Assistant Examiner* — Daniel Um
(74) *Attorney, Agent, or Firm* — Fish & Richardson P.C.

(57) ABSTRACT

Systems, methods, computer-readable mediums, user interfaces and other implementations are disclosed for organizing, managing and presenting widgets in display areas associated with multiple dashboard environments. In some implementations, a first display area associated with a first dashboard environment is configured for displaying at least one widget from a first set of widgets. A second display area associated with a second dashboard environment is configured for displaying at least one widget from a second set of widgets.

18 Claims, 24 Drawing Sheets

U.S. PATENT DOCUMENTS

| | | |
|---|---|---|
| 5,657,049 A | 8/1997 | Ludolph et al. |
| 5,659,693 A | 8/1997 | Hansen et al. |
| 5,659,694 A | 8/1997 | Bibayan |
| 5,666,416 A | 9/1997 | Micali |
| 5,671,343 A | 9/1997 | Kondo et al. |
| 5,675,362 A | 10/1997 | Clough et al. |
| 5,689,664 A | 11/1997 | Narayanan et al. |
| 5,708,764 A | 1/1998 | Borrel et al. |
| 5,710,884 A | 1/1998 | Dedrick |
| 5,721,848 A | 2/1998 | Joseph |
| 5,727,135 A | 3/1998 | Webb et al. |
| 5,731,819 A | 3/1998 | Gagne et al. |
| 5,742,285 A | 4/1998 | Ueda |
| 5,754,174 A | 5/1998 | Carpenter et al. |
| 5,760,773 A | 6/1998 | Berman et al. |
| 5,764,229 A | 6/1998 | Bennett |
| 5,764,238 A | 6/1998 | Lum et al. |
| 5,790,120 A | 8/1998 | Lozares et al. |
| 5,793,376 A | 8/1998 | Tanaka et al. |
| 5,796,402 A | 8/1998 | Ellison-Taylor |
| 5,801,703 A | 9/1998 | Bowden et al. |
| 5,809,230 A * | 9/1998 | Pereira ............................ 726/35 |
| 5,835,692 A | 11/1998 | Cragun et al. |
| 5,835,693 A | 11/1998 | Lynch et al. |
| 5,838,316 A | 11/1998 | Arruza |
| 5,870,734 A | 2/1999 | Kao |
| 5,877,741 A | 3/1999 | Chee et al. |
| 5,877,762 A | 3/1999 | Young et al. |
| 5,878,219 A | 3/1999 | Vance et al. |
| 5,883,639 A | 3/1999 | Walton et al. |
| 5,900,876 A | 5/1999 | Yagita et al. |
| 5,903,896 A | 5/1999 | Waldman et al. |
| 5,917,436 A | 6/1999 | Endo et al. |
| 5,920,659 A | 7/1999 | Iverson et al. |
| 5,929,852 A | 7/1999 | Fisher et al. |
| 5,933,148 A | 8/1999 | Oka et al. |
| 5,949,409 A | 9/1999 | Tanaka et al. |
| 5,963,191 A | 10/1999 | Jaaskelainen, Jr. |
| 5,978,579 A | 11/1999 | Buxton et al. |
| 5,999,948 A | 12/1999 | Nelson et al. |
| 6,005,568 A | 12/1999 | Simonoff et al. |
| 6,006,231 A | 12/1999 | Popa |
| 6,011,562 A | 1/2000 | Gagne et al. |
| 6,031,937 A | 2/2000 | Graffagnino |
| 6,045,446 A | 4/2000 | Ohshima |
| 6,061,695 A | 5/2000 | Slivka et al. |
| 6,075,543 A | 6/2000 | Akeley |
| 6,128,010 A | 10/2000 | Baxter et al. |
| 6,133,915 A | 10/2000 | Arcuri et al. |
| 6,144,381 A | 11/2000 | Lection et al. |
| 6,154,601 A | 11/2000 | Yaegashi et al. |
| 6,166,748 A | 12/2000 | Van Hook et al. |
| 6,167,533 A | 12/2000 | Potterveld et al. |
| 6,188,399 B1 | 2/2001 | Voas et al. |
| 6,191,797 B1 | 2/2001 | Politis |
| 6,195,664 B1 | 2/2001 | Tolfa |
| 6,211,890 B1 | 4/2001 | Ohba |
| 6,246,418 B1 | 6/2001 | Oka |
| 6,259,432 B1 | 7/2001 | Yamada et al. |
| 6,266,053 B1 | 7/2001 | French et al. |
| 6,266,430 B1 | 7/2001 | Rhoads |
| 6,272,484 B1 | 8/2001 | Martin et al. |
| 6,272,558 B1 | 8/2001 | Hui et al. |
| 6,275,831 B1 | 8/2001 | Bodnar et al. |
| 6,278,448 B1 | 8/2001 | Brown et al. |
| 6,278,450 B1 | 8/2001 | Arcuri et al. |
| 6,300,947 B1 | 10/2001 | Kanevsky |
| 6,304,684 B1 | 10/2001 | Niczyporuk et al. |
| 6,307,574 B1 | 10/2001 | Ashe et al. |
| 6,310,621 B1 | 10/2001 | Gagne et al. |
| 6,311,232 B1 | 10/2001 | Cagle et al. |
| 6,313,851 B1 | 11/2001 | Matthews, III et al. |
| 6,321,314 B1 | 11/2001 | Van Dyke |
| 6,333,753 B1 | 12/2001 | Hinckley |
| 6,344,855 B1 | 2/2002 | Fisher et al. |
| 6,353,437 B1 | 3/2002 | Gagne |
| 6,369,823 B2 | 4/2002 | Ohba |
| 6,369,830 B1 | 4/2002 | Brunner et al. |
| 6,396,520 B1 | 5/2002 | Ording |
| 6,401,104 B1 | 6/2002 | LaRue et al. |
| 6,411,301 B1 | 6/2002 | Parikh et al. |
| 6,412,021 B1 | 6/2002 | Nguyen et al. |
| 6,421,058 B2 | 7/2002 | Parikh et al. |
| 6,424,348 B2 | 7/2002 | Parikh |
| 6,434,744 B1 | 8/2002 | Chamberlain et al. |
| 6,452,600 B1 | 9/2002 | Parikh et al. |
| 6,456,290 B2 | 9/2002 | Parikh et al. |
| 6,457,034 B1 | 9/2002 | Morein |
| 6,466,218 B2 | 10/2002 | Parikh et al. |
| 6,466,237 B1 | 10/2002 | Miyao et al. |
| 6,469,714 B2 | 10/2002 | Buxton et al. |
| 6,483,524 B1 | 11/2002 | Petchenkine et al. |
| 6,484,261 B1 | 11/2002 | Wiegel |
| 6,487,560 B1 | 11/2002 | LaRue et al. |
| 6,489,963 B2 | 12/2002 | Parikh et al. |
| 6,512,522 B1 | 1/2003 | Miller et al. |
| 6,515,682 B1 | 2/2003 | Washington et al. |
| 6,525,736 B1 | 2/2003 | Erikawa et al. |
| 6,526,174 B1 | 2/2003 | Graffagnino |
| 6,535,892 B1 | 3/2003 | LaRue et al. |
| 6,536,041 B1 | 3/2003 | Knudson et al. |
| 6,542,160 B1 | 4/2003 | Abgrall |
| 6,542,166 B1 | 4/2003 | Washington et al. |
| 6,544,295 B1 | 4/2003 | Bodnar |
| 6,571,328 B2 | 5/2003 | Liao et al. |
| 6,573,896 B1 | 6/2003 | Ribadeau et al. |
| 6,577,317 B1 | 6/2003 | Duluk, Jr. et al. |
| 6,580,430 B1 | 6/2003 | Hollis et al. |
| 6,590,592 B1 | 7/2003 | Nason et al. |
| 6,609,977 B1 | 8/2003 | Shimizu et al. |
| 6,614,444 B1 | 9/2003 | Duluk, Jr. et al. |
| 6,618,048 B1 | 9/2003 | Leather |
| 6,636,214 B1 | 10/2003 | Leather et al. |
| 6,639,595 B1 | 10/2003 | Drebin et al. |
| 6,661,426 B1 | 12/2003 | Jetha et al. |
| 6,664,958 B1 | 12/2003 | Leather et al. |
| 6,664,962 B1 | 12/2003 | Komsthoeft et al. |
| 6,664,986 B1 | 12/2003 | Kopelman et al. |
| 6,674,438 B1 | 1/2004 | Yamamoto et al. |
| 6,697,074 B2 | 2/2004 | Parikh et al. |
| 6,707,462 B1 | 3/2004 | Peercy et al. |
| 6,714,201 B1 | 3/2004 | Grinstein et al. |
| 6,714,221 B1 | 3/2004 | Christie et al. |
| 6,715,053 B1 | 3/2004 | Grigor |
| 6,717,599 B1 | 4/2004 | Olano |
| 6,724,403 B1 | 4/2004 | Santoro et al. |
| 6,734,864 B2 | 5/2004 | Abgrall |
| 6,738,804 B1 | 5/2004 | Lo |
| 6,741,242 B1 | 5/2004 | Itoh et al. |
| 6,742,042 B1 | 5/2004 | Holden et al. |
| 6,757,698 B2 | 6/2004 | McBride et al. |
| 6,760,046 B2 | 7/2004 | I'Anson et al. |
| 6,765,592 B1 | 7/2004 | Pletcher et al. |
| 6,788,318 B2 | 9/2004 | Chen |
| 6,792,616 B1 | 9/2004 | Jerding et al. |
| 6,806,892 B1 | 10/2004 | Plow et al. |
| 6,882,979 B1 | 4/2005 | Reay et al. |
| 6,892,360 B1 | 5/2005 | Pabla et al. |
| 6,906,720 B2 | 6/2005 | Emberling et al. |
| 6,910,000 B1 | 6/2005 | Yedidia et al. |
| 6,911,984 B2 | 6/2005 | Sabella et al. |
| 6,918,091 B2 | 7/2005 | Leavitt et al. |
| 6,931,633 B1 | 8/2005 | Vazquez et al. |
| 6,944,829 B2 | 9/2005 | Dando |
| 6,993,721 B2 | 1/2006 | Rosin et al. |
| 7,007,242 B2 | 2/2006 | Suomela et al. |
| 7,016,011 B2 | 3/2006 | De Haan |
| 7,024,381 B1 | 4/2006 | Hastings et al. |
| 7,027,055 B2 | 4/2006 | Anderson et al. |
| 7,028,264 B2 | 4/2006 | Santoro et al. |
| 7,036,083 B1 | 4/2006 | Zenith |
| 7,050,955 B1 | 5/2006 | Carmel et al. |
| 7,076,730 B1 | 7/2006 | Baker |
| 7,085,994 B2 | 8/2006 | Gvily |
| 7,107,546 B2 | 9/2006 | Coulthard |
| 7,127,473 B2 | 10/2006 | Agassi et al. |
| 7,127,713 B2 | 10/2006 | Davis et al. |

| | | | | | | |
|---|---|---|---|---|---|---|
| 7,146,563 | B2 | 12/2006 | Hesmer et al. | 2004/0125128 A1 | 7/2004 | Chang et al. |
| 7,174,512 | B2 | 2/2007 | Martin et al. | 2004/0179019 A1 | 9/2004 | Sabella et al. |
| 7,185,290 | B2 | 2/2007 | Cadiz et al. | 2004/0183800 A1 | 9/2004 | Peterson |
| 7,191,399 | B2 | 3/2007 | Ohtani et al. | 2004/0194020 A1 | 9/2004 | Beda et al. |
| 7,222,155 | B1 | 5/2007 | Gebhardt et al. | 2004/0205504 A1 | 10/2004 | Phillips |
| 7,242,406 | B2 | 7/2007 | Robotham et al. | 2004/0212640 A1 | 10/2004 | Mann et al. |
| 7,249,327 | B2 | 7/2007 | Nelson et al. | 2004/0215740 A1 | 10/2004 | Frank et al. |
| 7,260,380 | B2 | 8/2007 | Dietl et al. | 2004/0223003 A1 | 11/2004 | Heirich et al. |
| 7,269,792 | B2 | 9/2007 | Consolatti et al. | 2004/0225955 A1 | 11/2004 | Ly |
| 7,281,202 | B2 | 10/2007 | Croney et al. | 2004/0230911 A1 | 11/2004 | Bent et al. |
| 7,293,034 | B2 | 11/2007 | Paya et al. | 2004/0237082 A1 | 11/2004 | Alcazar et al. |
| 7,315,848 | B2 | 1/2008 | Pearse et al. | 2004/0255253 A1 | 12/2004 | Marcjan |
| 7,328,435 | B2 | 2/2008 | Trifon | 2004/0261012 A1 | 12/2004 | Balsiger |
| 7,503,010 | B2 | 3/2009 | Chaudhri et al. | 2004/0261037 A1 | 12/2004 | Ording et al. |
| 7,530,026 | B2 | 3/2009 | Chaudhri et al. | 2004/0261038 A1 | 12/2004 | Ording et al. |
| 7,546,543 | B2 | 6/2009 | Louch et al. | 2005/0010419 A1 | 1/2005 | Pourhamid |
| 7,802,246 | B1 | 9/2010 | Kennedy et al. | 2005/0010634 A1 | 1/2005 | Henderson et al. |
| 2001/0030647 | A1 | 10/2001 | Sowizral et al. | 2005/0021935 A1 | 1/2005 | Schillings et al. |
| 2001/0035885 | A1 | 11/2001 | Iron et al. | 2005/0022139 A1 | 1/2005 | Gettman et al. |
| 2002/0013822 | A1 | 1/2002 | West | 2005/0039144 A1 | 2/2005 | Wada et al. |
| 2002/0054148 | A1 | 5/2002 | Okada | 2005/0057497 A1 | 3/2005 | Kawahara |
| 2002/0059594 | A1 | 5/2002 | Rasmussen et al. | 2005/0060655 A1 | 3/2005 | Gray et al. |
| 2002/0065946 | A1 | 5/2002 | Narayan | 2005/0060661 A1 | 3/2005 | Kawahara et al. |
| 2002/0067418 | A1 | 6/2002 | I | 2005/0088447 A1 | 4/2005 | Hanggie et al. |
| 2002/0078453 | A1 | 6/2002 | Kuo | 2005/0088452 A1 | 4/2005 | Hanggie et al. |
| 2002/0085037 | A1 | 7/2002 | Leavitt et al. | 2005/0091571 A1 | 4/2005 | Leichtling |
| 2002/0089526 | A1 | 7/2002 | Buxton et al. | 2005/0091690 A1 | 4/2005 | Delpuch et al. |
| 2002/0093516 | A1 | 7/2002 | Brunner et al. | 2005/0114021 A1 | 5/2005 | Krull et al. |
| 2002/0099678 | A1 | 7/2002 | Albright et al. | 2005/0144563 A1 | 6/2005 | Hough et al. |
| 2002/0105548 | A1 | 8/2002 | Hayton et al. | 2005/0144595 A1 | 6/2005 | McLean |
| 2002/0112180 | A1 | 8/2002 | Land et al. | 2005/0149458 A1 | 7/2005 | Eglen et al. |
| 2002/0114466 | A1 | 8/2002 | Tanaka et al. | 2005/0160368 A1 | 7/2005 | Liu et al. |
| 2002/0118217 | A1 | 8/2002 | Fujiki | 2005/0168471 A1 | 8/2005 | Paquette |
| 2002/0120673 | A1 | 8/2002 | Tolson et al. | 2005/0168476 A1 | 8/2005 | Levene et al. |
| 2002/0123739 | A1 | 9/2002 | Haacke et al. | 2005/0172239 A1 | 8/2005 | Liu et al. |
| 2002/0129092 | A1 | 9/2002 | Tolson et al. | 2005/0183026 A1 | 8/2005 | Amano et al. |
| 2002/0133508 | A1 | 9/2002 | LaRue et al. | 2005/0193368 A1 | 9/2005 | Becker et al. |
| 2002/0140740 | A1 | 10/2002 | Chen | 2005/0198584 A1 | 9/2005 | Matthews et al. |
| 2002/0158902 | A1 | 10/2002 | Hooker et al. | 2005/0215310 A1 | 9/2005 | Boyd et al. |
| 2002/0171682 | A1 | 11/2002 | Frank et al. | 2005/0221808 A1 | 10/2005 | Karlsson et al. |
| 2002/0174003 | A1 | 11/2002 | Redmann et al. | 2005/0240857 A1 | 10/2005 | Benedict et al. |
| 2002/0174181 | A1 | 11/2002 | Wei | 2005/0243373 A1 | 11/2005 | Silverbrook et al. |
| 2002/0180798 | A1 | 12/2002 | Poor et al. | 2005/0256940 A1 | 11/2005 | Henderson et al. |
| 2002/0186257 | A1 | 12/2002 | Cadiz et al. | 2005/0278651 A1 | 12/2005 | Coe et al. |
| 2002/0196268 | A1 | 12/2002 | Wolff et al. | 2005/0282612 A1 | 12/2005 | Matthews |
| 2003/0008661 | A1 | 1/2003 | Joyce et al. | 2005/0283734 A1 | 12/2005 | Santoro et al. |
| 2003/0008711 | A1 | 1/2003 | Corbo | 2006/0001652 A1 | 1/2006 | Chiu et al. |
| 2003/0009267 | A1 | 1/2003 | Dunsky et al. | 2006/0004913 A1 | 1/2006 | Chong |
| 2003/0018971 | A1 | 1/2003 | McKenna, Jr. | 2006/0005207 A1 | 1/2006 | Louch et al. |
| 2003/0020671 | A1 | 1/2003 | Santoro et al. | 2006/0010394 A1 | 1/2006 | Chaudhri et al. |
| 2003/0032409 | A1 | 2/2003 | Hutcheson et al. | 2006/0015818 A1 | 1/2006 | Chaudhri et al. |
| 2003/0046316 | A1 | 3/2003 | Gergic et al. | 2006/0015846 A1 | 1/2006 | Fraleigh et al. |
| 2003/0061482 | A1 | 3/2003 | Emmerichs | 2006/0031264 A1 | 2/2006 | Bosworth et al. |
| 2003/0067489 | A1 | 4/2003 | Wong et al. | 2006/0036703 A1 | 2/2006 | Fulmer et al. |
| 2003/0069904 | A1 | 4/2003 | Hsu et al. | 2006/0036941 A1 | 2/2006 | Neil |
| 2003/0076369 | A1 | 4/2003 | Resner et al. | 2006/0036969 A1 | 2/2006 | Guido et al. |
| 2003/0080995 | A1 | 5/2003 | Tenenbaum et al. | 2006/0053384 A1 | 3/2006 | La Fetra et al. |
| 2003/0097659 | A1 | 5/2003 | Goldman | 2006/0075033 A1 | 4/2006 | Bienstock et al. |
| 2003/0101046 | A1 | 5/2003 | Krasnov | 2006/0075106 A1 | 4/2006 | Hochmuth et al. |
| 2003/0122787 | A1 | 7/2003 | Zimmerman et al. | 2006/0075141 A1 | 4/2006 | Boxenhorn |
| 2003/0123739 | A1 | 7/2003 | Graffagnino | 2006/0089840 A1 | 4/2006 | May |
| 2003/0146934 | A1 | 8/2003 | Bailey et al. | 2006/0095331 A1 | 5/2006 | O'Malley et al. |
| 2003/0154239 | A1 | 8/2003 | Davis et al. | 2006/0107231 A1 | 5/2006 | Matthews et al. |
| 2003/0158975 | A1 | 8/2003 | Frank et al. | 2006/0112123 A1 | 5/2006 | Clark et al. |
| 2003/0164862 | A1 | 9/2003 | Cadiz et al. | 2006/0123356 A1 | 6/2006 | Sobeski et al. |
| 2003/0169306 | A1 | 9/2003 | Makipaa et al. | 2006/0123359 A1 | 6/2006 | Schatzberger et al. |
| 2003/0174136 | A1 | 9/2003 | Emberling et al. | 2006/0136843 A1 | 6/2006 | Shafron |
| 2003/0174154 | A1 | 9/2003 | Yukie et al. | 2006/0150118 A1 | 7/2006 | Chaudhri et al. |
| 2003/0184552 | A1 | 10/2003 | Chadha | 2006/0156248 A1 | 7/2006 | Chaudhri et al. |
| 2003/0184584 | A1 | 10/2003 | Vachuska et al. | 2006/0168536 A1 | 7/2006 | Portmann |
| 2003/0191799 | A1 | 10/2003 | Araujo et al. | 2006/0197752 A1 | 9/2006 | Hurst et al. |
| 2003/0206195 | A1 | 11/2003 | Matsa et al. | 2006/0206835 A1 | 9/2006 | Chaudhri et al. |
| 2003/0208685 | A1 | 11/2003 | Abdel-Rahman | 2006/0218499 A1 | 9/2006 | Matthew et al. |
| 2004/0003402 | A1 | 1/2004 | McKenna, Jr. | 2006/0230059 A1 | 10/2006 | Etgen et al. |
| 2004/0012626 | A1 | 1/2004 | Brookins | 2006/0236257 A1 | 10/2006 | Othmer et al. |
| 2004/0032409 | A1 | 2/2004 | Girard | 2006/0253794 A1 | 11/2006 | Wilson |
| 2004/0036711 | A1 | 2/2004 | Anderson | 2006/0271637 A1 | 11/2006 | McKeon et al. |
| 2004/0039934 | A1 | 2/2004 | Land et al. | 2006/0274086 A1 | 12/2006 | Forstall et al. |
| 2004/0070629 | A1 | 4/2004 | Seifert | 2006/0277469 A1 | 12/2006 | Chaudhri et al. |

| | | |
|---|---|---|
| 2006/0277481 A1 | 12/2006 | Forstall et al. |
| 2007/0011026 A1 | 1/2007 | Higgins et al. |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0074126 A1 | 3/2007 | Fisher et al. |
| 2007/0101146 A1 | 5/2007 | Louch et al. |
| 2007/0101279 A1 | 5/2007 | Chaudhri et al. |
| 2007/0101288 A1 | 5/2007 | Forstall et al. |
| 2007/0101291 A1 | 5/2007 | Forstall |
| 2007/0101433 A1 | 5/2007 | Louch et al. |
| 2007/0118813 A1 | 5/2007 | Forstall et al. |
| 2007/0130541 A1 | 6/2007 | Louch et al. |
| 2007/0162850 A1 | 7/2007 | Adler et al. |
| 2007/0203984 A2 | 8/2007 | AlHusseini et al. |
| 2007/0209013 A1 | 9/2007 | Ramsey et al. |
| 2007/0266093 A1 | 11/2007 | Forstall et al. |
| 2008/0016468 A1 | 1/2008 | Chambers et al. |
| 2008/0034309 A1 | 2/2008 | Louch et al. |
| 2008/0034314 A1 | 2/2008 | Louch et al. |
| 2008/0155453 A1 | 6/2008 | Othmer |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2009/0005071 A1 | 1/2009 | Forstall et al. |
| 2009/0021486 A1 | 1/2009 | Chaudhri et al. |
| 2009/0024944 A1 | 1/2009 | Louch et al. |
| 2009/0044138 A1 | 2/2009 | Rudolph et al. |
| 2009/0125815 A1 | 5/2009 | Chaudhri et al. |
| 2009/0144644 A1 | 6/2009 | Chaudhri et al. |
| 2009/0158193 A1 | 6/2009 | Chaudhri et al. |
| 2009/0187841 A1 | 7/2009 | Chaudhri et al. |
| 2009/0260022 A1 | 10/2009 | Louch et al. |
| 2009/0271724 A1 | 10/2009 | Chaudhri et al. |

FOREIGN PATENT DOCUMENTS

| | | |
|---|---|---|
| EP | 548586 | 6/1993 |
| EP | 0694879 | 1/1996 |
| EP | 0 908 835 | 4/1999 |
| EP | 1 237 076 | 9/2002 |
| EP | 1383080 | 1/2004 |
| EP | 0972273 | 3/2004 |
| EP | 1 724 996 | 11/2006 |
| WO | WO 96/06401 | 2/1996 |
| WO | WO 97/07467 | 2/1997 |
| WO | WO 98/07112 | 2/1998 |
| WO | WO 98/45815 | 10/1998 |
| WO | WO 02/09039 | 1/2002 |
| WO | WO 03/023593 | 3/2003 |
| WO | WO 2004/027707 | 4/2004 |
| WO | WO 2004/076977 | 9/2004 |
| WO | WO 2006/012343 | 2/2006 |
| WO | WO 2006/020304 | 2/2006 |
| WO | WO 2006/119269 | 11/2006 |
| WO | WO 2009/012319 | 12/2009 |
| WO | WO 2009/012330 | 12/2009 |

OTHER PUBLICATIONS

Steven Warren, "The VMware Workstation 5 Handbook," Jun. 2005, Course Technology PTR.*

"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices/devices-16.html>, 3 pages.

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.

Altman, R.B., "Visual Quickstart Guide Power Point 2000/98, Applying Preset Animations," ProQuest Safari Books, Peachpit Press, May 7, 1999, 7 pages [online] Retrieved from the Internet: <URL:http://proquest.safaribooksonline.com/0201354411>.

Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html40/struct/objects.html, 21 pages.

Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.

Conner Borookshire D. et al. "Three-Dimensional Widgets" ACM 1992, 8 pages.

Elliott, Conal, "Programming Graphics Processors Functionally," Proceedings of the 2004 Haskell Workshop, Sep. 22, 2004. 11 pages.

Fried, Ina, "Developer Calls Apple's Tiger a Copycat," CNET News. com, Jun. 28, 2004 [online] Retrieved on Jul. 1, 2004] Retrieved from the Internet URL:http://zdnet.com.com/2102-1104_2-250692.html?tag=printthis, 2 pages.

Fried, Ina, "For Apple's Tiger, the Keyword is Search", CNET News. com, Jun. 28, 2004 [online] Retrieved on Jul. 1, 2004] Retrieved from the Internet URL:http://zdnet.com.com/2102-1103_2-5250346.html?tag=printthis, 2 pages.

Guber, John et al., "Dashboard vs. Konfabulator", Jun. 2004, 9 pages.

Haeberli, P. et al., "The Accumulation Buffer: Hardware Support for High-Quality Rendering," Computer Graphics, Aug. 1990, pp. 309-318, vol. 24, No. 4.

Http://en.wikipedia.org/wiki/Comparison_of widget_engines, 2007, 6 pages.

http://en.wikipedia.org/wiki/Windows-Sidebar, 2007, 7 pages.

http://www.nat.org/dashboard/blog.php3 Dec. 2003, 31 pages.

International Search Report, PCT/US2005/008804, Jul. 27, 2005, 3 pages.

International Search Report and Writen Opinion, PCT/US2005/022152, Jul. 10, 2006, 8 pages.

Konfabulator, "Cupertino, Start your Photocopiers!," [online] [Retrieved on Jul. 1, 2004] Retrieved from the Internet <URL: http://www.konfabulator.com>, 1 page.

Konfabulator, "Konfabulator & Widget Basics," [online] [Retrieved on Jul. 1, 2004] Retrieved from the Internet <URL: http://www.konfabulator.com/info/basics.html>, 3 pages.

Konfabulator, "Screenshots," [online] [Retrieved from the Internet <URL: http://www.konfabulator.com/info/screenshots.html>, 2 pages.

Konfabulator, "What is Konfabulator?," [online] [Retrieved on Jul. 1, 2004] Retrieved from the Internet <URL: http://www.konfabulator.com/info/, 3 pages.

Lammers, J.., et al., "Maya 4.5 Fundamentals: Particles," New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.

Notification of Transmittal of the International Search Report and the Written Opinion of the International Searching Authority, PCT/US2005/022579, 15 pages.

Nvidia, "CG—Teaching Cg," Power Point Presentation, Author and date unknown, pp. 1-16.

Puder, A., "Extending Desktop Applications to the Web," ACM International Conference Proceedings Series, Proceedings of the Jun. 2004 International Symposium on Information and Communication Technologies, 2004, vol. 90, 6 pages.

Rochkind, M. et al., "Common Elements in Today's Graphical User Interfaces: The Good, the Bad, and the Ugly," Interchi '93, AMC, Apr. 24-29, 1993, pp. 470-473.

Segal, Mark and Akeley, Kurt, "The OpenGL Graphics System: A Specification (Version 1.5)," Copyright 1992-2003 Silicon Graphics, Inc., Oct. 30, 2003, 334 pages.

Shantzis, Michael A., "A Model for Efficient and Flexible Image Computing," Computer Graphics Proceedings, Annual Conference Series, Orlando, Florida, Jul. 24-29, 1994, pp. 147-154.

Snippet Software Inc. et al. "Corporate Portal Newsletter" Oct. 2000, 3 pages.

Snippet Software Inc. et al. "Snippets Software" Jun. 2001, 16 pages.

Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3_Dec. 2003, 8 pages.

Stardock.com et al. "DesktopX Whitepaper and users Guide" 1999, 72 pages.

Tang, J.C. et al., "ConNexus to Awarenex: Extending Awareness to Mobile Users," SIGCHI '01, AMC, Mar. 31-Apr. 4, 2001, 8 pages.

Ullenboom, C., "Java is auch eine Insel," 2003, [online] [Retrieved on Apr. 13, 2006] Retrieved from the Internet URL: http://www.galileocomputing.de/openbook/javainsel2//java_140000.htm#Xxx998138, 3 pages.

Van Gelder, Allen, and Kwansik, Kim, "Direct Volume Rendering with Shading via Three-Dimensional Textures," Computer Science Dept., Univ. of California, Santa Cruz, CA 95064, 9 pages.

Wardell, Brad, Konfabulator for Windows, Jan. 10, 2004; [online] Retrieved from the Internet Mar. 6, 2006] Retrieved from the Internet: URL:http://www.xpthemes.com/forums.asp?MID=19&CMID=19&AID=4472, 6 pages.

International Search Report and Written Opinion, PCT/US06/44634, Jul. 2, 2008, 13 pages.

Louch et al., "Multidimensional Widgets", U.S. Appl. No. 12/612,301, filed Nov. 4, 2009.

"About Merkitys"; [online] [Retrieved on Feb. 4, 2008]; Retrieved from the Internet, URL: http://meaning.3xi.org/; 3 pages.

"Advanced Digital Photo Solutions"; GeoSpatial Experts; [online] [Retrieved on Feb. 4, 2008]; Retrieved from the Internet, URL: http://www.geospatialexperts.com/productadv.html; 4 pages.

"Comarison of widget engines", http://en.wikipedia.org/wiki/Comparison_of_widget_engines, 2007, 6 pages.

"Coolsmartphone"; [online] [Retrieved on Apr. 13, 2006]; Retrieved from the Internet, URL: http://www.coolsmartphone.com/article569.html; 57 pages.

"Dashboard Blog", Dec. 2003, Retrieved from the Internet on May 11, 2007 <URL:http://www.nat.org/dashboard/blog.php3> 31 pages.

"Garmin hits iphone directly with nuvifone"; [online] [Retrieved on Mar. 17, 2008]; Retrieved from the Internet, URL: http://www.electronista.com/print/50764; 3 pages.

"Garmin® nüvifone™ Takes Personal Navigation and Communication to the Next Level"; Garmin International; [online] [Retrieved on Mar. 17, 2008]; Retrieved from the Internet, URL: http://www8.garmin.com/pressroom/mobile/013008.html; 3 pages.

"Go View Map Save to Favorites Cancel"; [online] [Retrieved on Feb. 4, 2008]; Retrieved from the Internet, URL: http://www8.garmin.com/buzz/nuvifone/m/g/sc-geotag-lg.jpg; 1 page.

"GPS Blogging Phones"; [online] [Retrieved on Apr. 5, 2006] Retrieve from the Internet, URL: http://www.dailywireless.org/modules.php?name=News&file=article&sid=4613; 3 pages.

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"MOREnet Dialing Plan: PSTN and IP Network Integration for H.323, H320 VoIP and Public Voice Networks", [online] [Retrieved on Jan. 11, 2008] Retrieved from the Interent <URL: http://www.more.net/technical/research/dialplan/index.html, 12 pages.

"New Improved Panoramio—Geo Photo Sharing"; Google Earth Blog; [online] [Retrieved on Feb. 5, 2008]; Retrieved from the Internet, URL: http://www.gearthblog.com/blog/archives/2006/06/new_improved_pa.html, 1 page.

"Snap, Map and Share Your World"; IsWhere by Red Hen Systems; [online] [Retrieved on Jun. 3, 2008]; Retrieved from the Internet, URL: http://www.redhensystems.com/products/multimedia_mapping_software/iswhere/default.asp?sm=2; 1 page.

"Windows Sidebar", Wikipedia, Retrieved from the Internet, <URL:http://en.wikipedia.org/wiki/Windows-Sidebar>, 2007, 7 pages.

"Convert just about Anything to Anything else", OnlineConversion.com, Aug. 2000, [online] [Retrieved on Jun. 22, 2008] Retrieved from the Internet, URL:http://web.archive.org/web/200000815055422/http://www.onlineconversion.com/>.

Beier et al., "The bull's-eye: a framework for web application user interface design guidelines", Proceedings of the Sigchi Conference on Human Factors in Computing Systems, Apr. 2003, pp. 489-496.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, 12-15, Oct. 2003, pp. 975-978.

Chinese Notification of First Office Action, Chinese Patent Application No. 200580016349.3, Jul. 25, 2008, 21 pages.

Han; "Bi-manual, multi-point, and multi-user interactions on a graphical interaction surface"; Mutli-Touch Interaction Research; [online] [Retrieved on Apr. 13, 2006]; Retrieved from the Internet, URL: http://mrl.nyu.edu/~jhan/ftirtouch/; 4 pages.

Helal et al., "Drishti: An Integrated Navigation System for Visually Impaired and Disabled", Fifth International Symposium on Wearable Computers (ISWC'01), IEEE, 2001, pp. 149-156.

Invitation to Pay Additional Fees(Form PCT/ISA/206) and Communication Relating to the Results of the Partial Intrenational Search (PCT/ISA/206 (Annex)) for PCT/US2007/077441; dated Jan. 28, 2008, 8 pages.

Invitation to Pay Additional Fees(Form PCT/ISA/206) and Communication Relating to the Results of the Partial Intrenational Search (PCT/ISA/206 (Annex)) for PCT/US2008/050295; dated Jul. 29, 2008.

Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.

Microsoft Corporation, "User's Guide Microsoft® Windows™ and MS-DOS® 6", 1993, pp. Cover-xvi, 112-121.

Rist et al., "Customizing Graphics for Tiny Displays of Mobile Devices", Personal and Ubiquitous Computing, 2002, pp. 260-268, vol. 6.

Shiozawa, Hidekazu et al., "Perspective Layered Visualization of Collaborative Workspaces," Proceedings of the International ACM SIGGROUP conference on Supporting Group Work Publisher, Nov. 1999, 5 pages.

Stardock et al., "DesktopX General Guide," Aug. 2000, [online] [Retrieved on Jan. 31, 2008] Retrieved from the Internet URL:http://www.stardock.com/products/desktopx/docs/.

Stardock et al., "DesktopX Tutorial", Aug. 2000, [online] [Retrieved on Jan. 31, 2008] Retrieved from the Internet URL:http://www.stardock.com/products/desktopx/tutorial.html.

Stardock et al., "DesktopX WhitePaper", Aug. 2000, [online] [Retrieved on Jan. 31, 2008] Retrieved from the Internet <URL:http://www.stardock.net/media/whitepaper_desktopx.html.

Stardock et al., "The User Guide—Version 2", DesktopX 2000.

Stardock et al., "What Can It Do? Making Objects", DesktopX Tutorial, 2001, [online] [Retrieved on Apr. 11, 2008] Retrieved from the Internet URL:http://web.archive.org/web/2001101922285/http://www.stardock.com/products/desktopx/....

Stardock News, DesktopX User Manual On-line:, 1999, 2003 [online] [Retrieved from the Internet on May 11, 2007] <URL:http://www.stardock.comnewsitem.asp?id=538>.

Partial Interntional Search Rpeort, dated May 15, 2009, issued in Interntional Application No. PCT/US2008/050047.

Invitation to Pay fees and Partial International Search Report, dated May 8, 2009, issued in PCT/US2008/050038.

Archive of BabelFish.com Inc., Oct. 2003, [online] [Archived by http://archive.org on Oct. 2, 2003; retrieved on Dec. 8, 2008] Retrieved from the Internet URL: <http://web.archive.org/web/20031002115902/www.babelfish.com/en/index.html>.

Starfish Software Introduces Starfish Internet Sidekick; Starfish Internet Sidekick is the best way for Internet users to manage their calendar, contacts and communications, Busienss Wire, Sep. 23, 1996, [online] [Retrieved on Dec. 8, 2008] Retrieved from the Internet URL: <http://findarticles.com/articles/mi_mOEIN/is_1996_Sept_23/ai_18704672?tag=rel.resl>.

Archive of www.gigaplex.com, Lazar Productions, Nov. 1996, [online] [Archieved by http://archive.org on Nov. 5, 1996; retrieved on Dec. 8, 2008] Retrieved from the Internet URL: <http://web.archive.org/web/19961105081827/www.gigaplex.com/>.

Archive of movies.com, Jan. 2002, [online] [Archived by http://archive.org on Jan. 18, 2002; Retrieved on Dec. 8, 2008] Retrieved from the Internet URL: <http://www.archive.org/web/20020118102516/movies.go.com>.

Baratz et al., "DesktopX 3/1", Ars Technica, Nov. 17, 2005, [online] [Retrieved on Aug. 1, 2008] Retrieved from the Internet URL: <http://arstechnica.com/reviews/apps/desktopx/ars.>.

Siracusa et al., "Mac OA 10.4 Tiger: Dashboard", Apr. 28, 2005, [online] [Retrieved on Aug. 1, 2008] Retrieved from the Internet URL: <http://arstechnica.com/reviews/os/macosz-10-4.ars/17>.

Wardell et al. "Apple's Dashboard vs. Konfabulator vs. DesktopX", Skinning the frog, Jul. 1, 2004, [online] [Retrieved on Aug. 1, 2008] Retrieved from the Internet URL: <http://frogboy.joeuser.com/article/19800>.

Thomas et al., "Animating Widgets in the InterViews Toolkit", Lecture Notes in Computer Science, pp. 26-44, 1995.

VMWare, "VMWare Workstation User's Manual", 2002, pp. 12-13.

JavaBoutique, Oct. 1, 2002. Available at: <http://javaboutique.internet.com/utilities/counter.html>.

Forstall, et al., U.S. Appl. No. 12/469,555, filed May 20, 2009.

"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.

Akeley, "Cg—Teaching Cg", Power Point Presentation, NVIDIA Corporation, 2002; 1 page.

International Search Report and Written Opinion, dated Sep. 3, 2009, issued in International Application No. PCT/US2008/050047; 17 pages.

Konfabulator, "Konfabulator & Widget Basics—A Refresher Course in Widgetology", [online] [Retrieved on Jun. 5, 2009], Retrieved from the Internet URL: http://web.archive.org/web/20050811020610/http://konfabulator.com/basics; 16 pages.

Snippet Software, "Product Spotlight Non-browser based portal solution from Snippets Software", Corporate Portal Newsletter, Oct. 2000, vol. 1, No. 10, 3 pages.

Van Gelder et al., "Direct Volume Rendering with Shading via Three-Dimensional Textures,". Computer Science Dept., Univ. of California, Santa Cruz, CA 95064, Jul. 19, 1996; 17 pages.

"Sidekick", [Online] [Retrieved on October 12, 2009] Retrieved from the Internet at URL: http://en.widipedia.org/wiki/Sidekick; 5 pages.

International Search Report and Written Opinion, dated Oct. 16, 2009, issued in International Application No. PCT/US2008/070217.

Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.

Warren, "The VMware Workstation 5 Handbook," Jun. 2005, *Course Technology PTR*, 50 pages.

Bauer, "Transparent User Modeling for a Mobile Personal Assistant," LWA 2004: Lernen-Wissensentdecking-Adaptivitat, [Online] Oct. 6, 2004, pp. 3-8, Berlin Retrieved from the Internet: URL:http://www.dfki.de/specter/Docs/Bauer04.pdf> [retrieved on Sep. 15, 2009].

TellWidget, Sep. 5, 2005, 3 pages.

Widget Creation Tutorial, Oct. 30, 2005, 25 pages.

Lieberman and Selker, "Agents for the User Interface," Handbook of Agent Technology, 2003, pp. 1-21, Retrieved from the Internet, URL: http://web.media.mit.edu/{lieber/Publications/Agents_for_UI.pdf> [retrieved on Sep. 15, 2009].

Bauer and Deru, "Motion-Based Adaptation of Information Services for Mobile Users," Lecture Notes in Computer Science, Aug. 19, 2005, Retrieved from the Internet, URL: http://www.springerlink.com/content/lwdvxw9ervxa44f9/fulltext.pdf>, [retrieved on Sep. 15, 2009], 6 pages.

"Desktop Sidebar", [online] [Retrieved on May 11, 2007] Retrieved from the Internet URL: http://web.archive.org/web/20040101160831/http://www.desktopsidebar.com/; 5 pages.

Javaboutique. Oct. 8, 2008. Available at: http://web.archive.org/web/20021208051951/http://javaboutique.internet.com/utilities/counter.html.

* cited by examiner

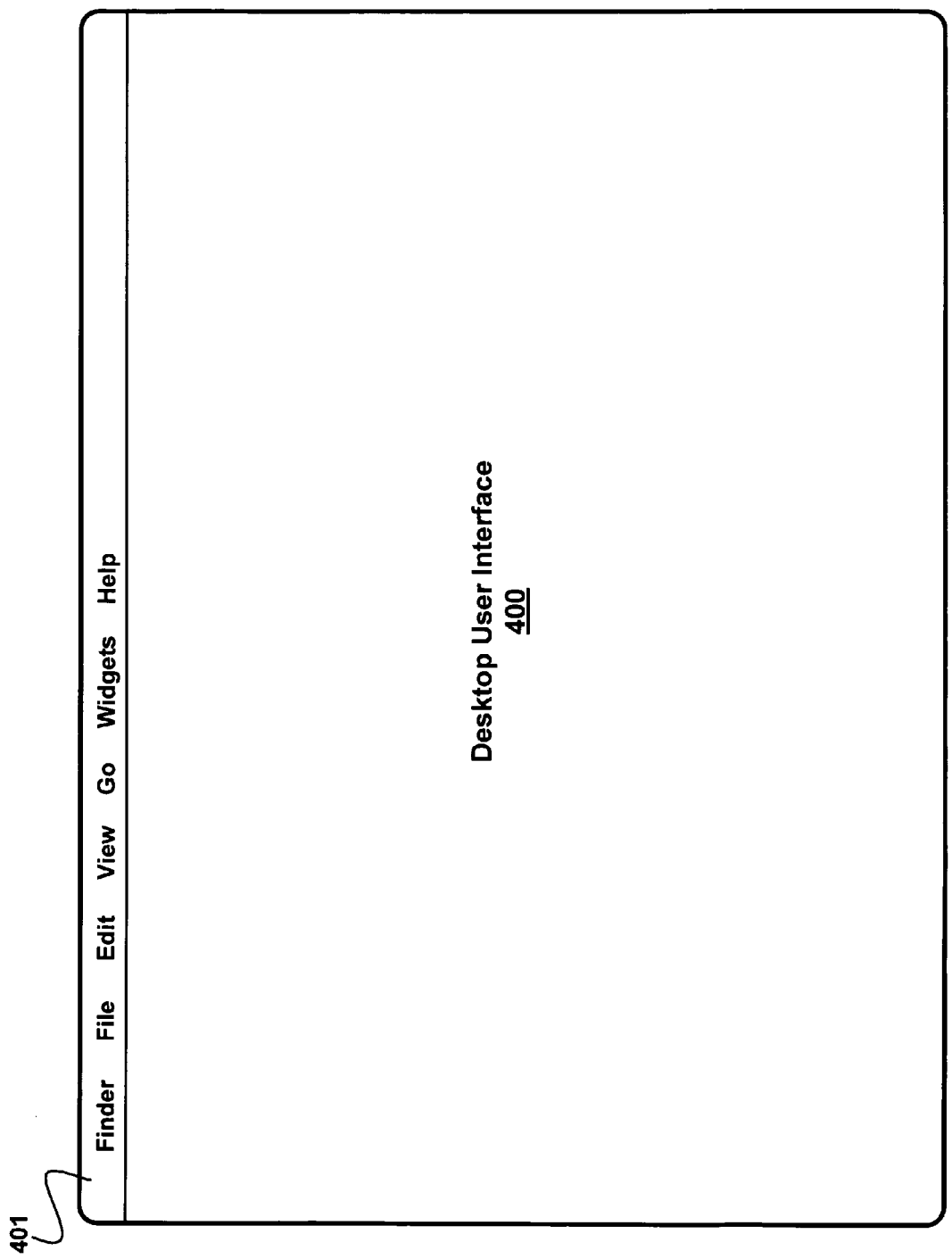

MULTIPLE DASHBOARDS

RELATED APPLICATIONS

This patent application claims the benefit of priority from jointly owned and U.S. Provisional Patent Application No. 60/737,942, entitled "Multiple Dashboards," filed Nov. 18, 2005, which provisional patent application is incorporated by reference herein in its entirety.

This application is related to the following jointly owned and patent applications, each incorporated herein by reference in its entirety:

- U.S. Provisional Patent Application No. 60/583,125, for "Procedurally Expressing Graphic Objects for Web Pages," filed Jun. 25, 2004;
- U.S. patent application Ser. No. 10/874,829, for "User Interface for Assisting in the Installation of an Asset," filed Jun. 22, 2004;
- U.S. patent application Ser. No. 10/877,968, for "Unified Interest Layer For User Interface," filed Jun. 25, 2004;
- U.S. patent application Ser. No. 11/145,561, for "Application Clipper," filed Jun. 3, 2005;
- U.S. patent application Ser. No. 11/145,560, for "Web View Applications," filed Jun. 3, 2005;
- U.S. patent application Ser. No. 11/145,023, for "Clip View Applications," filed Jun. 3, 2005;
- U.S. patent application Ser. No. 11/148,010, for "Preview and Installation of User Interface Elements in a Display Environment," filed Jun. 7, 2005;
- U.S. Provisional Patent Application No. 60/734,016, for "Preview Including Theme Based Installation of User Interface Elements In A Display Environment," filed Nov. 4, 2005;
- U.S. Provisional Patent Application No. 60/730,956, for "Widget Security," filed Oct. 27, 2005;
- U.S. patent application Ser. No. 11/282,110, for "Preview Including Theme Based Installation of User Interface Elements In A Display Environment," filed Nov. 16, 2005; and
- U.S. Provisional Patent Application No. 60/737,899, for "Management of User Interface Elements In A Display Environment," filed Nov. 18, 2005.

TECHNICAL FIELD

The disclosed implementations relate generally to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that include information and one or more tools (e.g., applications) that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Widgets can be displayed and accessed through a user interface, such as a "dashboard layer," which is also referred to as a "dashboard." Widgets and dashboards are described in co-pending U.S. patent application Ser. No. 10/877,968, entitled "Unified Interest Layer For User Interface."

Due to the large number of widgets available to a user, a virtual desktop or dashboard can become cluttered and disorganized, making it difficult for the user to quickly locate and access a widget. Moreover, a user may only need to access a subset of widgets available on the desktop or dashboard for a given task.

SUMMARY

Systems, methods, computer-readable mediums, user interfaces and other implementations are disclosed for organizing, managing and presenting widgets in display areas associated with multiple dashboard environments.

In some implementations, a method includes: providing a first dashboard layer; providing a second dashboard layer; and providing a transition between the first dashboard layer and the second dashboard layer.

In some implementations, a user interface includes: a first display area associated with a first dashboard environment. The first display area is configured for displaying at least one widget from a first set of widgets. The system also includes a second display area associated with a second dashboard environment. The second display area is configured for displaying at least one widget from a second set of widgets.

In some implementations, a method includes: identifying a widget for installation in a dashboard environment; selecting the dashboard environment from a number of dashboard environments; and installing the widget in the selected dashboard environment.

In some implementations, a method includes: receiving a widget for installation in a dashboard environment; previewing the widget in a preview environment; and installing the widget after the preview in the dashboard environment.

In some implementations, a method includes: providing a number of widgets for display in one or more display areas associated with one or more dashboard environments; determining a first set of widgets to be displayed in a first display area of a first dashboard environment; installing the first set of widgets in the first dashboard environment; determining a second set of widgets to be displayed in a second display area associated with a second dashboard environment; and installing the second group of widgets in the second dashboard environment.

In some implementations, a user interface includes: a desktop environment; a first dashboard environment, configured to be invoked at least from the desktop environment, and including one or more widgets; and a second dashboard environment, configured to be invoked from at least a first display area associated with the first dashboard environment, and including one or more widgets.

In some implementations, a method includes: providing a desktop environment in a user interface device; defining a first dashboard environment, configured to be invoked from the desktop environment, and including one or more widgets; and defining a second dashboard environment, configured to be invoked from at least a first display area associated with the first dashboard environment, and including one or more widgets.

In some implementations, a method includes: identifying one or more widgets for installation in a dashboard environment; determining if an existing dashboard environment is available for installing at least one widget; and if no existing dashboard environment is available, installing a new dashboard environment.

In some implementations, a dashboard manager includes: a dashboard installer configured for installing multiple dashboard environments; and a display area manager configured for presenting display areas associated with the dashboard environments on a user interface, and for managing interactions with the display areas.

Other implementations are disclosed which are directed to systems, methods, computer-readable mediums and user interfaces.

BRIEF DESCRIPTION OF THE DRAWINGS

FIG. 4a is a screen shot depicting an exemplary desktop user interface prior to activation of a dashboard.

DETAILED DESCRIPTION

Hardware Architecture

Figure 1:
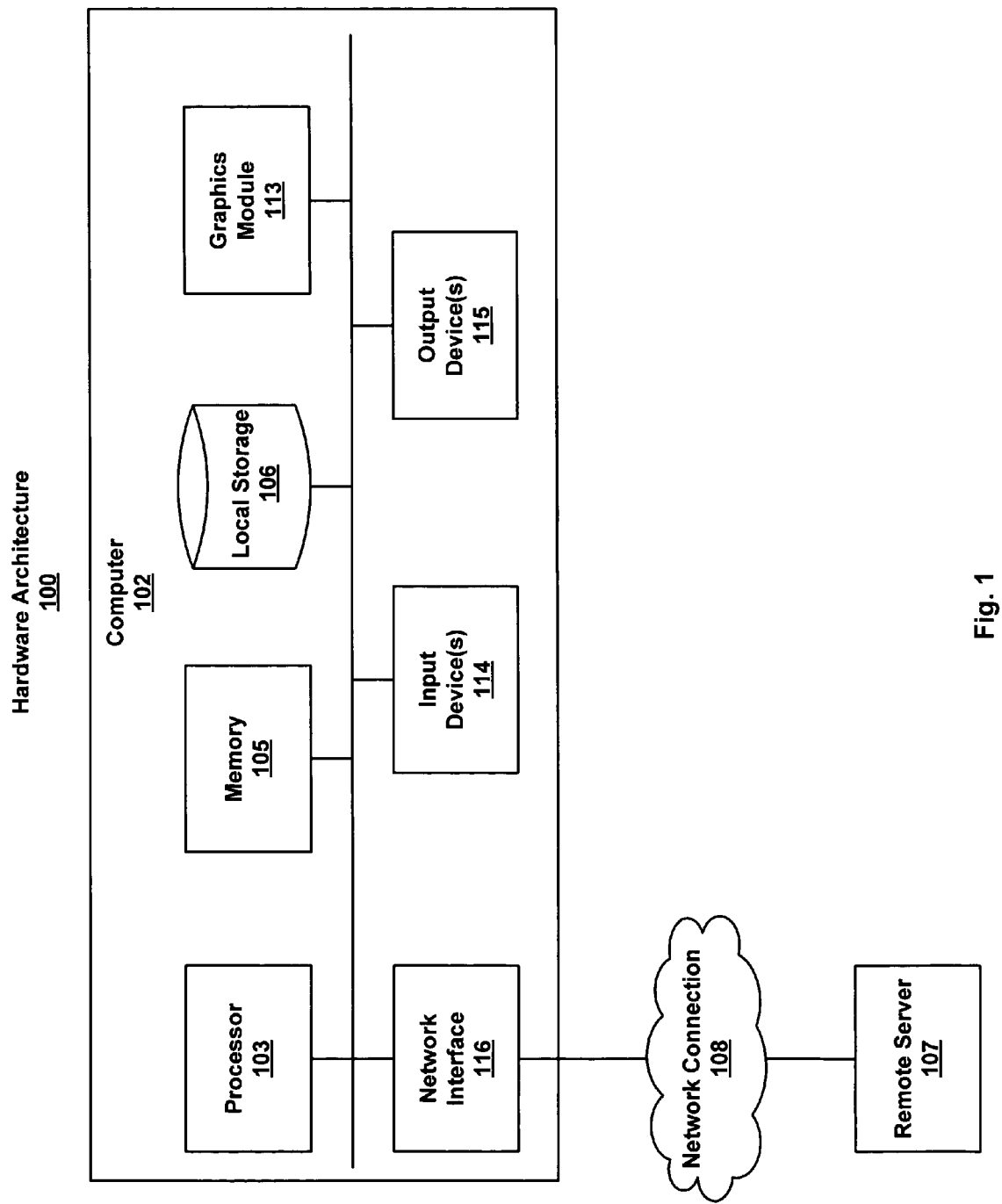
FIG. 1 is a block diagram of an exemplary hardware architecture for implementing multiple dashboards.

FIG. 1 is a block diagram of a hardware architecture 100 for implementing multiple dashboards. The architecture 100 includes a personal computer 102 coupled to a remote server 107 via a network interface 116 and a network connection 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While dashboards and widgets are described herein with respect to a personal computer 102, it should be apparent that the disclosed implementations can be incorporated in, or integrated with, any electronic device that is capable of using widgets, including without limitation, portable and desktop computers, servers, electronics, media players, game devices, mobile phones, email devices, personal digital assistants (PDAs), televisions, etc.

A multiple dashboard system and method for managing and displaying multiple dashboards and widgets can be implemented as one or more plug-ins that are installed and run on the personal computer 102. The plug-ins are configured to interact with an operating system (e.g., MAC OS® X, WINDOWS XP, LINUX, etc.) and to perform the various dashboard and widget functions, as described with respect of FIGS. 2-13. A multiple dashboard system and method can also be implemented as one or more software applications running on the computer 102. In some implementations, a multiple dashboard system can be another widget that is configurable to communicate with other widgets, applications and/or operating systems. A multiple dashboard system and method can also be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.).

For illustrative purposes, in the following description the invention is described as a feature of an operating system for use in installing widgets in multiple dashboards; however, one skilled in the art will recognize that the techniques of the present invention can be implemented in other contexts as well, including those described above, to install other elements, and in other environments including environments associated with applications or operating systems. Examples of other environments include e-mail environments, desktop environments, application environments, hand-held display environments, and other display environments.

Dashboard Overview

Figure 2:
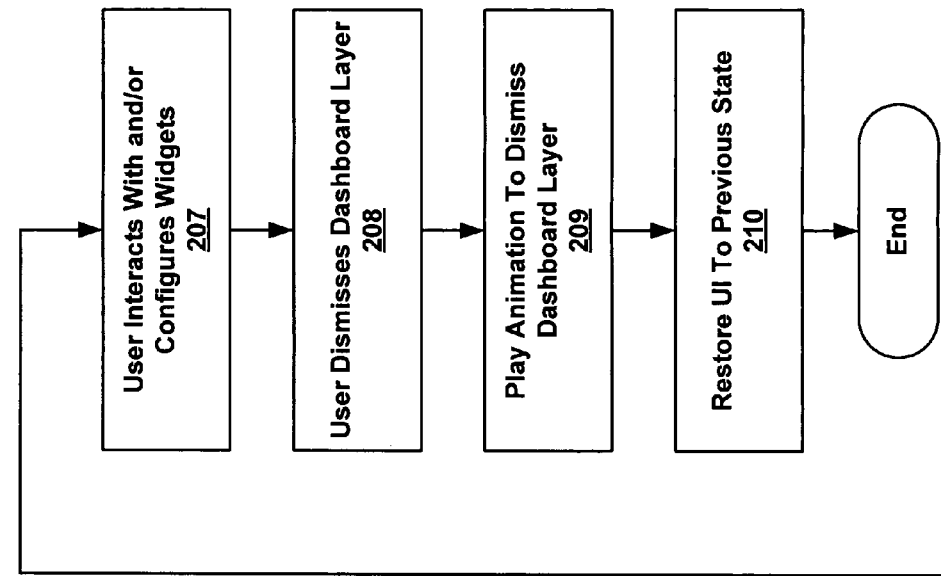
FIG. 2 is a flow diagram of an exemplary process for activating and using a dashboard.
Figure 2:
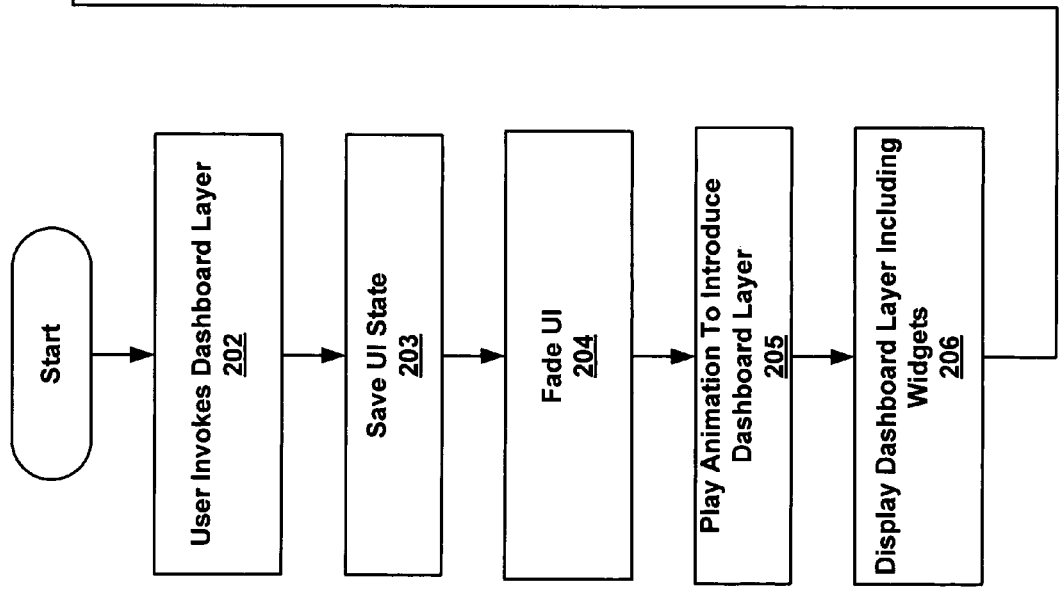

FIG. 2 is a flow diagram of an implementation of a process for activating and using a dashboard. A dashboard layer (also referred to herein as a "unified interest layer" or "dashboard") is used to manage and display widgets. A user can invoke a dashboard (202) by hitting a designated function key or key combination, or by clicking on an icon, or by selecting a command from an onscreen menu, or by moving an onscreen cursor to a designated corner of the screen. In response to such user input, the current state of the user interface is saved (203), the user interface is temporarily inactivated (204), an animation or effect is played or presented to introduce the dashboard (205) and the dashboard is displayed with one or more widgets (206). If applicable, a previous state of the dashboard is retrieved, so that the dashboard can be displayed in its previous configuration. In some implementations, the user interface and dashboard are active at the same time.

In some implementations, the dashboard is overlaid on an existing desktop user interface (UI). When the dashboard is activated, the existing UI may be faded, darkened, brightened, blurred, distorted, or otherwise altered to emphasize that it is temporarily inactivated. The existing desktop may or may not be visible behind the dashboard. The desktop can also be shrunk to a small portion of the display screen while the dashboard is active, and can be re-activated by clicking on it. In some implementations, the desktop is shrunk and presented as a widget. The desktop can be re-activated by clicking on the widget.

The user interacts with and/or configures widgets as desired (207). In some implementations, the user can move widgets around the screen, and can resize widgets if applicable. Some widgets are resizable and some have a fixed size. A widget author can specify whether a widget can be resized. Some widgets automatically resize themselves based on the amount or nature of the data being displayed. Widgets can overlap and or repel one another. For example, if the user attempts to move one widget to a screen position occupied by another widget, one of the widgets is automatically moved out of the way or repelled by the other widget.

The user dismisses the dashboard (208) by invoking a dismissal command, which causes the normal UI to return or re-present itself to the display screen. In some implementations, the dashboard is dismissed when the user presses a function key or key combination (which may be the same or different than the key or combination used to activate the dashboard), or clicks on a close box or other icon, or clicks on negative space within the dashboard (e.g., a space between widgets), or moves an onscreen cursor to a predefined corner of the screen.

In some implementations, the dashboard is automatically dismissed (i.e., without user input) after some predetermined period of time or in response to a trigger event. An animation or other effect is played or presented to provide a transition as the dashboard is dismissed (209). When the dashboard is dismissed, the current configuration or state of the widgets (e.g., position, size, etc.) is stored, so that it can be retrieved the next time the dashboard is activated. In some implementations, an animation or effect is played or presented when re-introducing the UI. The UI is restored to its previous state (210) so that the user can resume interaction with software applications and/or the computer operating system.

In some implementations, the dashboard is configurable. The user can select a number of widgets to be displayed, for example, by dragging the widgets from a configuration bar (or other user interface element) onto the dashboard. The configuration bar can include different types of widgets, and can be categorized and/or hierarchically organized. In some implementations, in response to the user dragging a widget onto the configuration bar, the widget is downloaded from a server and automatically installed (if not previously installed). In some implementations, certain widgets must be purchased, so the user is requested to provide a credit card number or some other form of payment before the widget is installed on the user's machine. In some implementations, widgets are already installed on the user's machine, but are only made visible when they have been dragged from the configuration bar onto the dashboard. The configuration bar is merely an example of one type of UI element for configuring the dashboard. Other configuration mechanisms can be used, such as an icon tray or menu system.

It should be apparent that there are many ways in which dashboards and widgets can be displayed other than those implementations described herein. For example, widgets can be displayed on any user interface or user interface element, including but not limited to desktops, browser or application windows, menu systems, trays, multi-touch sensitive displays and other widgets.

Software Architecture

Figure 3:
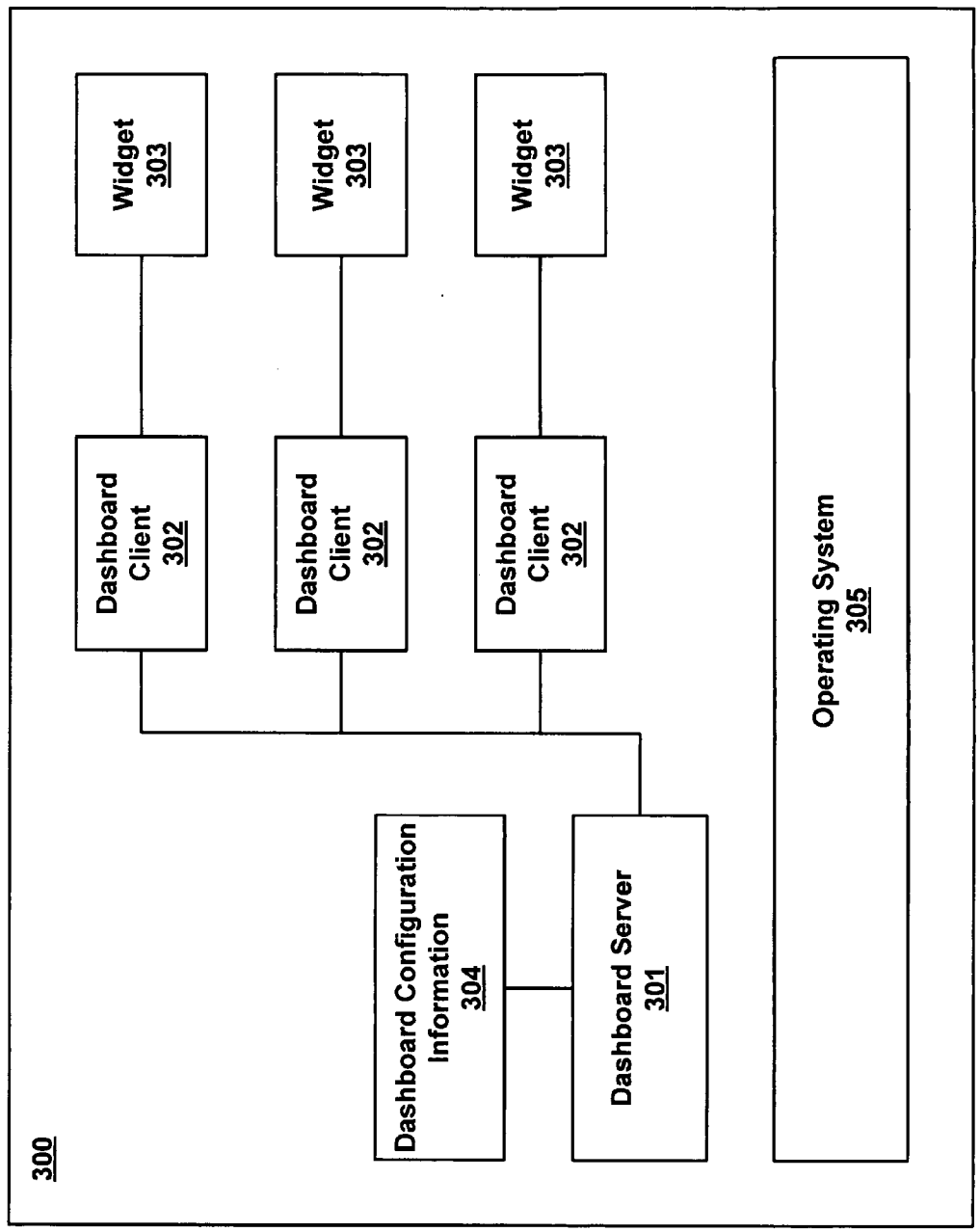
FIG. 3 is a block diagram of an exemplary software architecture for implementing multiple dashboards.

FIG. 3 is a block diagram of a software architecture 300 for implementing multiple dashboards. The software architecture 300 generally includes a dashboard server 301, one or more dashboard clients 302, one or more widgets 303, and operating system 305. The server 301 and/or clients 302 use dashboard configuration information 304 to specify configuration options for displaying the widgets 303, including access levels and the like (if applicable). Such configuration information can include information for two or more dashboards configured by the same user or by different users.

In some implementations, the widgets 303 are displayed using HTML and related web technology. The dashboard server 301 manages and launches the dashboard client 302 processes. Each dashboard client 302 loads a widget 303 (e.g., an HTML webpage) and related resources needed to display the page. In some implementations, the dashboard clients 302 display the widgets 303 without a conventional window frame, menu bar, or other components typically associated with on-screen windows. This technique provides a clean, straightforward display of the overall dashboard to reduce confusion and clutter. The dashboard clients 302 display their respective widgets 303 by rendering web pages into a "WebView," as described in U.S. patent application Ser. No. 11/148,010, entitled "Preview and Installation of User Interface Elements in a Display Environment." The size of each WebView is defined as metadata associated with the corresponding widget 303. The server 301 provides data for rendering a separate layer that can be overlaid on the normal desktop of the user interface (hereinafter also referred to as a "dashboard layer"). The widgets 303 are rendered into the separate layer which is drawn on top of the normal desktop, so as to partially or completely obscure the desktop while the dashboard is active.

Dashboard Server

The dashboard server 301 can be a stand-alone process or embedded in another process. The server 301 can be located at the computer 102 or at the remote server 107. In some implementations, the server 301 provides functionality for one or more processes, including but not limited to: non-widget UI management, window management, widget and dashboard management, fast login, event management, loading widgets, widget arbitration, Core Image integration and widget preference management, as described in U.S. patent application Ser. No. 11/148,010, entitled "Preview and Installation of User Interface Elements in a Display Environment."

Dashboard Client

In some implementations, a dashboard client 302 is a process that uses, for example, objects that are defined as part of a development environment, such as Apple Computer's Cocoa Application Framework (also referred to as the Application Kit, or AppKit) for the Mac OS® operating system. In some implementations, the dashboard clients 302 can be implemented as simplified browser screens that omit conventional interface features such as a menu bar, window frame, and the like.

Widget Format

In one implementation, each widget 303 is implemented as an HTML file. The HTML file can reference other local and remote resources such as style sheets (e.g., Cascading Style Sheets), other HTML files, JavaScript files, images, and the like. Widgets 303 can be implemented using, for example, a flat bundle file format or a packaged HTML file format. In some implementations, the Flat Bundle format includes an info.plist file.

The Info.plist files describes a widget 303 and provides an identifier for a widget 303. Table I provides an example of Info.plist file contents.

TABLE I

Example of Info.plist File Contents

| Key | Type | Description/Value |
| --- | --- | --- |
| CFBundleIdentifier | CFString | com.apple.widget <widget name> |
| CFBundleName | CFString | Name of the widget. |
| MainHTML | CFString | Name of main HTML resource. |
| Width | CFNumber | Default width of the widget. |
| Height | CFNumber | Default height of the widget. |
| DefaultImage | CFString | Resource name of default PNG file. |
| Plugin (optional) | CFString | Resource name of native plug-in. |
| AllowFileAccessOutsideofWidget | Boolean | Access to files across the file system; limited by the users permissions. |
| AllowFullAccess | Boolean | Access to the file system, Web Kit and standard browser plug-ins, Java applets, network resources, and command-line utilities. |
| AllowInternetPlugins | Boolean | Access to Web Kit and standard browser plug-ins. |
| AllowJava | Boolean | Access to Java applets. |
| AllowNetworkAccess | Boolean | Access to any resources that are not file based. |
| AllowSystem | Boolean | Access to command-line utilities using widget script object. |

The keys AllowFileAccessOutsideofWidget, AllowFullAccess AllowInternetPlugins, AllowJava, AllowNetworkAccess, and AllowSystem are Boolean types that can be set by a widget author to enable certain levels of resource access.

Dashboard Invocation

FIG. 4a depicts a desktop user interface 400 prior to activation of a dashboard. The desktop user interface 400 (also referred to herein as "desktop") is a conventional user interface as may be provided by an operating system, such as Mac OS®. The desktop 400 has a background image, menu bar 401, and other standard features. As is known in the art, the desktop 400 may also include windows, icons, and other elements (not shown). The user activates the dashboard by selecting an item from a menu, or by clicking on an icon, or by pressing a function key or key combination, or by some other means for invoking activation.

Figure 4B:
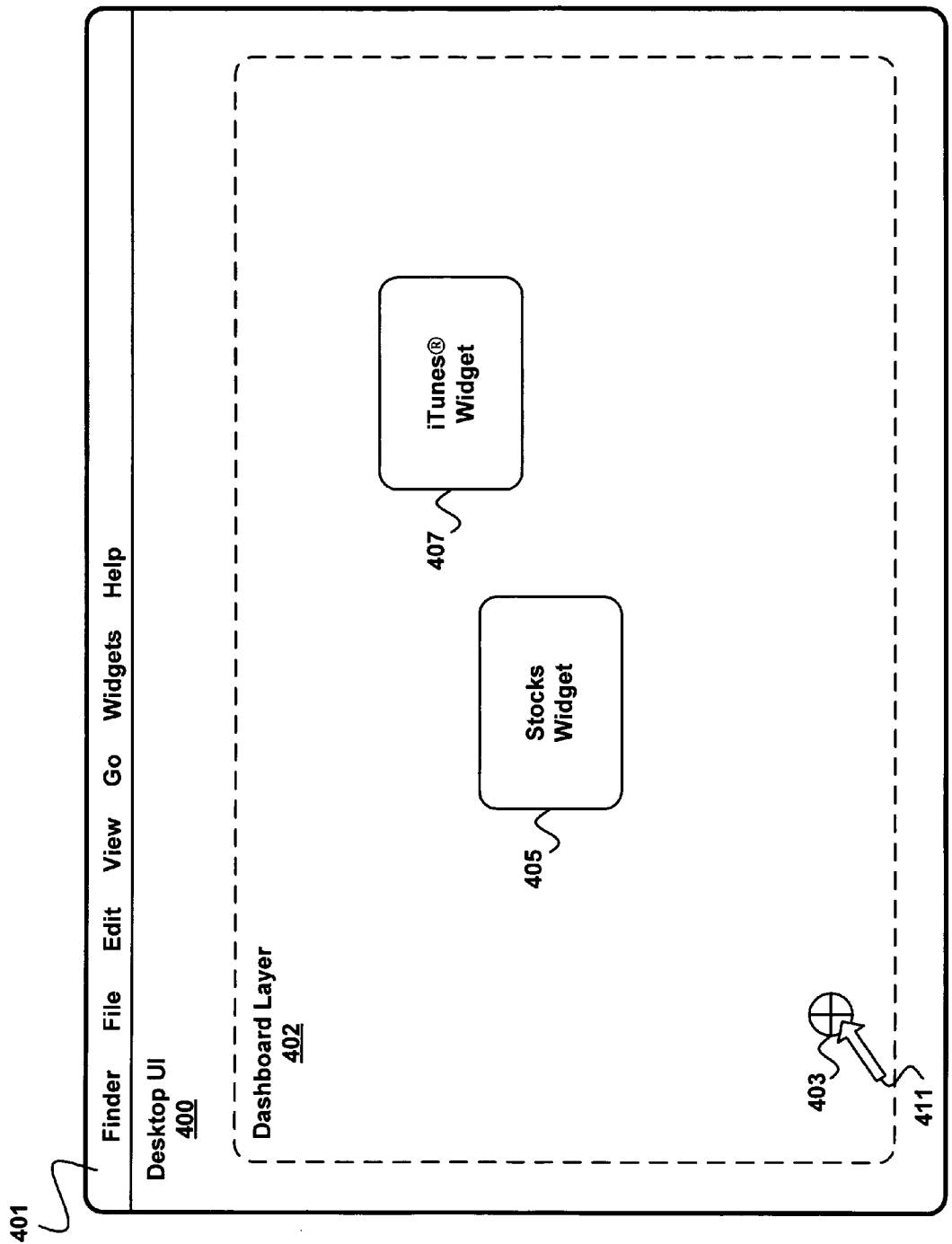
FIG. 4b is a screen shot depicting an exemplary initial state for a dashboard.

FIG. 4b depicts an initial state for a dashboard layer 402. In some implementations, a configuration bar icon 403 is initially displayed. Alternatively, upon activation the dashboard layer 402 can display one or more default widgets 405, 407. If the dashboard layer 402 has previously been activated and configured, the widgets 405, 407, can be displayed as previously configured. As shown in FIG. 4b, the dashboard layer 402 is not necessarily visible as a distinct layer. However, its various components (such as widgets, icons, and other features) are visible. In some implementations, these components are displayed in a transparent layer, thus maintaining the visibility of the desktop 400 to the user. In some implementations, the desktop 400 and its components are darkened (or blurred, or otherwise visually modified) while the dashboard layer 402 is active, so as to emphasize that the desktop 400 is temporarily inactive. In other implementations, the desktop 400 is not visible while the dashboard layer 402 is active. The user can reactivate the desktop 400 and dismiss the dashboard layer 402 by clicking on an area of the screen where no dashboard element is displayed (i.e., "negative space"). In some implementations, other commands, key combinations, icons, or other user input can be used to dismiss the dashboard layer 402.

Figure 4C:
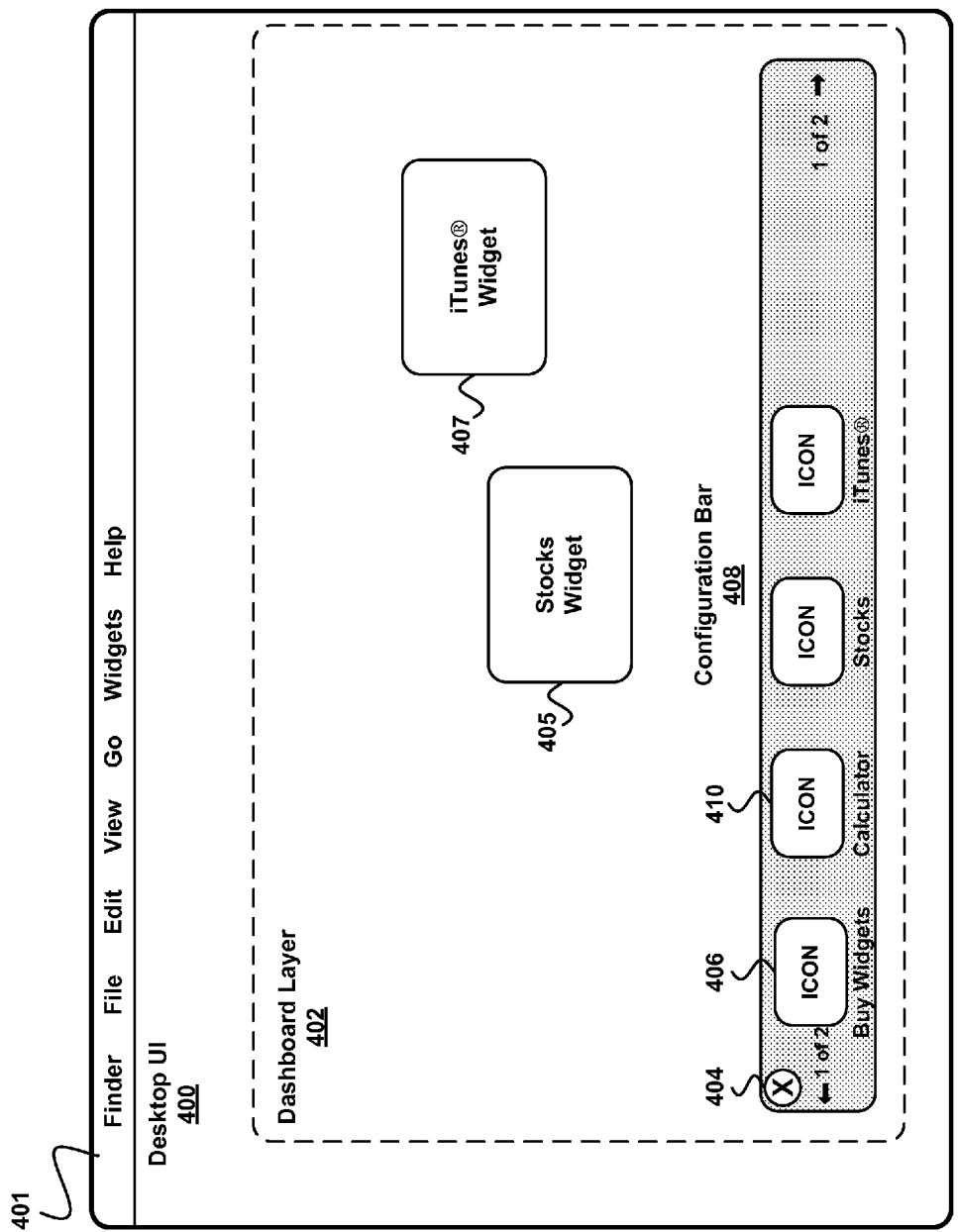
FIG. 4c is a screen shot depicting an exemplary configuration bar for a dashboard.

In some implementations, the user can drag the icon 403 to any location on the screen, and the position of the icon 403 will remain persistent from one invocation of the dashboard layer 402 to the next. The user can click on the icon 403 to activate the configuration bar 408, as shown in FIG. 4c. The configuration bar 408 provides access to various widgets that can be placed on the dashboard. In some implementations, a text label is shown for each available widget (e.g., calculator, stocks, iTunes®, etc.). In some implementations, an icon is shown for each available widget (e.g., calculator icon 410). If many widgets are available, the widgets may be arranged hierarchically by type (e.g., game widgets, utility widgets, etc.), or alphabetically, or by any other categorization methodology. For example, a number of categories may be displayed, and clicking on one of the categories causes a pull-down menu to be displayed, listing a number of widgets in that category. In some implementations, a buy widget 406 is also available, allowing the user to select widgets from an online store or website.

Note that the particular configuration and appearance of configuration bar 408 in FIG. 4c is merely exemplary, and that many other arrangements are possible. For example, widgets can be installed from other locations, other applications or other environments, without requiring that they first be part of the configuration bar 408. The user can dismiss the configuration bar 408 by clicking on dismissal button or icon 404.

Alternative Implementation of Configuration Bar

Figure 4D:
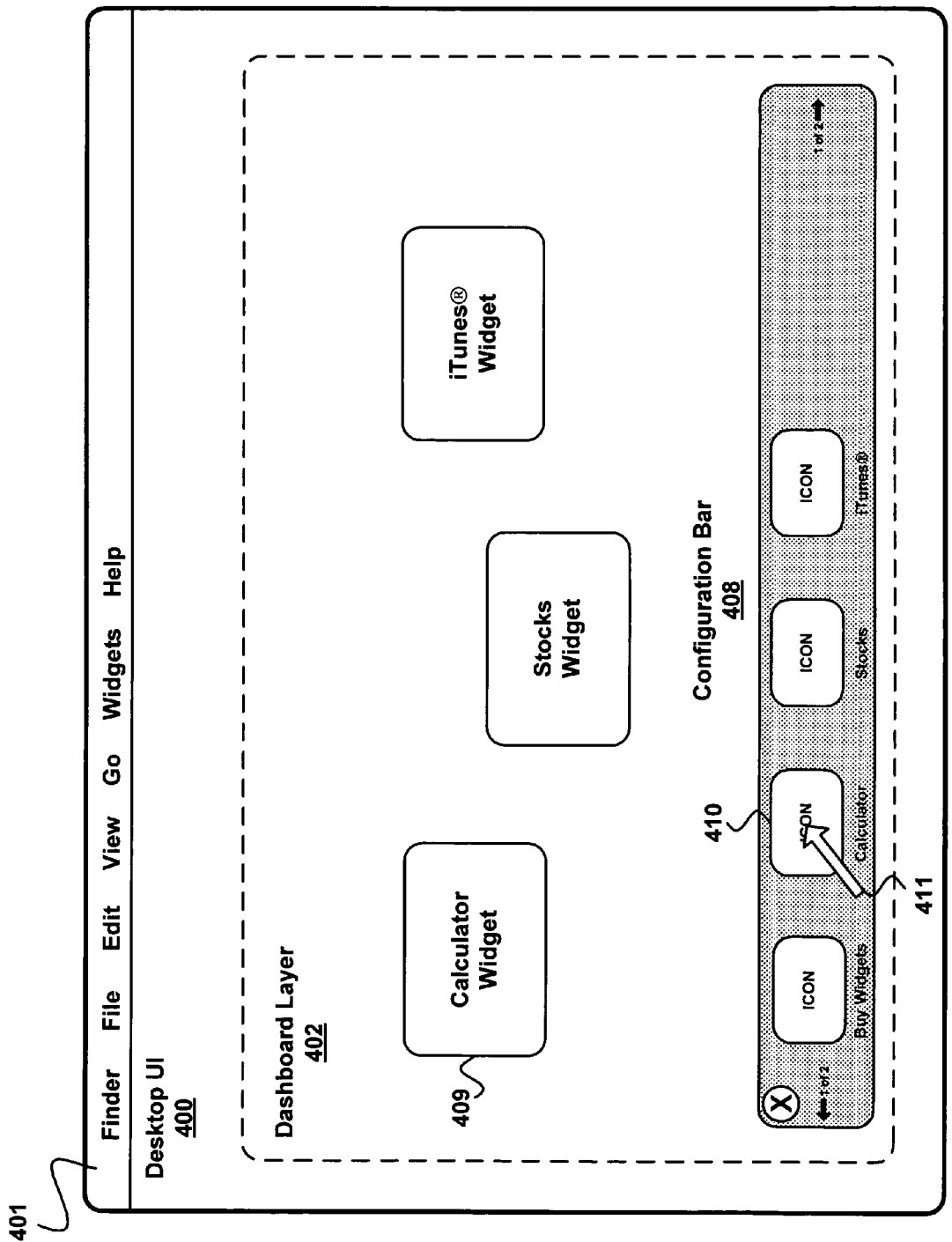
FIG. 4d is a screen shot depicting user selection of a widget from the configuration bar shown in FIG. 4c.
Figure 4E:
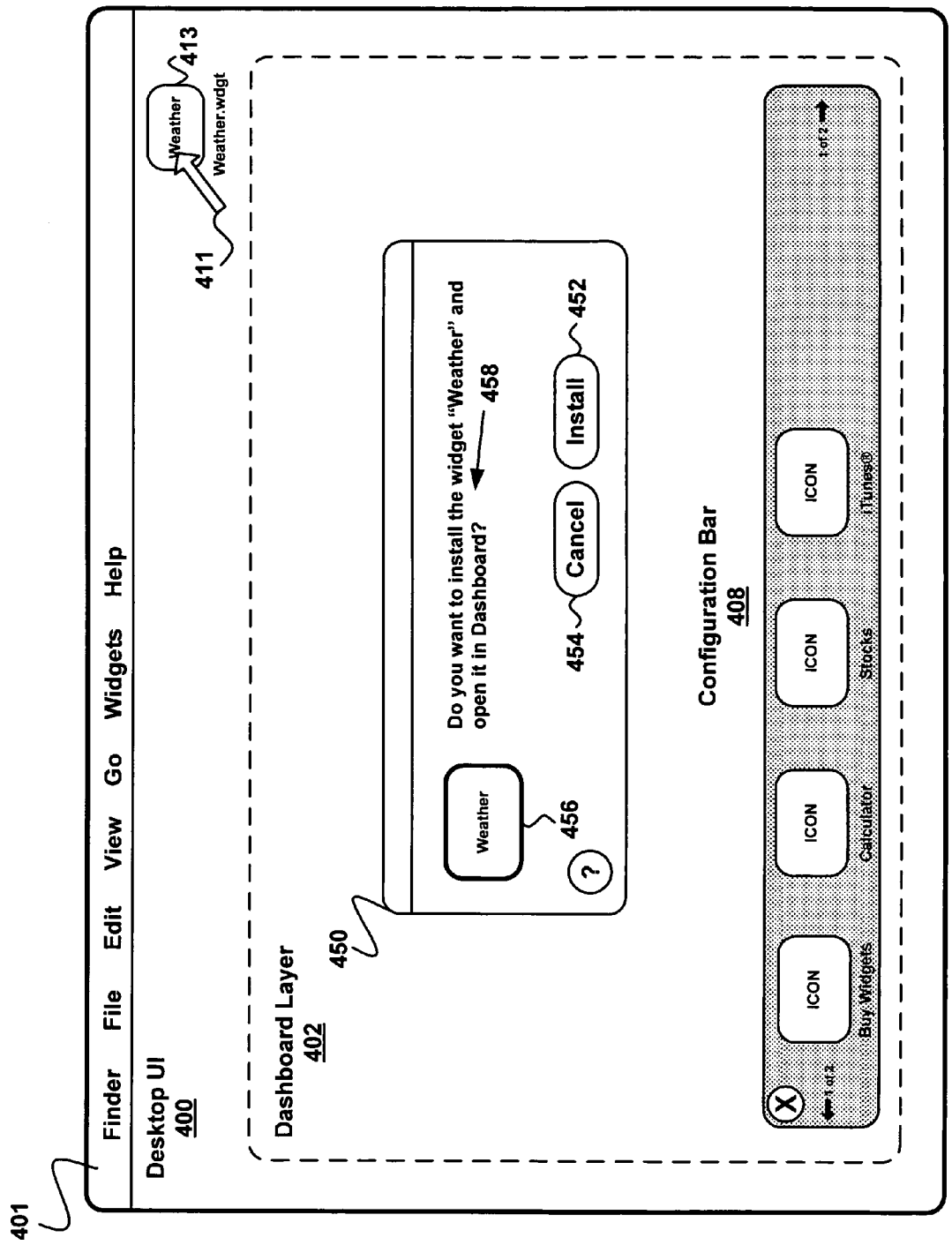
FIG. 4e is an exemplary screen shot depicting an installation confirmation.
Figure 4F:
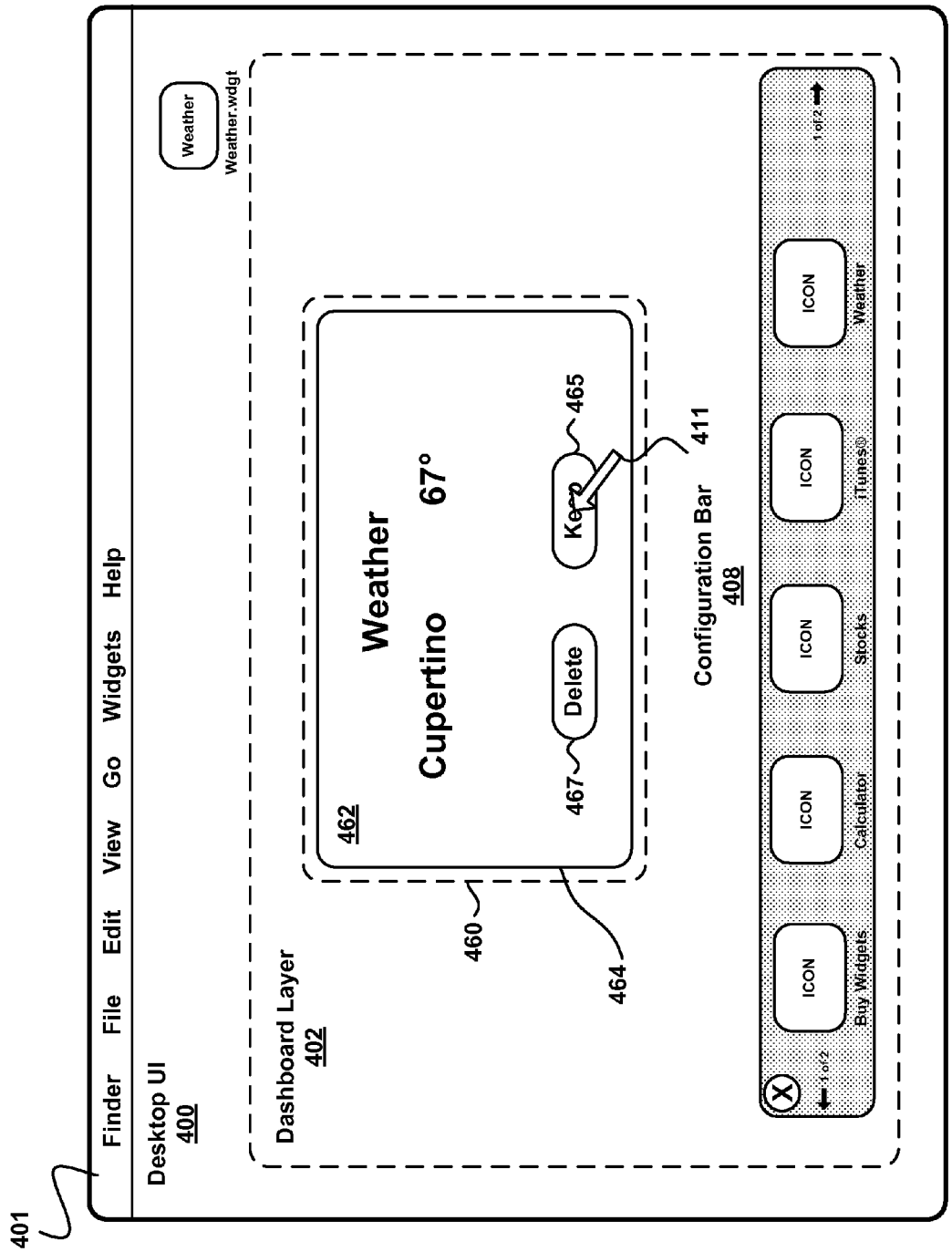
FIG. 4f is an exemplary screen shot depicting a preview of a user interface element that has been selected to be installed.
Figure 4G:
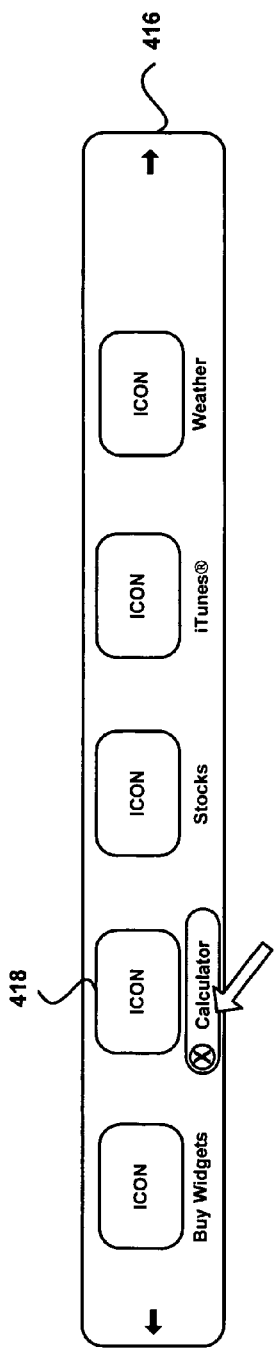
FIGS. 4g-4i illustrate deletion of widgets from a configuration bar.
Figure 4H:
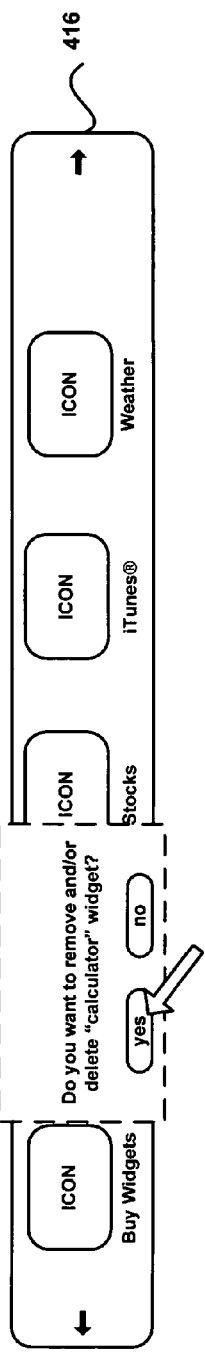
Figure 4I:
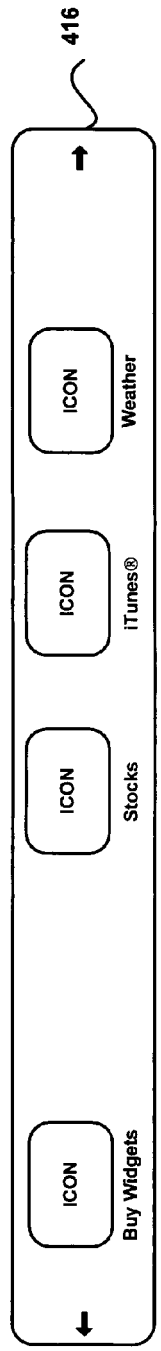

FIGS. 4g-4i illustrate an alternative implementation for deleting a widget from a configuration bar 416. For example, when a user moves a cursor onto the "calculator" label (e.g., a mouse-over) associated with a calculator widget 418, the label is highlighted or otherwise altered, and a delete mechanism (e.g., a delete button) is displayed. If the user clicks or otherwise invokes the delete mechanism, a confirmation overlay 420 is displayed asking the user to confirm the removal and/or deletion of the "calculator" widget. In some implementations, the confirmation overlay 420 is semi-translucent. If the user requests deletion (e.g., clicking the "yes" button), then the calculator widget 418 is removed from the configuration bar 416, as shown in FIG. 4i.

Installation of Elements

Elements, including user interface elements such as widgets can be installed in a display environment as discussed below. One display environment, a dashboard, will be used for illustrative purposes. Installation can include a preview operation as is discussed below. Installation can include selection of the element, such as by a drag and drop action. Other selection means can be used. In one example, a user can drag widgets from configuration bar 408 onto the surface of the dashboard (in other words, anywhere on the screen), using standard drag-and-drop functionality for moving objects on a screen.

FIG. 4d depicts the selection of the calculator widget icon 410 from the configuration bar 408. The calculator icon 410 which is associated with a calculator widget 409 is highlighted, or otherwise augmented or embellished, to indicate that it has been selected by a user with cursor 411.

In some implementations, widgets in the configuration bar 408 are smaller than their actual size when installed. When the user clicks on a widget and begins to drag it into a dashboard or other display environment, the widget is animated to its actual or installed size to assist the user in the real-time layout of the dashboard. By animating the widget to its actual size, the user will know the actual size of the widget prior to its installation.

In some implementations, an animation, such as a ripple animation, is shown when the user "drops" a widget by releasing a mouse button (or equivalent input device) to place a widget at the desired location. In one implementation, the dragging of the widget to the dashboard layer 402 invokes an installation process for installing the widget including previewing. After installation, the user can move a widget, to any other desired location, or can remove the widget from the screen, for example by dragging it off the screen, or dragging it back onto the configuration bar 408, by invoking a remove command, disabling a widget in a menu associated with a widget manager or canceling the installation during the preview, as described with respect to FIGS. 5, 6 and 7. In some implementations, the position, state, and configuration of a widget are preserved when the dashboard layer 402 is dismissed, so that these characteristics are restored the next time the dashboard layer 402 is activated.

In some implementations, widgets and/or dashboard layers (including widgets) can be installed from within a running application. For example, a widget and/or dashboard (including widgets) can be an attachment to an email. When the user clicks the attachment, an installation process is invoked for the widget and/or dashboard which can also include a preview.

Widgets can be created or instantiated using an installer process. The installer process can include a separate user interface or an integrated user interface (e.g., integrated in the display environment or separate from the display environment, for example, in another display environment associated with another application, such as an email application) for selecting and installing widgets in a display environment. For example, a widget received as an email attachment can be launched by a user from directly within a user interface of the email application.

Widgets can be created or instantiated using an installer process. The installer process can include a separate user interface or an integrated user interface (e.g., integrated in the display environment or separate from the display environment for example in another display environment associated with another application, such as an email application) for selecting and installing widgets in a display environment. Thus, the installation area for the widget can be embedded within an application display area or window. For example, if a user receives a widget as an attachment to an email, the user can invoke and install the widget from within the email message window without the need for a separate installation window.

In general, an installer process is used to provide additional functionality to the creation/instantiation process, beyond the simple drag and drop operation describe above. Additional functionality can include preview, security and deletion functionality in a singular interface. The installer process can be a separate process or combined in another process. The installer process can itself be a separate application that is executable to install widgets (or other elements) in a display environment. As used herein, the term "process" refers to a combination of functions that can be implemented in hardware, software, firmware or the like.

Installer Process Engines

Figure 5:
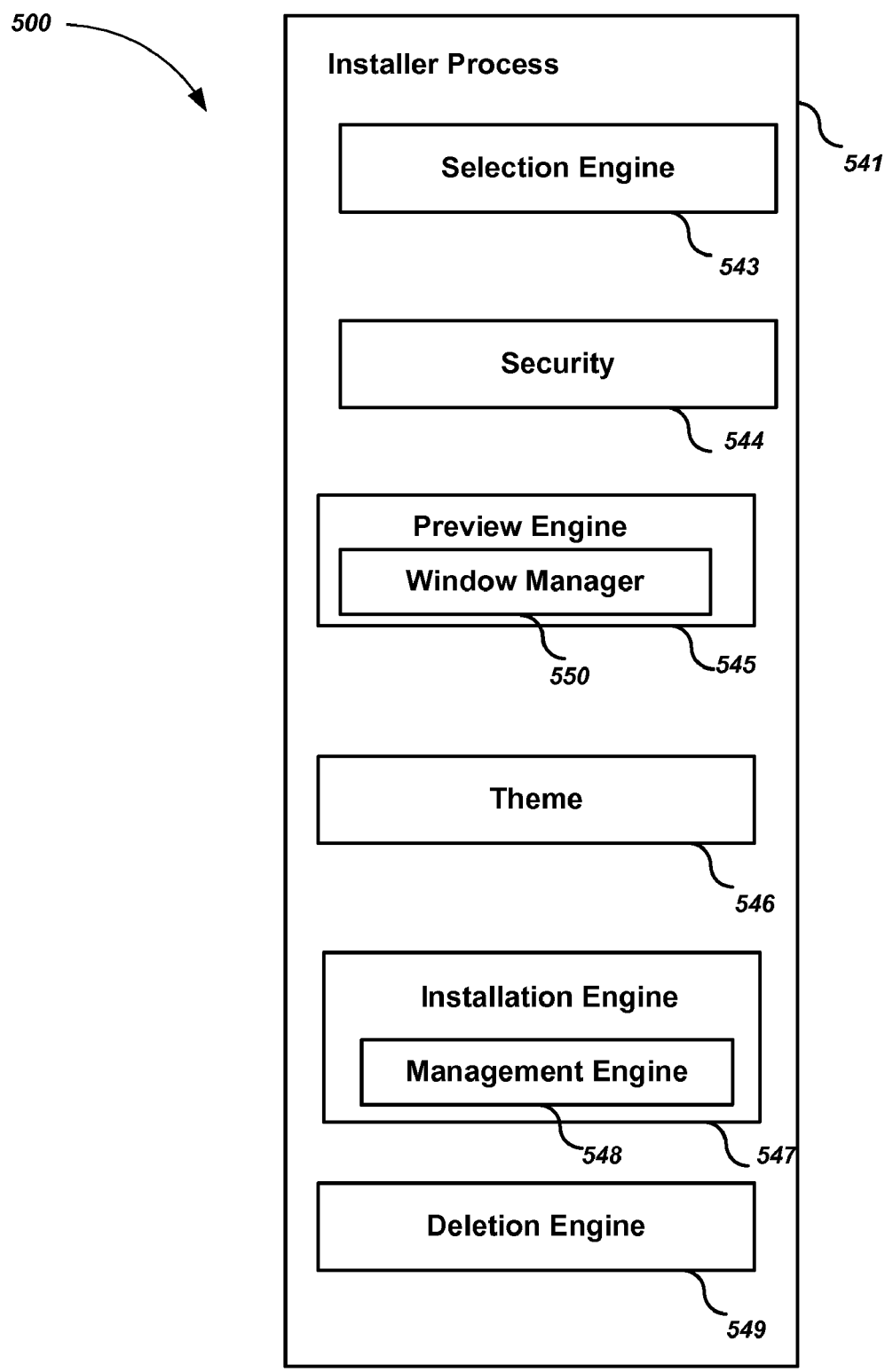
FIG. 5 is a block diagram of an exemplary installer process.

FIG. 5 is a block diagram of an installer process 500 for installing widgets in a display environment, including a selection engine 543, a security engine 544, a preview engine 545, a theme engine 546, an installation engine 547, and a deletion engine 549.

Selection Engine

The selection engine 543 is used to select and present (e.g., a static presentation) a widget for installation. The selection engine 543 can be invoked in a display environment and can produce an installation area (e.g., a dialog, a panel, a window, etc., and hereinafter referred to as an "installation window"), that acknowledges the user's initiation of the installer process. The installation window can include a presentation of a selected widget (or a reference thereto as described below), along with various buttons that may be activated by the user or otherwise to invoke functionality in the installer process.

A screen shot showing an installation window 450 in a user interface is shown in FIG. 4e. Installation window 450 can include one or more interactive features (e.g., buttons) that allow a user to install (e.g., install button 452), or cancel the operation (e.g., cancel button 454). In some implementations, preview is automatic. Alternatively, preview can be selected for enablement prior to installation. Installation window 450 can include a reference 456 and a prompt 458, as described below.

In some implementations, the installation window 450 is invoked by clicking on a widget file or package. For example, a weather widget file 413 (e.g., "weather.wdgt") can be downloaded to the desktop 400 from a web site. When the user double clicks the "weather.wdgt" file with cursor 411, the installation window 450 is displayed in the dashboard layer 402, as shown in FIG. 4e.

In some implementations, a user can select a widget for installation using a remote control device (e.g., infrared device, mobile phone, etc.). For example, a dashboard and/or widgets can be displayed on a display device (e.g., television screen, computer monitor, etc.). The user can use the remote control to select widgets from a menu or configuration bar 408 for installation. The widgets can be displayed in one of multiple resolutions, which is selectable by the user via the remote control. For example, a user can select a widget to be scaled to fit a desired portion of the display device (e.g., full screen).

Security Engine

The security engine 544 is used to determine a security access level (or risk level, or both) for either the user or the element to be installed. Security engine 544 can be used to limit the ability of the user to install particular kinds of elements (e.g., based on categories or criteria). In addition or alternatively, security engine 544 is used to determine a security access level (or risk level or both) of an element to be installed. Based on the security access/risk level, one or more operational or functional constraints can be placed on the element during the preview process. For example, limitations on the ability of the previewed element to interact, access, read or write data, monitor output of other system resources, access other system resources, or other limitations can be invoked. The invocation can be temporary, for a predetermined time period, or until the preview has terminated and complete (non-limited) installation has been performed. Functionality or operations of the element can be enabled or disabled, depending on the access level. The security engine 544 can use metadata associated with the element to be installed, user input, contextual information, file type information, default data, read/write preferences, cookies and/or other information to determine the access/risk level. Access control lists including white lists (e.g., including lists identifying certified or otherwise safe elements), black lists (e.g., including lists identifying un-certified or otherwise un-safe elements) and the like can be used to determine the access/risk level.

In some implementations, widgets are rated according to their content (e.g., adult content, violence, strong language, etc.). The rating can be determined by the author a third party rating organization. The rating can be used to determine whether a widget will be installed and/or previewed. In some implementations, users can specify which widgets can be installed and/or previewed based on ratings. For example, a parent may specify via a preference pane or other input mechanism that widgets containing adult content ratings will not be installed nor previewed (i.e., parental controls).

In some implementations, widgets are digitally signed by their authors. Digital signatures can be incorporated in files bundled with the widget and can be generated using one or more known digital signature techniques (e.g., key exchange, hashing, message digest, etc.). The digital signature can also be authenticated using a digital certificate issued by a certificate authority using techniques known in the art.

Various techniques for widget security is described in U.S. Provisional Patent Application No. 60/730,956, entitled "Widget Security."

Preview Engine

The preview engine 545 is used to preview (e.g., dynamically) an element (e.g., a widget) that has been selected to be installed. Referring again to FIG. 4f, the preview engine 545, when invoked, provides an area (hereinafter "a presentation area or presentation window 462" or specifically a "widget window" when used to display a widget) into which the selected element can be displayed. In some implementations, the presentation window 462 is a separate process and embedded within an underlying installer window (i.e., the installation window 460) which, in one implementation, is itself a separate process. In one implementation, the preview engine 545 provides a presentation of a fully functional element/widget in the presentation window 462. The term "fully functional" refers to both the presentation of the widget in terms of size, shape, content and the like along with any supported interactivity features. Alternatively, limitations on the functionality, interactions and the like can be set by the security engine 544 as discussed above. Interactivity can include the separate refreshing of content in the presentation window 462. Alternatively, the content can be static, and only present ornamental properties.

Associated with the preview is a preview designator 464. In one implementation, the preview designator 464 is displayed along with the user interface element being installed (e.g., widget). The preview designator 464 can be of the form of a frame, a carpet on which the presentation window 462 is disposed, a preview theme element, or other designator that overlays, surrounds, bounds or otherwise is associated with the presentation window 462. The preview designator 464 can be a separate process and embedded within an underlying installer window (e.g., the installation window 460) or the presentation window 462 which, in one implementation, may themselves be a separate process. The preview designator 464 is provided to indicate to a user that the element is being previewed and, as of yet, has not been fully installed in the display environment. Further emphasis can be used to convey this information including by using highlights, emphasis, de-emphasis, effects, transitions and the like. The combination of the presentation window 462 and the preview designator 464 comprise an installation area for the user interface element to be installed. The installation area can be part of the display environment in to which the element is to be installed (e.g., part of the dashboard) or part of a separate display environment (e.g., part of another user interface, another user interface element, another application, or process, etc.).

When displaying a fully interactive widget in the presentation window 462, user input can be accepted that can result in changes in the presentation. For example, if the widget includes a URL that may be linked to, interaction can include the generation of an underlying page request and the presentation of the requested page in the presentation window 462. Interaction with user interface elements is described in U.S. patent application Ser. No. 11/145,561, for "Application Clipper." If the interaction is not allowed, a display prompt can be shown to indicate that the operation or function is temporarily disabled during the preview operation.

Window Manager

In some implementations, a window manager 550 is associated with the preview engine 545. The window manager 550 can be a separate process that is used to support the interaction between the presentation window 462, preview designator 464 and the installation window 460 described above. In some implementations, the logic associated with the window manager 550 can be implemented in a same or separate process from the installer process or the preview process. In some implementations, the window manager 550 controls the interaction of the respective windows. Specifically, three separate interactions can be controlled.

First, in some implementations, each window is a separate process displayed and brought forward (in a window hierarchy) together. The bringing together of the multiple distinct windows, each associated with separate processes can be controlled by the window manager 550.

Second, in some implementations, the presentation window 462, preview designator 464 and the installation window 460 are required to interact with each other in predefined ways. For example, the presentation window 462, preview designator 464 and the installation window 460 need not only to be brought forward together, they must also be controlled when interactions are required for the windows once displayed. For example, if one window is moved, i.e., using a drag and drop operation, the multiple windows are managed so that the presentation remains unified (i.e., the presentation window 462 and preview 464 designator are maintained within the installation window 460, though the installation window 460 was the process that received the user interaction to move). To accomplish such, window manager 550 provides an interface between the windows to allow for the receipt of input in one process and the translation to the other process.

Third, in some implementations the windows must be maintained within operating constraints of each underlying process. For example, when one window is resized (i.e., the installation window 460 is resized), the window manager 550 controls the relative presentation of the other windows (continuing this example, when the installation window 460 is resized, the presentation window 462 and preview designator 464 may be repositioned to be centrally displayed in the installation window 460). Note, this third level of management includes management of process constraints. Process constraints include limitations on the changes that can be performed within the context of the installer process for any of the windows. For example, a minimum size constraint can be associated with the underlying presentation window 462, such that resizing of the associated installation window 460 can be constrained to not be so small as to be unable to present the minimum sized presentation window 462 in the newly downsized installation window 460.

The preview engine 545 is responsive to an initiation signal/action and provides the display of the selected widget in a presentation window 462 as described above (see FIG. 41). Associated with the presentation window 462 can be one or more input mechanisms (e.g., buttons) that allow a user to continue in the installation process (e.g., a keep or install button 465), or cancel the installation process (e.g., delete button 467). In some implementations, if the installation process is cancelled, the presentation process terminates and returns control to the prior operative environment (i.e., return to the initiating point, for example, reinitiating the selection process).

In some implementations, the installer process does not include or allow for the selective bypassing of the preview presentation (e.g., bypass preview or does not include the preview engine 545). In some implementations, the preview engine 545 is itself a separate process or application (e.g., can be separate from the installer process 541). In some implementations, the preview engine 545 is itself a user interface element (e.g., a preview widget) that can be used to preview widgets prior to installation, deployment, instantiation, or the like.

Theme Engine

Theme engine 546 is operative to provide additional content to accompany the content displayed in the presentation window or installation window. The theme engine 546 is operative to determine a theme to be associated with an item to be installed (e.g., a widget), identify additional content for concurrent display, and facilitate the display of the additional content. Additional content can be of the form of a frame that is used to bound the item to be installed on one or more sides. Examples of additional content include a picture frame, a content player (e.g., a video player, a still image player, etc.). The additional content can be static or include functional elements (e.g., buttons, for example to play content). Alternatively, the additional content can be displayed in an overlay or other overlapping manner, be a separate process or window or be part of the presentation window. The additional content can be stored or retrieved as required. The identification of the additional content by the theme engine 546 can be based on meta-data that accompanies the item to be installed, based on an analysis of the item to be installed, automatically defined based on file type (e.g., all .pic files are provided a picture frame, or all preview files are provided with a preview frame). Themes can be assigned by a user after receipt or prior to transfer to a receiving party.

Installation Engine

The installation engine 547 is operative to install/instantiate the selected widget in the display environment. The installation engine 547 can copy or move as required the selected widget to an appropriate volume and store the data structures (including preference data, identification data, scripts, navigation data and the like) for use in the display environment. In some implementations, the installation engine 547 includes an automatic invocation of the underlying display environment with the installed user interface element presented (i.e., the installation engine 547 installs the widget in, and opens up, a dashboard including the installed widget in a preview mode). In some implementations, the installation engine 547 include a management engine 548.

Deletion Engine

The deletion engine 549 provides control for widgets after installation. The deletion engine 549 can be a separate process from the installer process 541, or included therein. The deletion engine 549 can receive input and display user interface elements (dialogs and the like) to ensure that deletion operations are effectuated as required. The deletion engine 549 can be responsive to the selection of a user interface element, a portion of the element, controls associated with the element and the like.

In some implementations, the deletion engine 549 receives mouse over input and displays a graphical element associated with a given identified element. The graphical element can include a control that allows for the activation of the deletion engine. The activation can cause the display of a window (e.g., a confirmation window) to ensure appropriate behavior. Other methods for deleting user interface elements are possible. For example, deletion of a user interface element can also be effectuated during the installation process as discussed above. More specifically, a user interface element can be previewed using the preview engine 545, and subsequently deleted prior to full installation.

Deletion can include deactivating a user interface element and leaving its associated files on the host system or device, or deleting the user interface element and removing all its associated files from the host system or device. The user can be prompted to confirm deletion of a user interface element before deletion is initiated.

In some implementations, the installer process 541 is part of a separate process that is not associated with a dashboard layer. Alternatively, the installer process 541 can be part of a dashboard application and be activated, by for example, by selecting a widget for addition to the dashboard layer. Selection can include for example double clicking on a widget displayed in a configuration bar 408 (shown in FIG. 4*c*). Other installation tools are possible. For example, a widget bar (not shown) can be used to display the widgets that are available for installation in a given display environment. The widget bar can be part of an authoring application for the creation of widgets, or be selectively activated. Alternatively, the installer process 541 can be separately called, with the destination of the widget being defined as part of the application (e.g., into a dashboard environment, a desktop environment, an electronic display device environment, or the like).

Dashboard Environment

In a dashboard environment, installer process 541 can include a widget bar and an associated installer process. The installer process when invoked can cause the display of the widget bar in the user interface. In one implementation, the dashboard layer itself, as currently configured can also be displayed when the installer process is invoked. The installer process can then be invoked to select available widgets for installation from the widget bar, preview widgets, or remove installed widgets (e.g., remove widgets from the widget bar) depending on the configuration of the installer process.

Desktop Environment

In a desktop environment, installer process 541 can be of the form of an installer application that can be invoked (automatically, by the user, by the operating system, by an application or other invocation tool) to present user interface elements that are available to be installed in the desktop environment. The installer application can include a user interface element bar and an associated installer process. The installer process when invoked can cause the display of the user interface element bar in the user interface. The installer process can then be invoked to select available user interface elements for installation from the user interface elements bar, preview user interface elements, or remove installed user interface elements (i.e., remove user interface elements from the user interface elements bar) depending on the configuration of the installer process.

Installation Process

Figure 6:
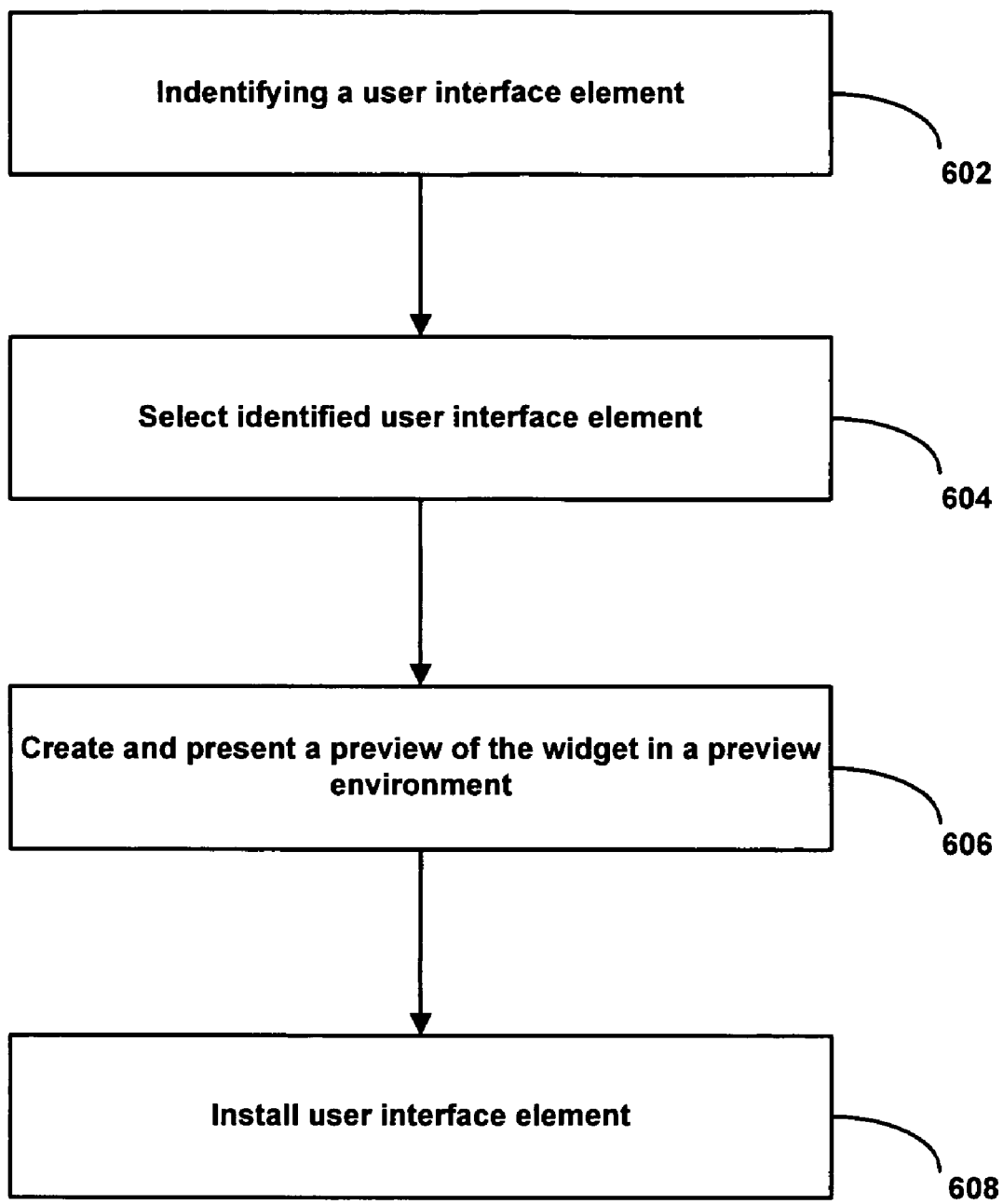
FIG. 6 is a flow diagram of an exemplary process for installing a user interface element in a display environment.

FIG. 6 is a flow diagram of a process for installing a user interface element (e.g., a widget) in a display environment. The process includes identifying a user interface element (602). Identifying the user interface element can include locating a widget. Locating can include using a search tool or the like to locate widgets available for installation. Alternatively, other methods can be used for identifying user interface elements for installation including automatic and user controlled identification methods.

After identification, the identified user interface element is selected for installation (604). Selecting a user interface element can include selecting a user interface element from a configuration bar (e.g., configuration bar 408), a widget bar, a tool bar, a menu, an authoring application, or other source. Alternatively, selecting can include dragging or dropping the user interface element onto a display environment (e.g., a dashboard layer), downloading the user interface element from a content source or other source, or other selection process. Selecting can include launching an associated installation process for installing the user interface element, a preview application for previewing the user interface element prior to installation or other application including authoring applications. The launching of the applications can be automatic or user or otherwise selectively controlled.

Upon receipt of the selection, an installation window is presented (e.g., installation window 460). In some implementations, the installation window includes a user interface display portion, a prompt, and one or more interactivity elements. The user interface display portion can include a reference, partial display, or complete (e.g., complete but for the ability to interact, a static display) display of the user interface element that has been selected. The reference (e.g., reference 456) can be a complete reference, a pointer, a designator, a still image, or otherwise that identifies the candidate user interface element for installation. In this way, the user is able to recognize that the selection made corresponds to content (e.g., a widget) that the user desires to install.

The prompt can be of the form of a confirmation to the user of the underlying action (e.g., prompt 458). In one implementation the prompt can be used to confirm a desire to install a named widget. In other implementations, the prompt can be used to confirm not only the named user interface element for installation, but the display environment into which the user interface element will be installed (e.g., "Install named widget #1 on my desktop?" or "Install widget #1 on dashboard #1 of 2?"). In still other implementations, the prompt can include a confirmation of an action (e.g., "install the widget and open it in my dashboard").

The interactivity elements can be of the form of buttons or the like. In one implementation, the installation window includes two interactivity elements including a cancel element (e.g., a cancel button 454), and an installation element (e.g., an installation button 452). Other interactivity elements are possible, including those that link to other associated applications, content sources (e.g., to allow for the selection of a different widget for installation), preview option (e.g., if not automatically previewed) and the like.

Continuing with the method, if a preview option is selected or required (optional), then a preview of the widget in a preview environment is created and presented (606). The creation of the preview environment can include the invocation of a window management engine (e.g., window manager 550) for managing the interaction of one or more windows that make up the preview. In some implementations, the preview includes a presentation window (e.g., presentation window 462) and a preview designator (e.g., preview designator 464) that are separate processes. The presentation window is used to display an instantiation of the selected widget. In some implementations, the display of the presentation window includes an instantiation of the selected widget in a selectable interactive environment. The preview designator is provided to clearly indicate that the preview operation is being performed, as opposed to a conventional direct installation. In some implementations, the preview is presented at a same location in the user interface. Alternatively, if other elements are present at this location, another location or an temporary overlay can be used. In some implementations, the preview designator 464 is a carpet, onto which the presentation window 462 is laid (e.g., layered, overlaid, or the like).

In some implementations, theme content can be presented along with the user interface element in the preview installation window 460. The theme content can include a theme presentation element that operates as the preview designator (e.g., additional content that is recognized as being part of a preview of an item, for example a preview Title or the like). Other theme content can be presented to preview how the final installed version of the user interface element will appear. For example, assuming a theme border is to be presented with the user interface element at installation, the preview can include the same theme border.

Associated with the preview process may be an authoring or selection process. For example, if the preview displayed is not satisfactory to a user (e.g., the theme content is unsatisfactory), an interactivity element can be presented in the user interface to allow the direct launching of another process (e.g., a search process or application, an authoring application, a selection application or other process or application so that a more appropriate/desirable user interface element can be located/installed) with or without terminating the installation process.

Finally, the user interface element can be installed (608). The installation of the user interface element can include the installation on a tool bar (e.g., a widget bar), in a resource, in a widget manager or in a display environment (e.g., directly on a dashboard layer or the desktop). Installation can include the saving of the underlying content metadata including data structures defining the user interface element in a library or the like. Alternatively, the installation can be part of an underlying application (e.g., directly in an associated dashboard application or a library associated therewith). In some implementations, the installation of the user interface element includes the removal of the preview designator. For example, where a carpet is used to designate the preview, the carpet can be removed for the final installation. In one implementation, the final installation is performed at a same location in the user interface as the preview. In some implementations, an animation or other transition effect can be used when moving from preview to final installed user interface elements. Transitions can include the appearance of pulling of the a carpet preview designator from under the user interface element or otherwise making the carpet disappear.

The process steps described can be performed in other orders, repeated or the like to provide desired results. For example, the preview process can be repeated in association with the selection of multiple different user interface elements prior to invoking the installation step.

Once installed, user interface elements can be removed/deleted from the display environment as required. In some implementations, a separate deletion process is provided from the installation process. Alternatively, the installer process can be invoked to remove/delete user interface elements as required.

In some implementations, deletion includes deactivating the widget but the widget remains installed on the system or device. Alternatively, deletion includes removing the widget completely from the system or device. If a request to delete a widget is received in response to a user action (or programmatically by the operating system or another application), then a message providing the user with deletion options can be presented, enabling the user to determine whether the widget will be deactivated and/or removed from the system or device. In some implementations, the system or device executes a default deletion option which can be changed by the user via a preference pane or other input mechanism, or overwritten by an application or other software component or device (e.g., security engine 544).

Widget Searching

In some implementations, widgets are associated with a widget data type or other metadata to enable a search engine (e.g., Apple's Spotlight® search engine) to search for widgets in files, documents, images, emails, applications, etc. Widgets can be indexed based on data type and/or other metadata. For example, a query can be generated requesting a list of all widgets on a host machine and/or devices on a network. The search engine accesses the index to locate widgets on the host device and/or network devices.

In some implementations, dashboards can be searched by other dashboards and/or a search mechanism (e.g., a search engine) for particular widgets or for other dashboards. For example, a query can be generated programmatically or by user requesting a list of all widgets and/or dashboards related to a particular user interest which are available for access locally or through a network connection.

Widget Manager

In some implementations, a widget manager allows users to inspect, remove, enable, disable, show and hide widgets. The widget manager can be a preference pane, a standalone application or a plug-in. The widget manager displays widget information, including but not limited to the widget's title, author, version, class, type, ratings, description, etc. The information can be displayed in any order and format according to one or more sorting criteria, such as alphabetical or chronological order, author, class, rating, etc. In some implementations, the widget manager tracks widget updates and automatically notifies the user or host system or device when an update is available.

In some implementations, the widget manager allows users to perform certain actions on widgets, including but not limited to copying, moving, deleting, uninstalling, deactivating, enabling, disabling, renaming, previewing, showing, hiding etc. In some implementations, the widget manager includes functionality that allows the import and export of widgets to and from various widget sources (e.g., network, email, CD ROM, etc.). For example, widgets can be imported and exported to and from a web site that can be accessed by multiple users. In some implementations, the widget manager includes a search field that allows users to search for widgets on a host system or device, and/or one or more networked devices.

In some implementations, the widget manager can be invoked by a button or other input mechanism located in a user interface (e.g., desktop, system tray, dashboard layer, configuration bar, etc.). For example, when the button is activated, the widget manager is launched and a user interface is displayed. In some implementations, the widget manager is a widget itself and includes at least some characteristics, attributes or properties of other widgets. For example, the widget manager can be enabled or disabled, resized, hidden, dragged and dropped, flipped to reveal special options or preferences, etc.

In some implementations, the widget manager can be displayed in a format that is consistent with a dashboard theme or content. The appearance and/or properties of the widget (e.g., colors, styles, fonts, etc.) can be changed by a user via a preference pane or other input mechanism.

Example User Interface for a Widget Manager

Figure 7A:
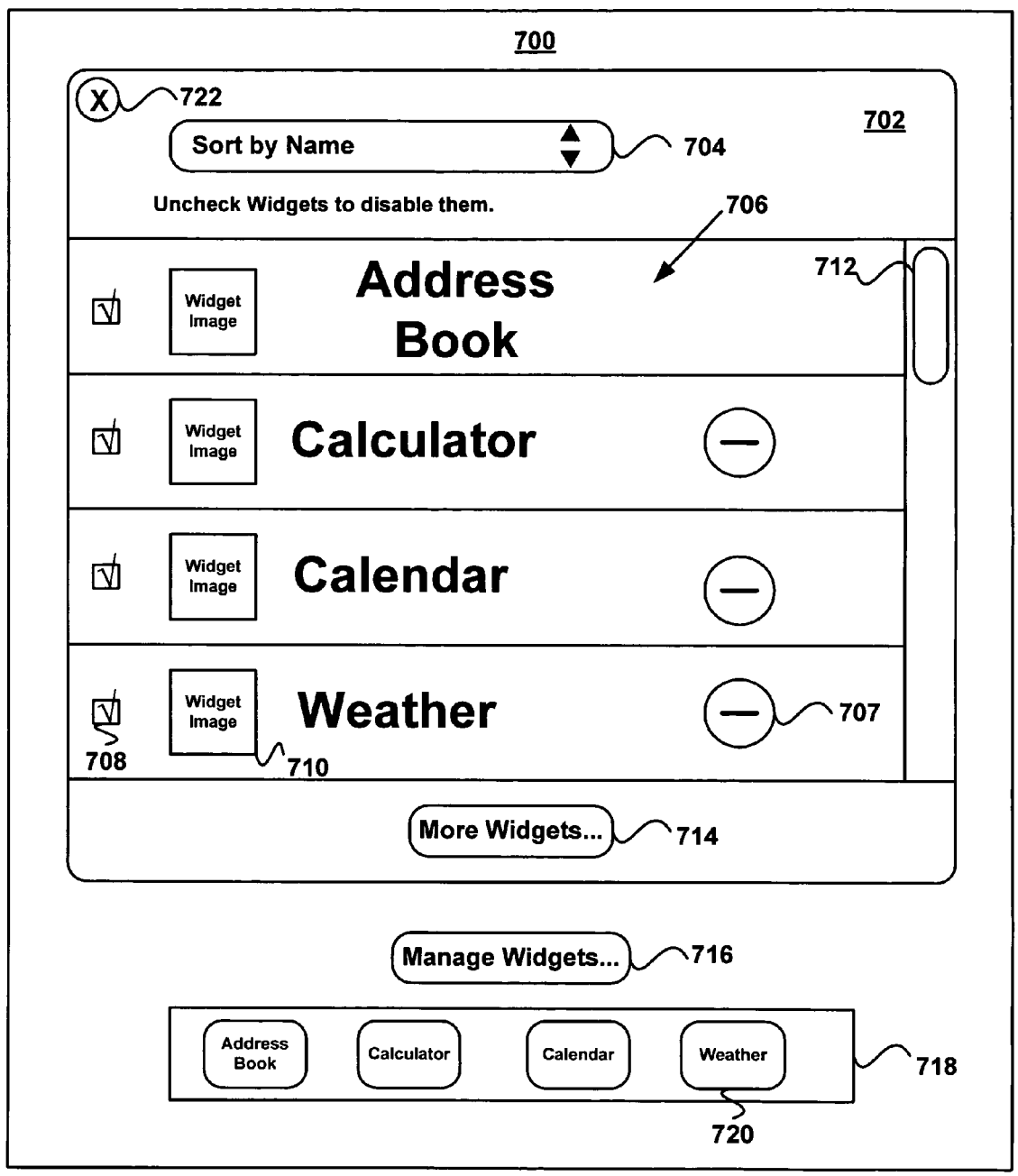
FIG. 7a illustrates an exemplary user interface for a widget manager.

FIG. 7a illustrates a user interface 702 for a widget manager. It should be apparent that a user interface for a widget manager can include more or fewer features than shown.

In some implementations, the user interface 702 is displayed in another user interface 700 (e.g., a desktop or dashboard layer) in response to user input. User input can include, for example, clicking on a button 716 (e.g., a "Manage Widgets" button) or other input mechanism located in the user interface 700. The user interface 702 can be dismissed by clicking on button 722 or other input mechanism.

In some implementations, the user interface 702 includes a scrollable list 706 of widget names and/or other attributes which correspond to widgets that have been installed on the host system. In some implementations, the scrollable list 706 includes widgets that reside on the host system but have not been installed (e.g., widgets downloaded to a desktop). This implementation enables users to install widgets from within the widget manager. In some implementations, the list 706 includes names of widgets that reside on another device coupled to the host system via a network connection. In some implementations, a search history is maintained to enable the user to refine search terms and/or re-run a previous search.

Optionally, next to each widget is an icon image 710 associated with the widget that can assist the user in selecting the widget from the list 706. Widgets that are selected to be hidden (e.g., based on a "hide widget" option provided in the widget manager) will not be shown in the list.

The widgets can be scrolled using, for example, a scroll bar 712. Users can also toggle each widget on and off (i.e., enable/disable the widget) by selecting a checkbox 708 located to the left of each widget listing. Similarly, on the right side of some widget listings is a button 707 or other input mechanism that allows users to delete the widget. Note that for this example, widgets that cannot be deleted do not have a corresponding button 707.

In some implementations, the user interface 702 includes a menu 704 (e.g., located at the top of the user interface 702) of sorting options that will sort the widget list 706 by name, date, author, rating or any other sorting criteria. In some implementations, the menu 704 includes an option to sort widgets based on whether the widgets are enabled or disabled.

In some implementations, a button 714 (e.g., a button labeled "More Widgets . . . ") or other input mechanism allows a user to search for more widgets located in local directories or on one or more network devices (e.g., a website).

In some implementations, when a widget is enabled (check box 708 is checked) the widget's icon image 720 is displayed in a configuration bar 718 in user interface 700. For example, since the check box 708 associated with the "weather widget" is checked, its icon image 720 is displayed in the configuration bar 718 in user interface 700. Similarly, if the check box 708 is unchecked, then the image icon 720 is not displayed in the configuration bar 718 or its appearance is altered (e.g., grayed out, darkened, made translucent, etc.) to indicate to a user that the widget is disabled.

Figure 7B:
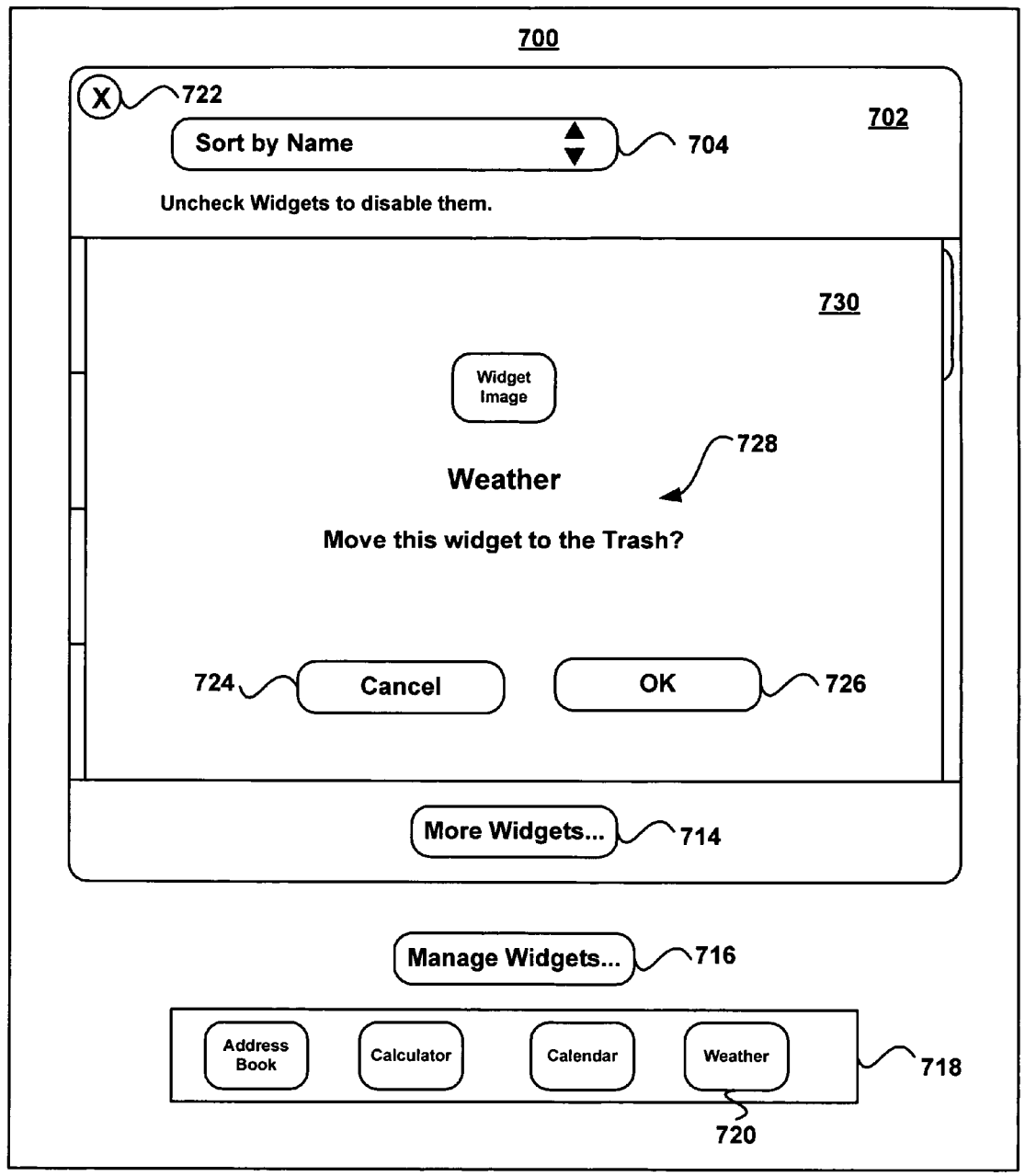
FIG. 7b illustrates an exemplary widget manager overlay for requesting a user to confirm the deletion of a widget.

FIG. 7b illustrates a widget manager overlay 730 for requesting a user to confirm the deletion of a widget. In some implementations, when clicking the delete button 707 (FIG. 7a), a semi-translucent overlay 730 appears within the user interface 702 including a message 728 requesting the user to confirm their intent to delete the widget. For example, the message 728 could be "Move this widget to the Trash?" The user can respond to the message 728 by clicking a button 726 ("OK"), which results in the widget being moved to the "Trash" or otherwise deleted from the host system. The user can also respond by clicking a button 724 ("Cancel"), which results in the deletion operation being terminated. If a widget is moved to the "Trash" or otherwise deleted, then its icon image 720 is removed from the configuration bar 718.

Multiple Dashboards

Figure 8:
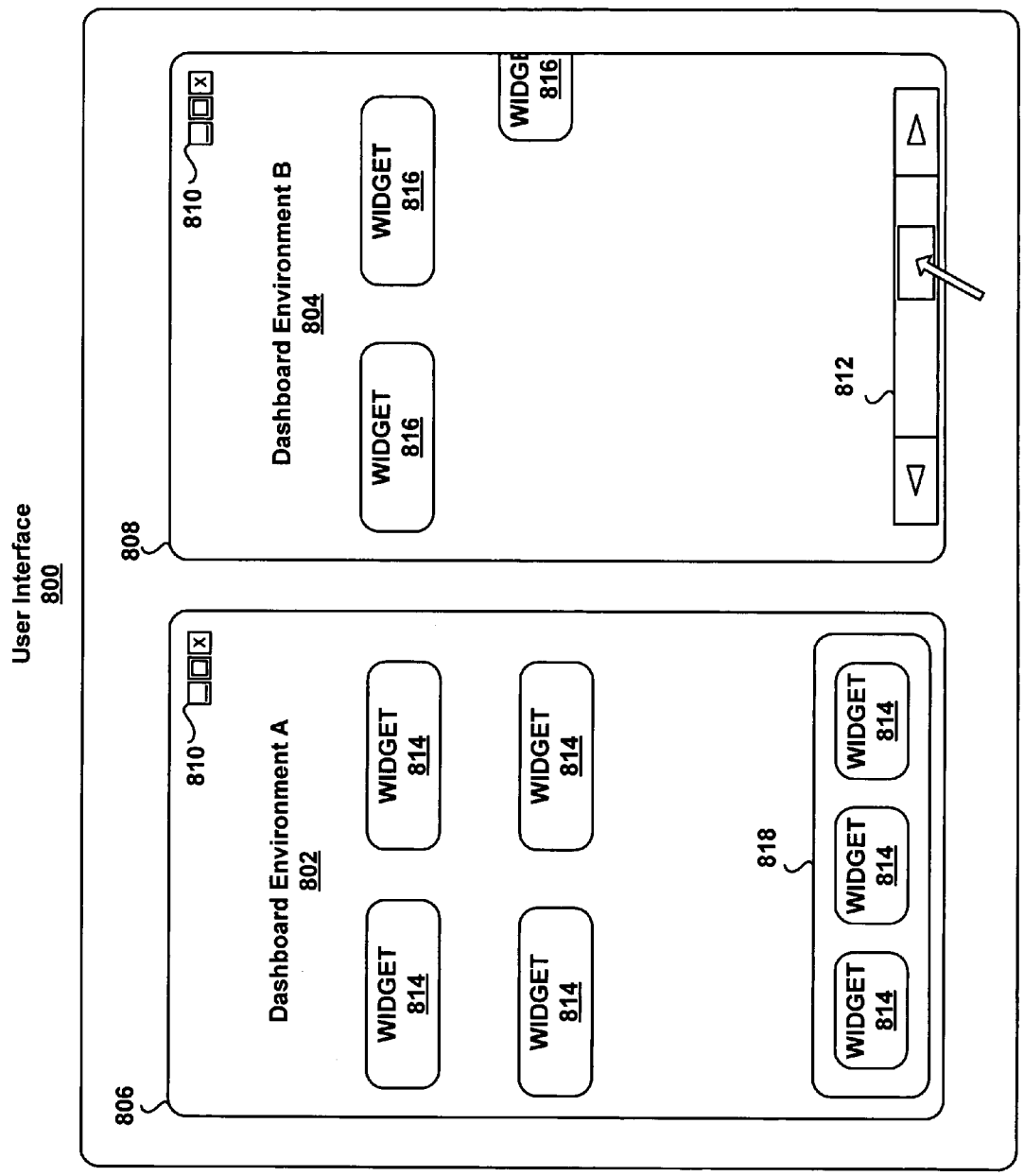
FIG. 8 illustrates an exemplary user interface including multiple display areas associated with multiple dashboard environments.

FIG. 8 illustrates a user interface 800 displaying dashboard environments 802 and 804. In some implementations, more than one dashboard is available. For example, the user can create and configure one dashboard to contain widgets related to work, and another for widgets related to personal matters. Different trigger events (e.g., different key combinations, menu selection, etc.) can be used for triggering the dashboards. State information for each dashboard can be saved enabling the dashboards to be restored to their previous respective configurations. Different dashboards can contain one or more of the same widgets. State information for a widget can be maintained separately for each dashboard in which the widget appears, or it can be commonly maintained across all dashboards in which the widget appears. Different dashboards can be available or "owned" for different users of a computer or other electronic device, such that each user can only access their own dashboard(s). A user can specify a dashboard as being available to other users, if desired. A user can also specify, for any or all of the dashboards he or she creates, whether other users are permitted to make changes to the dashboard(s).

In some implementations, the dashboard environments 802, 804, are associated with display areas 806, 808 which are controlled using one or more control elements 810 and navigated using one or more navigation elements 812. The display areas 806, 808, can be configured to be displayed on multiple display devices (e.g., two different monitors). Display areas 806, 808, can be generated by a network device (e.g., a web page server) and transmitted over a network connection (e.g., the Internet) for presentation on a user device (e.g., embedded in web pages).

Although FIG. 8 shows two dashboard environments and their associated display areas, more than two dashboard environments and their associated display areas can be created, invoked and/or presented as desired, depending on the needs of a user, application, operating system, etc.

In some implementations, the display areas 806, 808, can be presented and arranged in the user interface 800 in either an ad hoc manner (e.g., anywhere in the user interface) or an orderly manner (e.g., cascaded, tiled, etc.). For example, in FIG. 8 the display areas 806, 808, are tiled (side-by-side) in the user interface 800. In some implementations, display areas 806, 808, can be presented in the user interface 800 at different locations and at different times. For example, when the display area 806 is active in the user interface 800, the display area 808 can be hidden or obfuscated (e.g., darkened, faded out, etc.). In such an implementation, each of the display areas 806, 808, can be a dashboard layer 402, as described with respect FIG. 4. A user can transition between display areas 806, 808, using one of a number of known transition effects, including but not limited to carousels, panning out, flips, peeling, slide in/out, confetti, etc. A transition between display areas 806, 808, can be initiated through physical input devices (e.g., keyboard, mouse, etc.) and/or virtual input devices (e.g., buttons, sliders, etc.). In some implementations, a transition from a first display area to a second display area occurs without closing or hiding the first display area.

Generally, dashboard environments can be invoked (with their associated display areas presented in a user interface) in response to user input (e.g., key combinations, mouse clicks, touch input, etc.), inferred by context or programmatically by an application, operating system, etc. Display areas can be resized and dragged about the user interface as desired.

The control mechanisms 810 (e.g., buttons) are used to close, minimize and restore (up/down) the display areas 806, 808. The navigation mechanisms 812 (e.g., scroll bar, arrows, etc.) are used to navigate the dashboard environments 802, 804. For example, by sliding a scroll bar 812, the user can display hidden widgets in the dashboard environment 804 in the display area 808. Thus, the dashboard environments 802, 804, can be larger than their corresponding display areas 806, 808.

In some implementations, the dashboard environment 802 includes one or more widgets 814 and the dashboard environment 804 includes one or more widgets 816. The widgets 814 and 816 can be in the same widget class (e.g., all game widgets), different widget classes (e.g., game widgets, utility widgets, etc.), or partially overlapping two or more classes. In some implementations, the widgets 814 and 818 can communicate information or data to each other across dashboard environments. For example, a widget 814 in the dashboard environment 802 can generate data that is processed, displayed and/or printed by a widget 816 in the dashboard environment 804, and vice-versa. A widget can also be in both dashboard environments 802, 804.

Figure 9:
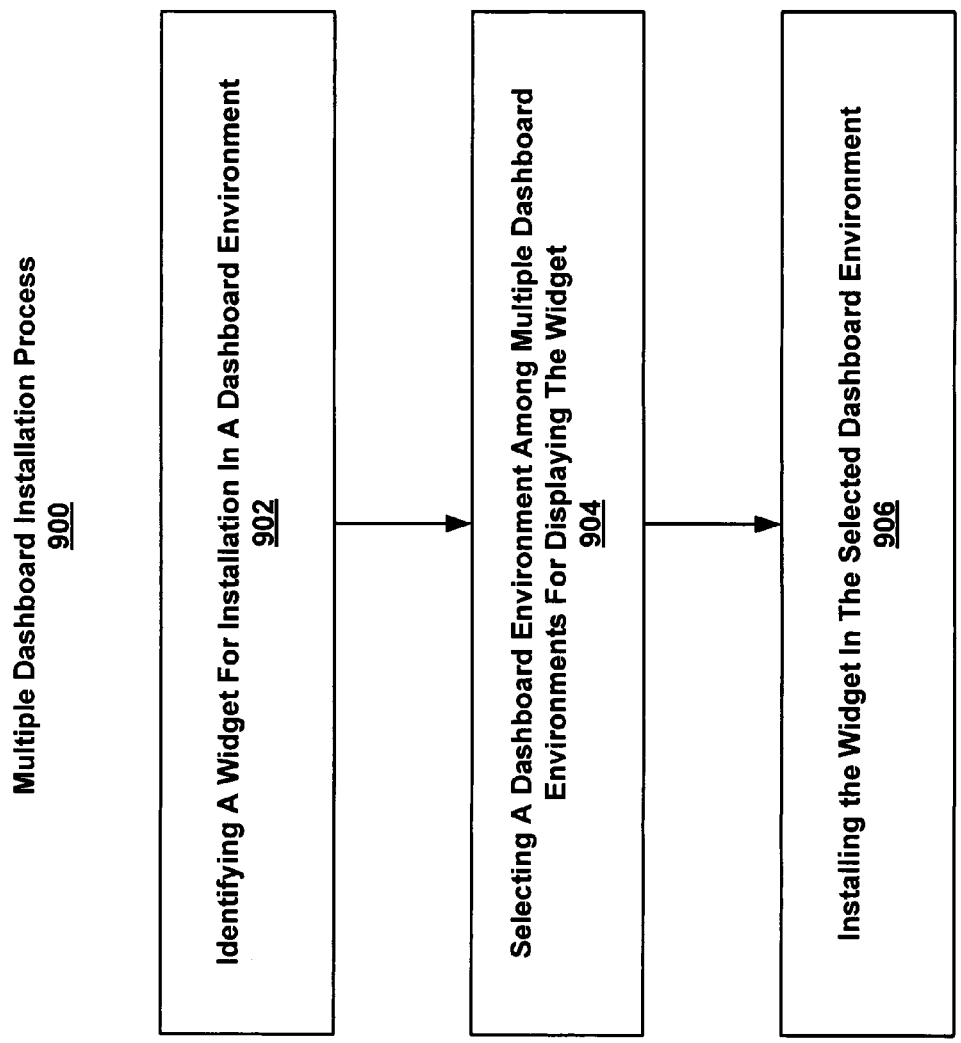
FIG. 9 is a flow diagram of an exemplary process for installing widgets in multiple dashboard environments.

In some implementations, widgets can be installed/instantiated in multiple dashboard environments using a multiple dashboard installation process 900, as described with respect to FIG. 9. In other implementations, widgets can be installed in a dashboard environment by dragging a widget from another location in the user interface 800 (e.g., from a configuration bar or desktop) and dropping it into the display area associated with the dashboard environment where the widget is to be installed (i.e., drag and drop functionality). Widgets can be dragged from any user interface, including but not limited to: a desktop, an application, a display window for another dashboard environment, etc. In some implementations, packages of widgets are installed in a dashboard environment.

In some implementations, a dashboard environment and widget can be matched up based on a widget class or a theme, as described with respect to FIG. 5. Widgets can also be previewed prior to installation in a dashboard environment, as described with respect to FIG. 6. The preview can occur in a dashboard display area or in a separate preview window in a user interface.

As previously discussed with respect to FIGS. 4, 5 and 6, a configuration bar 408 can be used to store images of widget icons which can be clicked or dragged into a display area for a dashboard environment to trigger invocation of the widget. During dragging, the widget can be animated to its actual size to assist the user in real-time layout of widgets in the dashboard. In some implementations, a widget manager is used to preview, install, enable, disable, show and hide widgets, as described with respect to FIGS. 7*a* and 7*b*. For example, the widget manager can include an button or other input mechanism which when activated invokes a preview of the widget. The user can be provided with an option to install or delete the widget during or after the preview.

Multiple Dashboard Installation Process

FIG. 9 is a flow diagram of a process 900 for installing widgets in multiple dashboard environments. The process 900 begins by identifying a widget for installation in a dashboard environment (902). A widget can be identified for installation when a request to install is received (e.g., from user input or programmatically) or an attempt to install is detected. For example, when a user downloads, copies or transfers a widget, or a package of widgets, from an external source (e.g., a web site, CD ROM, email attachment, etc.) onto their computer or other electronic device (e.g., mobile phone, media player, etc.), each widget is identified for installation into one or more dashboard environments. Once the widget is identified for installation, one or more suitable dashboard environments are selected for the widget based on one or more selection criteria (904). The widget is then installed/instantiated in the selected dashboard environment(s) (906).

In some implementations, dashboard icons can be displayed in a configuration bar in the same manner as widgets. Similar to a widget, a new dashboard can be installed or launched by clicking on the dashboard or an icon associated with the dashboard, or dragging the icon from the configuration bar and dropping it into the display area of another dashboard or a user interface.

In some implementations, a dashboard of dashboards can be created for enabling the user to select between multiple dashboards. A dashboard of dashboards can be have an icon which is displayed in a configuration bar. When the user clicks on the icon, or drags and drops the icon in a display area, the dashboard of dashboards is displayed. A dashboard of dashboards can have all the properties and characteristics of the other dashboards described herein.

In some implementations, the selection criteria can be based on a theme, as described with respect to FIG. 5. For example, a widget that is associated with a theme can be matched up with a dashboard environment associated with the same or similar theme during installation.

Another selection criteria can be a widget's class. A widget can be installed in a particular dashboard environment based on its class. For example, a widget that is classified as a game widget can be installed in a dashboard environment for game widgets. Such an environment can include, for example, widgets having large game controls (e.g., joysticks), programmable buttons, etc.

Similarly, widgets that are associated with digital media items can be installed in a dashboard environment for digital media items (e.g., media players, etc.). In such an environment, the display window associated with the dashboard environment may be invoked in a full screen mode based on the presumption that a medium item (e.g., a video) will be played.

In some implementations, the widgets are matched to suitable dashboard environments based on information contained in one or more files or data bundled with a widget (e.g., an info.plist file). For example, widgets that are requesting access to system or network resources can be matched to a dashboard environment that is associated with certain security rules or that includes security event monitoring, such as the security monitoring described in co-pending U.S. Provisional Patent Application No. 60/730,956, entitled "Widget Security."

The display area for a dashboard environment can be customized based on its theme or class by specifying various attributes or properties of the display area, such as fonts, styles, colors, type and number of control and navigation mechanisms, viewing angles (e.g., full screen, half screen, etc.) and the like. In some implementations, widgets installed in a customized display window inherit the same attributes or properties as the display area to maintain a uniform appearance between the display area and the widgets (i.e., to maintain the "look and feel").

In some scenarios, preexisting dashboards may not be available for installing widgets. In such cases, a new dashboard environment can be created using a dashboard assistant process. With a dashboard assistant, a user can build a custom dashboard environment by selecting a preexisting dashboard template and various dashboard properties or attributes, such as size, title, fonts, style, etc. The dashboard assistant can be, for example, an application that guides a user through set-op options and can be invoked manually through an icon or automatically in response to a trigger event (e.g., an attempt to install a widget with no preexisting dashboard environments).

A suitable template can be selected by a user manually based on its various properties and attributes (e.g., a game dashboard template). A template can also be selected automatically by an application, operating system and the like. Templates can be organized in a file system on a user device and/or on a remote server that is accessible by a device through a network connection. The templates can be organized for easy retrieval based on class, themes or any other selection criteria that is useful in distinguishing between dashboard environments. A search form can be provided by the dashboard assistant process to assist users in finding suitable templates based on one or more search criteria entered by the user.

The user can also specify one or more rules to be associated with a dashboard environment. These rules can be security rules that deny the installation of widgets which have certain properties (e.g., request access to system or network resources) or have been identified as "rogue" or "malicious." The user can also specify content rules for controlling content that is displayed or used by a widget (e.g., parental controls). Access rules can also be specified for determining who can install and use a widget or class of widgets in a particular dashboard environment. For example, an access rule may specify that only the owner of a device (e.g., a personal computer) can install widgets in a particular dashboard environment, while allowing guest log-ins of the device to create a temporary dashboard environment for temporarily installing widgets. If a guest log-in attempts to install a widget in an access-restricted dashboard environment, a dashboard assistant can be launched which invites the guest log-in to create and/or specify a temporary dashboard environment which is appropriate for a guest log-in (e.g. including restrictions on resource access).

Figure 11:
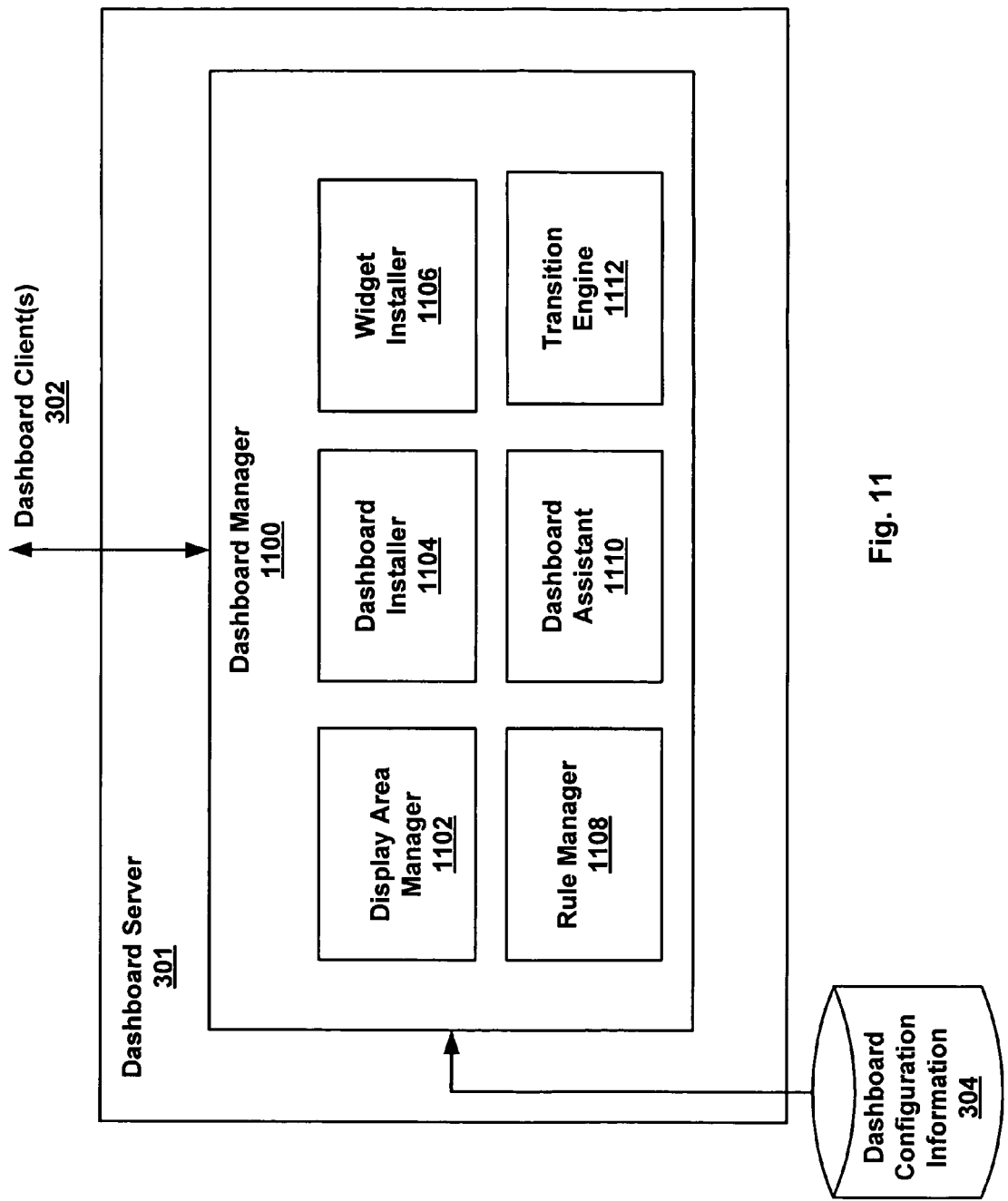
FIG. 11 is a block diagram of an exemplary dashboard manager for managing various processes associated with multiple dashboard environments.

In some implementations, a new dashboard environment can be created from a number of preexisting templates using a dashboard assistant process, which is described with respect to FIG. 11.

Nested Dashboard Display Areas

Figure 10:
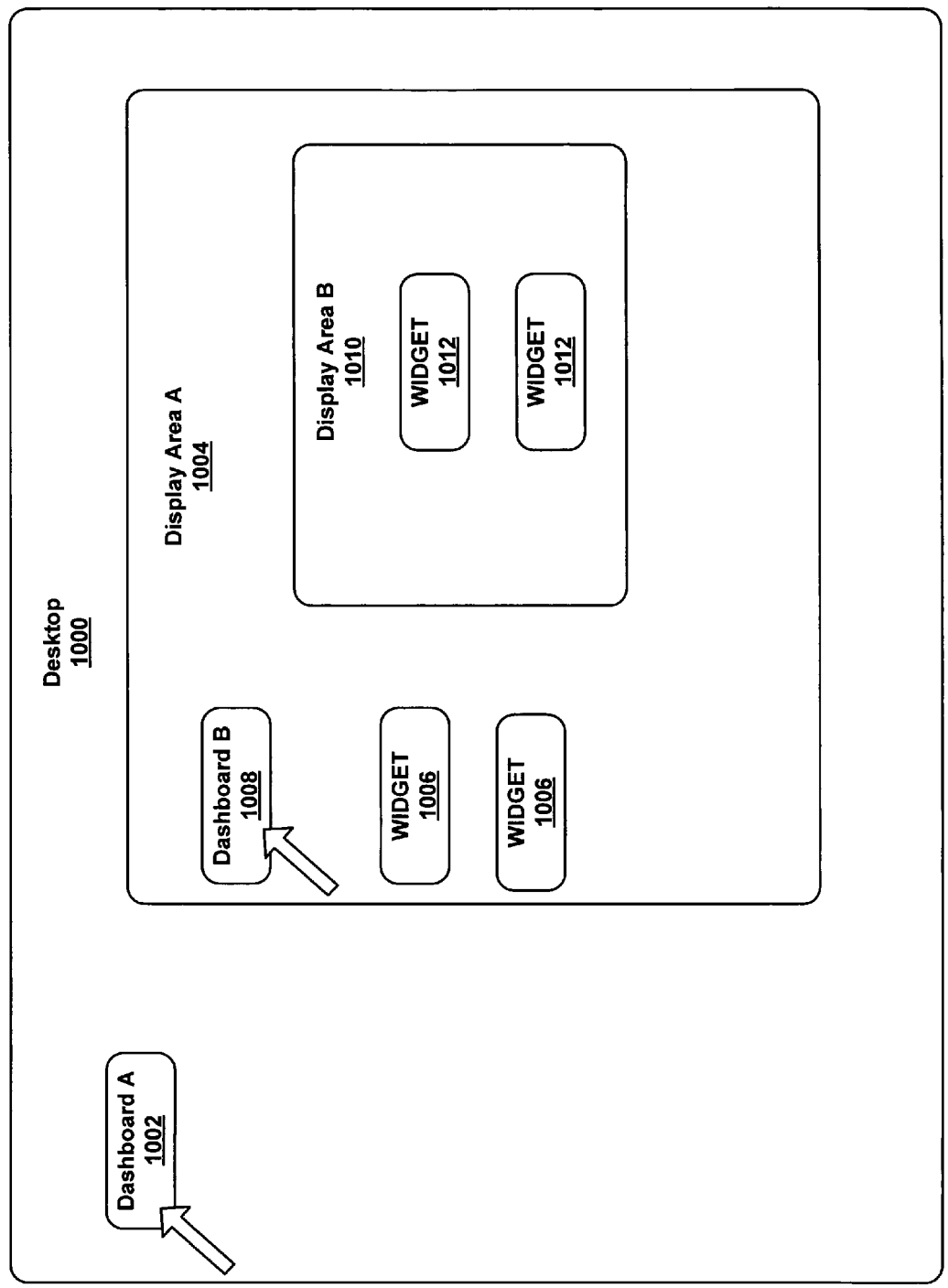
FIG. 10 illustrates nesting display areas associated with dashboard environments.

FIG. 10 illustrates nested dashboard display areas 1004 and 1010. In some implementations, the dashboard display areas 1004 and 1010 can be nested or stacked N layers deep on a user interface. In other implementations, the dashboard display areas 1004 and 1010 can be presented in a user interface as a linear sequence, as overlapping tiles, or on multiple surfaces of an animated two-dimensional or three-dimensional graphical object, as described with respect to FIGS. 12-14.

In some implementations, a desktop 1000 includes a dashboard A icon 1002. When the dashboard A icon 1002 is activated (e.g., clicked, mouse-over, etc.), the display area 1004 associated with a dashboard environment A is presented on the desktop 1000. The display area 1004 includes one or more widgets 1006 and a dashboard B icon 1008. When the dashboard B icon 1008 is activated, the display area 1010 associated with a dashboard environment B is presented, for example, within the display area 1004. The display area 1010 includes one or more widgets 1012.

In some implementations, the display area 1010 can be initially presented in the display area 1004 and then resized and/or moved anywhere on the desktop 1000 by a user or application. The display areas 1004 and 1010, can include control and navigation mechanisms, as described with respect to FIG. 8. The widgets 1006 and 1012 can be a member of the same widget class, a different widget class, or partially overlapping two or more widget classes. The display areas 1004 and 1010 can be displayed at the same time in a stack or cascade arrangement, or one at a time by hiding or obfuscating one of the display areas. Alternatively, a transition effect can be used to transition between the display areas 1004, 1010, whenever one of the display windows 1004, 1010, is activated (e.g., selected or focused upon by a user). For example, if a user clicks on the display area 1010, the display area 1004 can become obfuscated (e.g., darkened, minimized, etc.) and vice-versa.

In some implementations, widgets 1006 in display area 1004 that are dragged and dropped into the display area 1010 will become part of the dashboard environment B, provided the widgets 1006 conform to any rules associated with the dashboard environment B. Similarly, widgets 1012 in display area 1010 that are dragged and dropped into the display area 1004 and will become part of the dashboard environment A, provided the widgets 1012 conform to any rules associated with the dashboard environment A. Widgets on the desktop 1000 (not shown) can also be dragged and dropped into the display areas 1004 and 1010.

The use of nested display areas associated with different dashboard environments enables users to organize dashboards into hierarchies based on a user interests (e.g., entertainment, hobbies, sports, work, etc.) or other criteria. For example, a user can have a dashboard for entertainment-related widgets which are applicable to multiple types of entertainment, which can further include one or more nested dashboards including widgets that are specific to a particular form of entertainment (e.g., movies, books, etc.). In some implementations, widgets can be automatically associated with nested dashboards without user interaction during download, installation, etc.

Multiple Dashboard Server Processes

FIG. 11 is a block diagram of a dashboard manager 1100 for managing various dashboard processes. The dashboard manager 1100 includes a display area manager 1102, a dashboard installer 1104, a widget installer 1106, a rule manager 1108, a dashboard assistant 1110 and a transition engine 1112. In this particular implementation, the dashboard manager 1100 is shown as part of the dashboard server process 301, as described with respect to FIG. 3. Alternatively, one or more of the dashboard manager processes identified above, can be run outside the dashboard server process 301 by an operating system, application, plug-in, etc. The dashboard server 301, dashboard clients 302 and widgets 300 are all described with respect to FIG. 3.

Display Area Manager

The display area manager 1102 manages and presents display areas associated with dashboard environments in a user interface. The display area manager 1102 responds to input from control or navigation mechanisms, and handles communications between dashboard environments and with applications, operating system components, drivers, plug-ins, etc. For example, if a user moves a scroll bar in the display area, the display area manager 1102 determines which portion of the associated dashboard environment to display, and invokes the appropriate operating system processes and/or drivers to present the dashboard environment in the display area. In some implementations, the display area manager 1102 creates and maintains a list of widgets for each dashboard environment, which can be stored in, for example, the dashboard configuration information 304 and presented to the user.

Dashboard Installer

The dashboard installer 1104 is responsible for installing dashboard environments based on input received from the dashboard assistant 1110 or from another input source. The dashboard installer 1104 registers the dashboard environment with the operating system, so that other applications, operating system components and drivers, or other dashboard environments and/or widgets, can communicate with the newly installed dashboard environment.

In some implementations, an installer checklist is presented in a window, pane or other user interface, which includes a list of available dashboards for installation. A user can select one or more dashboards for installation by, for example, checking a "check box" or clicking a button displayed adjacent to the dashboard listing (or its associated icon) in the installer checklist. The number and types of dashboards (or various extensions or enhancements to dashboards) can be made available depending on the user and their privileges, interests, etc. In some implementations, during installation widgets can be automatically associated with dashboards based on the widget type or class, which can be defined by the widget author in a widget file or defined at a widget download site, etc.

Widget Installer

The widget installer 1106 is responsible for identifying widgets to be installed in a dashboard environment and for managing the installation of the widgets into the dashboard environment. In some implementations, the widget installer 1106 is capable of identifying a theme or class of a widget and selecting an appropriate preexisting dashboard environment for installation of the widget. If no preexisting dashboard environment is available, or there are no suitable preexisting dashboard environments to select from (e.g., no game oriented dashboard environment), then the widget installer 1106 invokes the dashboard assistant process 1110 to assist the user in creating a new dashboard environment.

Rule Manager

The rule manager 1108 enforces one or more rules related to widget and dashboard security, installation and access. For example, when the dashboard manager 1100 receives a security event, it invokes the rule manager 1008. The rule manager 1108 assesses the security risk associated with the security event and initiates an appropriate security action based on the risk assessment, as described in co-pending U.S. Patent Application No. 60/730,956, entitled "Widget Security." For example, if a user attempts to install a "rogue" widget in a dashboard environment, a security event is generated by the operating system and detected by the dashboard manager 1100. The rule manager 1108 assesses the risk of the event by, for example, determining whether the installation of the widget would violate any security rules. An example of a security rule would be if the widget to be installed/instantiated is on a "black list" of widgets, then the widget will not be installed in the dashboard environment. Such a "black list" could be downloaded from a trusted web site and stored locally as part of the dashboard configuration information 304 (see FIG. 3). Another example of a security rule would be if the widget to be installed/instantiated is on a "white list" of widgets which are allowed to be installed in the dashboard environment.

The rule manager 1108 also enforces rules associated with widget installation. For example, if a widget does not belong to a particular widget class or theme (e.g., a game widget) associated with a dashboard environment, and an attempt to install the widget in the dashboard environment is detected, then the rule manager 1108 can initiate an appropriate action, such as preventing the installation of the widget in the dashboard environment and notifying the requesting user or application of the reasons for the action. If the widgets are already installed, then a security action could include denying certain administrative requests, such as a request to delete the widget from a dashboard environment.

The rule manager 1108 also enforces rules that restrict access to widgets in dashboard environments. For example, a dashboard environment may be associated with rules that prevent access to certain content from being displayed (e.g., parental controls) or prevent certain users from accessing and/or installing widgets in dashboard environments (e.g., guest log-ins). In some implementations, a dashboard is associated with privileges (e.g., read/write privileges). For example, a dashboard may only allow users with appropriate privileges to install widgets in the dashboard, or otherwise alter the dashboard, as oppose to other users who are permitted only to view widgets displayed in the dashboard.

Dashboard Assistant Process

The dashboard assistant process 1110 is used to create and install new dashboard environments. In some implementations, the process 1110 works with preexisting templates to create new dashboard environments, as described with respect to FIG. 8.

Transition Engine

The transition engine 1112 is responsible for generating transition effects for transitions between two display areas associated with dashboard environments, as described with respect to FIG. 8. When the dashboard manager 1100 receives a request to transition, it invokes the transition engine 1112, which provides the desired transition effect (e.g., panning out, carousel, flip, peeling, etc.). In some implementations, the transition effect can be selected by a user via a preference pane or other user input mechanism. In other implementations, the transition is defined by the dashboard.

Dynamic Tiling

Figure 12:
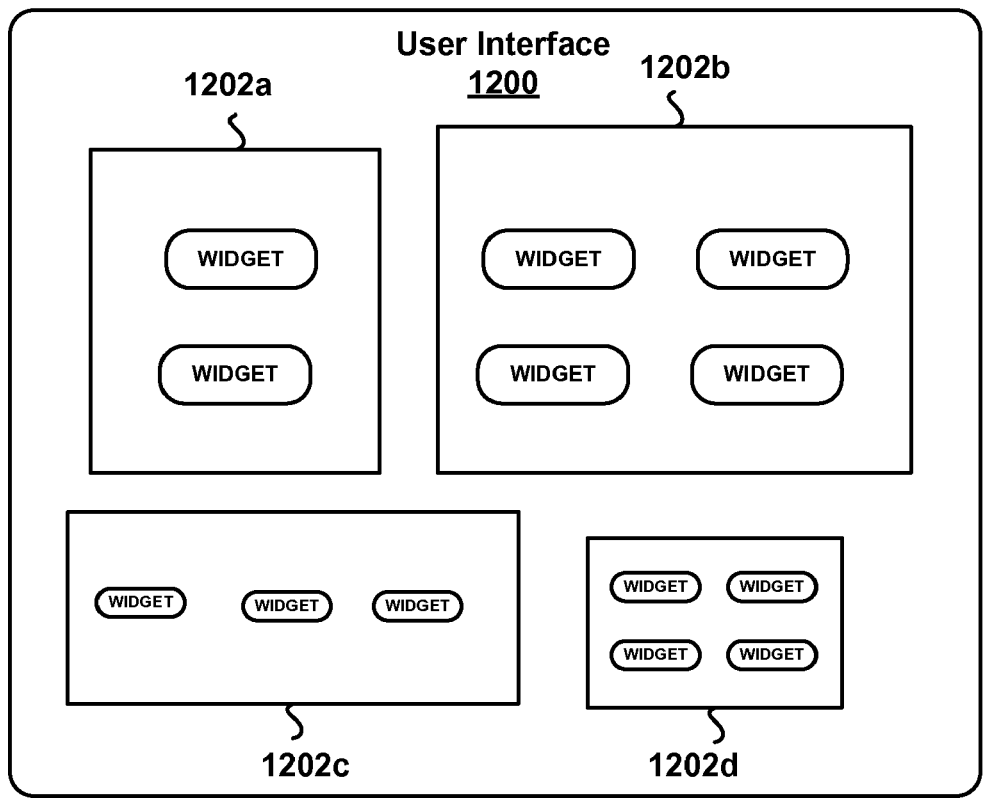
FIG. 12 illustrates an exemplary dynamic tiling scheme for organizing multiple dashboards on a user interface.

FIG. 12 illustrates a dynamic tiling scheme for multiple dashboards. In some implementations, multiple dashboards 1202a-d are presented in a user interface 1200 using a dynamic tiling scheme. In a multiple dashboard environment, it is possible for dashboards 1202a-d to have different sizes, numbers of widgets etc. Dynamic tiling enables the dashboards 1202a-d to be automatically resized based on the available space in the user interface 1200. The dashboards 1202a-d can be presented in response to user input or programmatically through an operating system or application. For example, a user can press a key or key sequence which causes the dashboards 1202a-d to be simultaneously dynamically tiled in the user interface 1200. Each dashboard is automatically resized to fit within the available space in the user interface 1200. Widgets and other information and/or content in the dashboards 1202a-d can also be resized as appropriate.

In some implementations, when a user clicks on a dynamically tiled dashboard, the dashboard is activated and automatically resizes to fill a portion in the user interface 1200 or the entire user interface 1200. The other dashboards in the user interface 1200 can remain on the desktop 1200 and/or be wholly or partially obfuscated (e.g., darkened, grayed out, blurred, etc.).

In some implementations, the user can drag a dashboard around the user interface 1200 and the other dashboards will automatically resize or move to make room for the dashboard at its new location in the user interface 1100.

In some implementations, widgets can be dragged and dropped between dynamically tiled dashboards 1202a-d. When a widget is dropped into a dashboard it conforms to the dashboard's properties, theme or content and it is modified as appropriate to be consistent with other widgets in the dashboard (e.g., resized).

In some implementations, the currently activated dashboard is altered with animation or other special effects (e.g., highlighted, magnified, "fisheye" effect, etc.). In some implementations, the currently activated dashboard can have greater image resolution (e.g., more pixels) and/or more details than inactive dashboards. This feature enables users to move tiles around the user interface 1200 in real-time by reducing the amount of time required to draw and redraw a dashboard.

Tab Control

Figure 13:
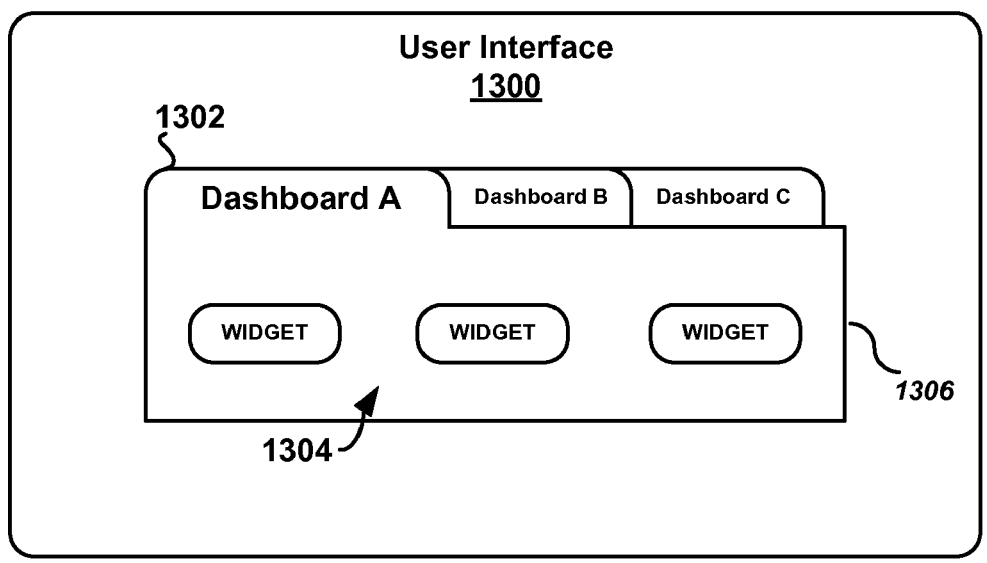
FIG. 13 illustrates an exemplary tab control scheme for organizing multiple dashboards on a user interface.

FIG. 13 illustrates a tab control scheme for multiple dashboards. In some implementations, multiple dashboards 1302 are presented in a user interface 1300 using a tab control scheme. A tab control 1302 can be used to organize multiple dashboards on the user interface 1300. Each dashboard includes a tab 1304 and a tab panel 1306. The tab 1304 is used to activate a dashboard and can be located on the top or sides of the tab control 1302. When the tab 1304 is activated (e.g., mouse clicked by a user), the tab panel 1306 corresponding to the tab 1304 is moved to the front and activated. The tab panel 1306 can include one or more enabled widgets which can be interacted with by a user, application, etc.

In some implementations, the properties of the tab control 1302 (e.g., size, location, color, font, style) can be changed by a user or programmatically by an operating system and/or application. Each tab 1304 can be labeled with an appropriate title and other information indicative of the theme or content of the dashboard (e.g., a graphical image, etc.). The tab control 1304 can be minimized and stored in a configuration bar when not in use.

Figure 14:
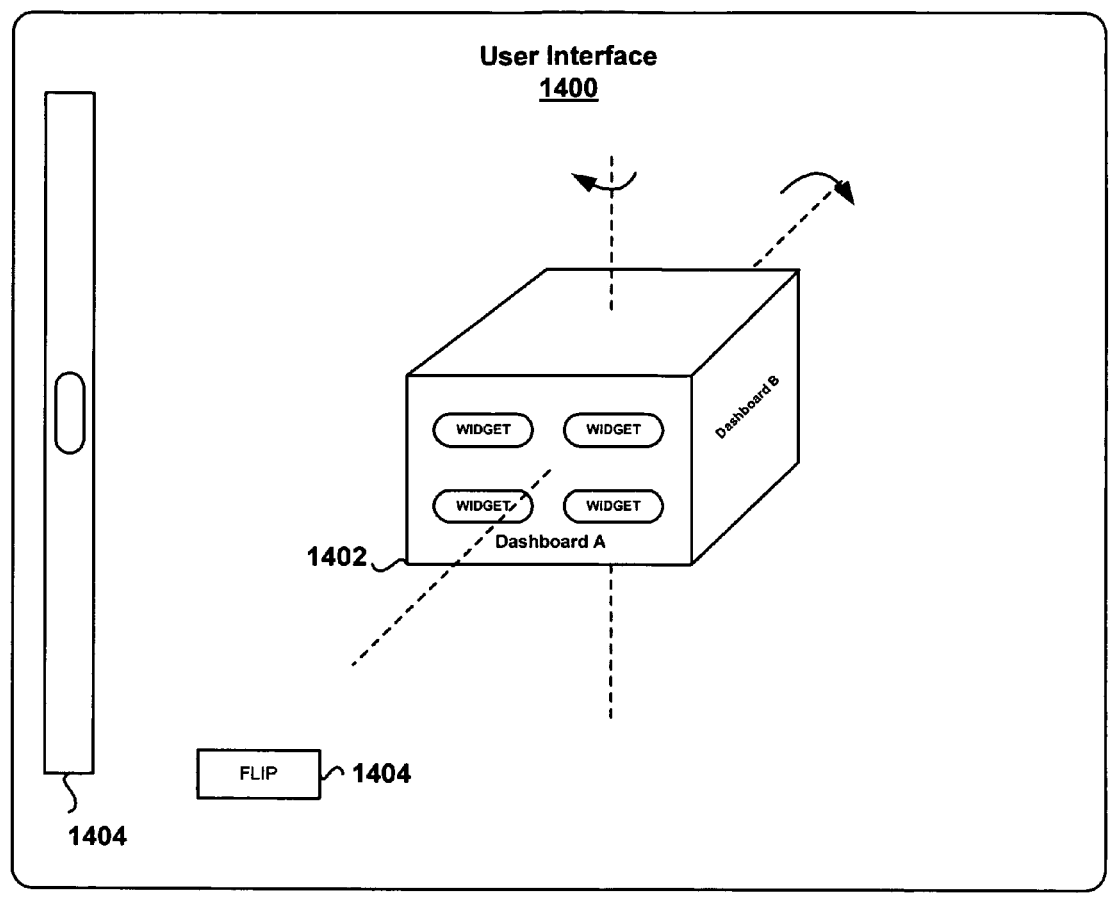
FIG. 14 illustrates an exemplary geometric scheme for organizing multiple dashboards on a user interface.

FIG. 14 illustrates a geometric scheme for organizing multiple dashboards on a user interface 1400. In some implementations, a geometric object (e.g., a cube 1402) can be used to organize multiple dashboards on the user interface 1400. For example, a cube 1402 can display a dashboard or dashboard icon or other selectable object associated with a dashboard on the front-facing side of the cube 1402. The user can manipulate a control mechanism 1404 (e.g., a scroll bar, key, mouse over, etc.) for controlling the animation of the cube 1402. For example, with each quarter rotation the front-facing side of the cube 1402 displays a different dashboard icon, image or other dashboard indicia that can be static or have at least some portions animated. Thus, a user can quickly review available dashboards by "spinning" the cube about one of its axes. The user can also click a flip button 1406 to rotate or spin the cube to see another dashboard. By using animated two and three-dimensional graphical objects to display dashboards (e.g., like the cube 1402), more than one dashboard can be visible to the user at a given time.

Other geographic objects can be used to display dashboards (e.g., a cylinder, sphere, triangle, diamond, etc.). When the user finds a desired dashboard, the user can select the dashboard for installation, previewing or launching by clicking on the dashboard icon, image or other dashboard indicia on the front-facing side of the cube 1402.

Other types of organization schemes can also be used to organize multiple dashboards on a user interface. For example, a Rolodex graphic can be animated to simulate the functionality of a Rolodex by allowing the user to flip through multiple dashboards, i.e., index cards. Also, a carousel graphic can be animated to simulate the functionality of a carousel by allowing the user to manipulate (e.g., rotate) the graphic to reveal available dashboards.

Dashboard Configuration Bar

Figure 15:
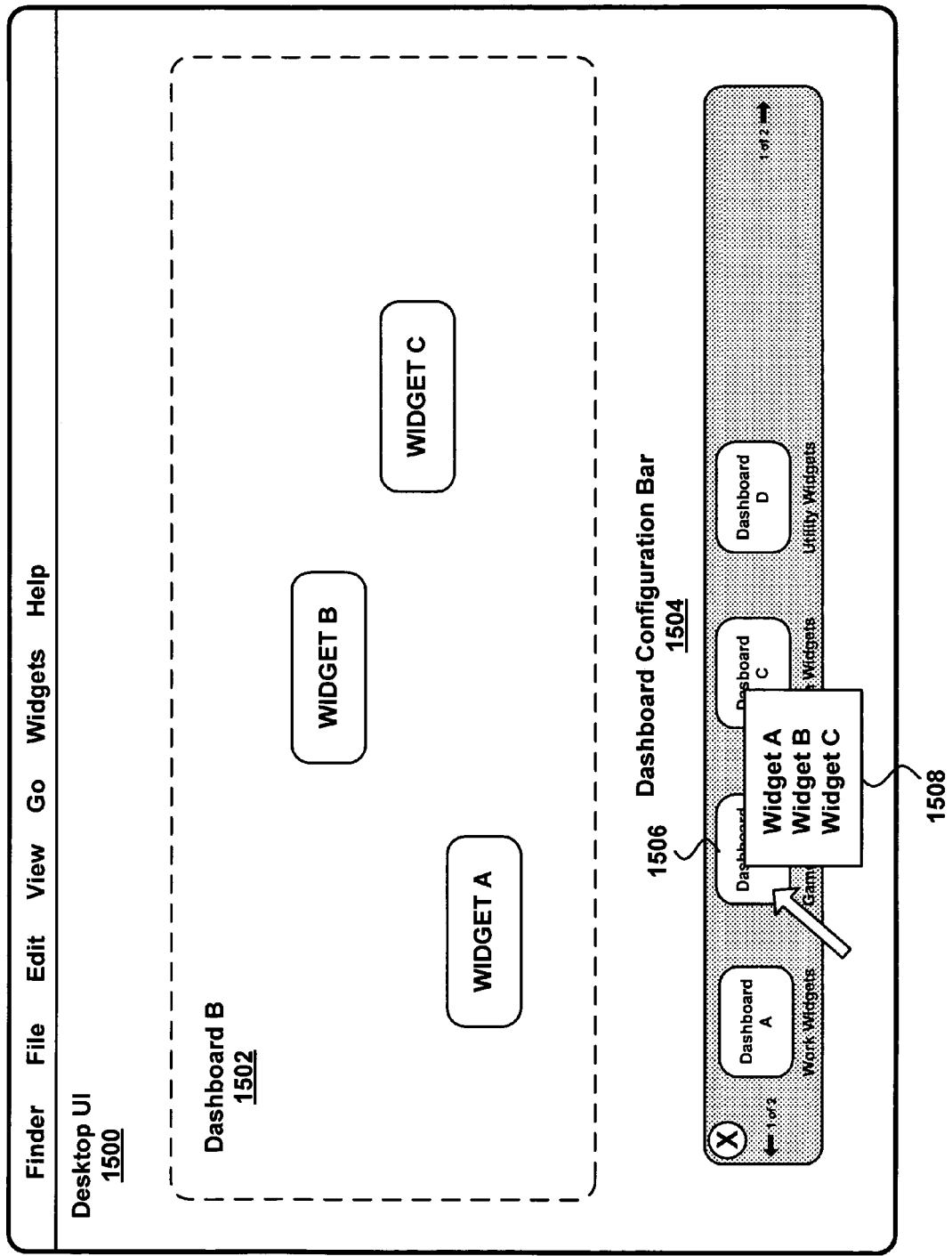
FIG. 15 illustrates an exemplary dashboard configuration bar

FIG. 15 illustrates an exemplary dashboard configuration bar. In some implementations, dashboards can be organized in a dashboard configuration bar 1504 displayed in a user interface 1500. A user can launch and/or display a dashboard 1502 ("Dashboard B") by selecting an icon 1506 associated with the dashboard 1502 from the dashboard configuration bar 1504 and dropping the icon 1506 in the user interface 1500. When the icon 1506 is clicked or dragged and dropped in the user interface 1500, the dashboard 1502 is displayed, as shown in FIG. 15. If multiple dashboard and/or widgets are dropped in the user interface 1500, then in some implementations the dashboards and/or widgets can be dynamically tiled, tabbed or otherwise organized for maximum visibility depending on the display environment and user preferences. Such organization can include replacing existing dashboards or partially overlapping existing dashboards. In some implementations, when a user traverses the icon 1506 with a cursor (e.g., a mouse over), a panel 1508 or bubble is displayed proximate the icon 1506 which lists the widgets or any other desired information (e.g., descriptive text, images, etc.) in the dashboard 1502. Alternatively, when a user traverses over different dashboard icons 1506 in the dashboard configuration bar 1504 the dashboards are switched in and out of operation. In some implementations, dashboard icons can be organized in the dashboard configuration bar 1504 based on dashboard type or class and one or more filter buttons (not shown) can be provided for filtering out dashboards from being displayed in the dashboard configuration bar 1504 based on one or more filter criteria.

Dashboard/Widget Configuration Bar

Figure 16:
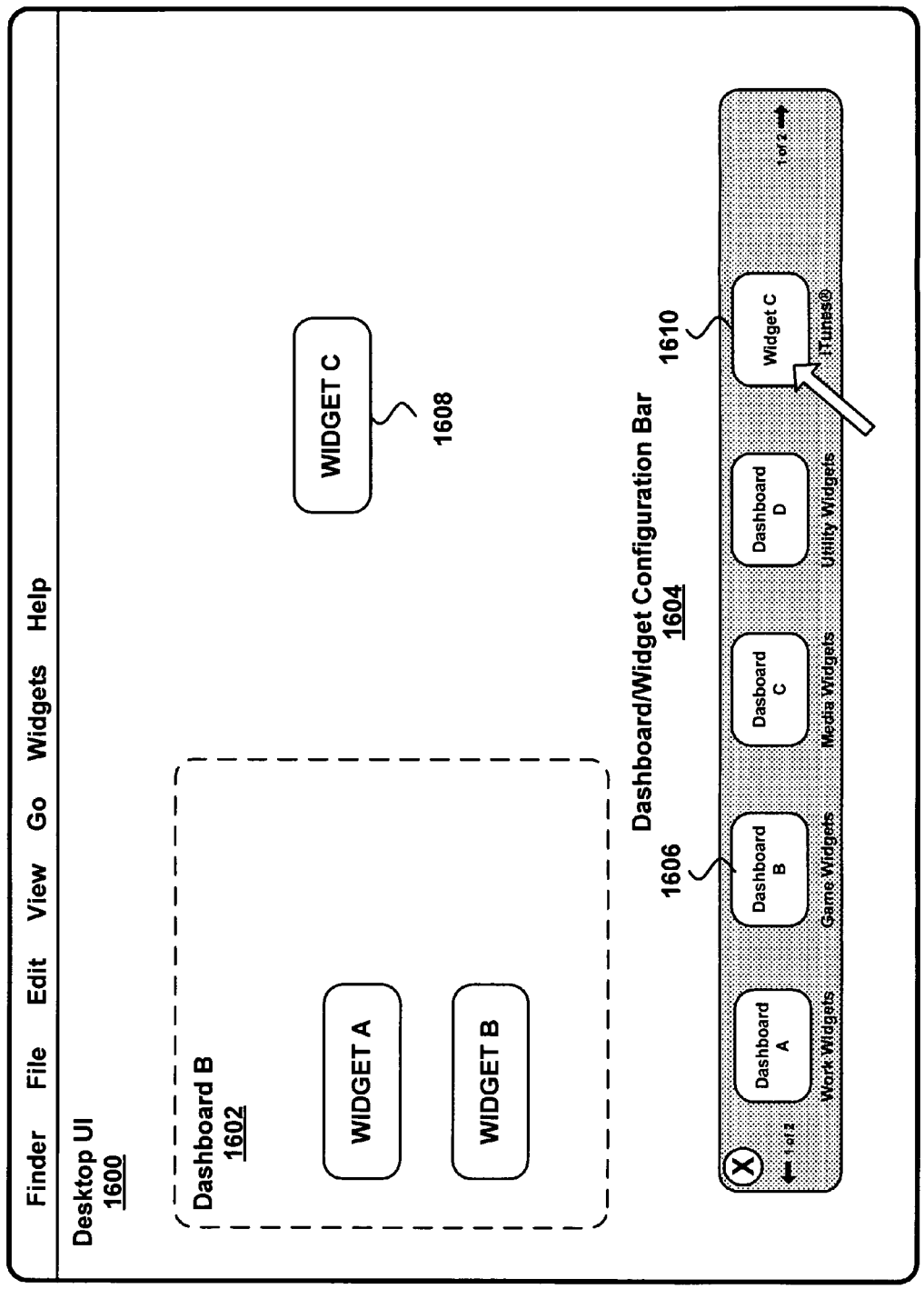
FIG. 16 illustrates an exemplary dashboard/widget configuration bar.

FIG. 16 illustrates an exemplary dashboard/widget configuration bar. In some implementations, dashboards and widgets can be organized together in a dashboard/widget configuration bar 1604 displayed in a user interface 1600. A user can launch and/or display a dashboard 1602 ("Dashboard B") by clicking an icon 1606 associated with the dashboard 1602 from the dashboard/widget configuration bar 1604 or dragging the icon 1606 from the dashboard/widget configuration bar 1604 and dropping the icon 1606 in the user interface 1602, as previously described with respect to FIG. 15. Additionally, a user can launch and/or display a widget 1608 ("Widget A") by selecting an icon 1610 associated with the widget 1608 from the dashboard/widget configuration bar 1604 and dropping the icon 1610 in the user interface 1600. The widget 1608 can be dropped into a user interface 1600 (as shown) or into a dashboard. The widget 1608 can also be dragged and dropped into the dashboard 1602. If multiple dashboard and/or widgets are dropped in the user interface 1600 or dashboard layer, then in some implementations the dashboards and/or widgets can be dynamically tiled, tabbed or otherwise organized for maximum visibility depending on the display environment and user preferences. In some implementations, dashboard and/or widget icons can be organized in the widget/dashboard configuration bar 1604 based on dashboard or widget type or class and one or more filter buttons (not shown) can be provided for filtering out dashboards or widgets from being displayed in the dashboard configuration bar 1604 based on one or more filter criteria.

Dashboard Menu Scheme

Figure 17:
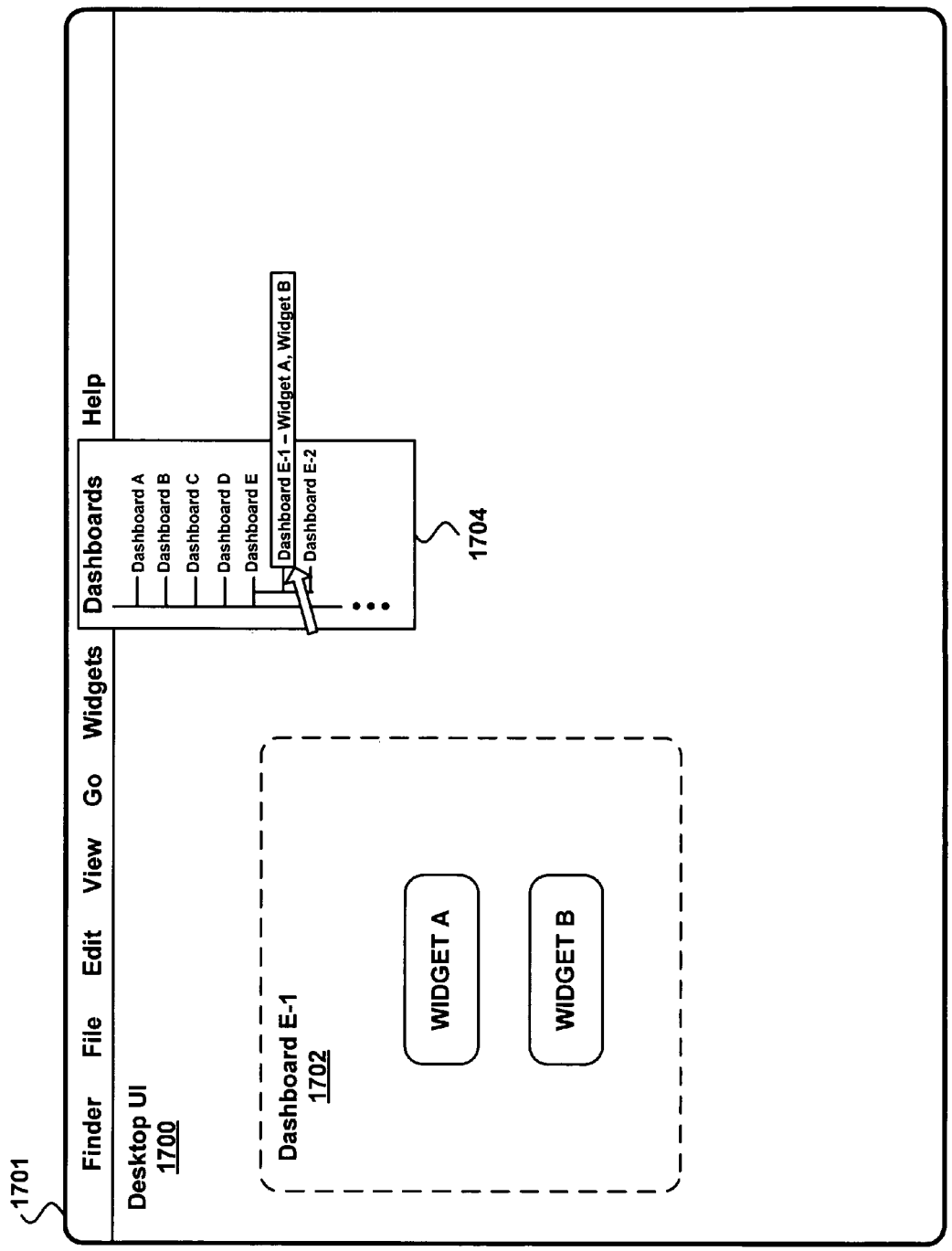
FIG. 17 illustrates an exemplary menu scheme for organizing multiple dashboards and widgets.

FIG. 17 illustrates an exemplary menu scheme for organizing multiple dashboards and widgets. In some implementations, a user can select among multiple dashboards and/or widgets using a pull-down menu 1704. The menu 1704 can be accessed from a tool bar 1701 in a user interface 1700 or any other suitable location in the user interface 1700 or a dashboard layer. The user can navigate through a hierarchy of dashboards and/or widgets using a pointing device. In some implementations, when the pointing device (e.g., a cursor) traverses a dashboard in the menu 1704, the contents of the dashboard are displayed. In the example shown, the dashboard E-1 1702 has been selected by a user, and the contents of Dashboard E-1 1702 (i.e., Widget A, Widget B) are displayed. Note that the dashboard E-1 1702 is a nested dashboard, as described with respect to FIG. 10. If multiple dashboard and/or widgets are dropped in the user interface 1700 or a dashboard layer, then in some implementations the dashboards and/or widgets can be dynamically tiled, tabbed or otherwise organized for maximum visibility depending on the display environment and user preferences. In some implementations, when a user navigates the menu 1704 the dashboard being traversed is displayed in the user interface 1700 or in a separate window or pane, so that the user can see the contents of the dashboard.

Any dashboard that has been opened from the display can be closed using a variety of techniques include buttons, selecting a close option from a pull-down menu.

Dashboard Tool Panel Scheme

Figure 18:
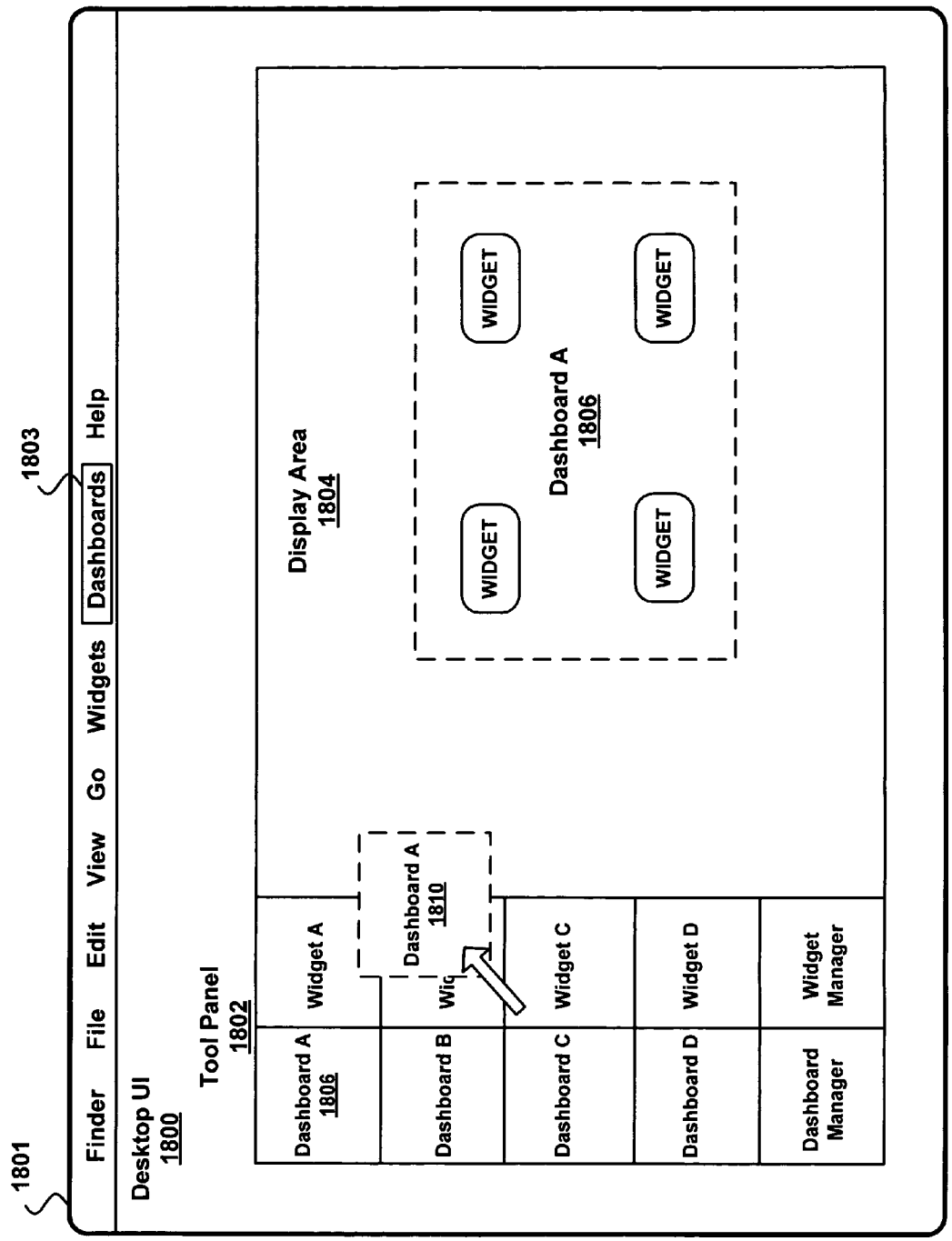
FIG. 18 illustrates an exemplary tool panel scheme for installing dashboards and widgets.

FIG. 18 illustrates an exemplary tool panel scheme for launching/displaying dashboards and/or widgets. In some implementations, the user can invoke a tool panel 1802 having a display area 1804 in a user interface 1800. For example, the user can invoke the tool panel 1802 with the display area 1804 by selecting a button 1803 or other input mechanism in a tool bar 1801. In response to the selection, the tool panel 1802 and display area 1804 are presented on the user interface 1800. A user can click a dashboard and/or widget icon 1810, or drag a dashboard and/or widget icon 1810 from the tool panel 1802 and drop it in the display area 1804, which causes the dashboard and/or widget to be launched and/or displayed. For example, a dashboard icon 1810 associated with a dashboard 1806 ("Dashboard A") can be selected, dragged and dropped in the display area 1804. The dashboard 1806 is displayed together with any widgets associated with the dashboard 1806. When the user navigates the icons 1810 in the tool panel 1802, the icons can be 1810 altered or animated (e.g., fisheye magnified) to indicate to the user which icon 1810 has been selected. In some implementations, the icons 1810 can be organized in the tool panel 1802 based on dashboard or widget type or class and filters can be applied based on one or more filter criteria. If multiple dashboard and/or widgets are dropped in the display area 1804, then in some implementations the dashboards and/or widgets can be dynamically tiled, tabbed or otherwise organized for maximum visibility depending on the display environment and user preferences.

Dashboard Data Structure

In some implementations, each dashboard in a multiple dashboard configuration is associated with metadata which can be used to manage the dashboard and associated widgets. The data structure can be initialized when a dashboard is first installed. After installation, a dashboard data structure can be periodically updated as it is reconfigured (e.g., widgets are added or deleted).

Table II below is exemplary data structure for multiple dashboards.

TABLE I

Exemplary Dashboard Data Structure

| Dashboard Name | Identifier (static, dynamic) | Parent Dashboard | Int. Links (widgets or dbs) | Ext. Links (e.g., URLs) | Rules (e.g., security) |
|---|---|---|---|---|---|
| A | 32831223 | | | Apple.com | |
| B | 43443343 | A | | | |
| B-1 | 34343444 | E | A, B | | read only |
| ... | ... | ... | ... | ... | ... |

Referring to Table I, an exemplary data structure for a multiple dashboard environment is described. In this example there are three dashboards A, B and B-1. Dashboard B-1 is nested with dashboard B. Each dashboard is associated with a unique static identifier (ID) and/or dynamic identifier (e.g., hashes). The static identifier can be used to identify the original instance of a dashboard. Dynamic identifiers can be used to identify subsequent instances of a dashboard. If the dashboard is nested in a parent dashboard, then the name or identifier for the parent dashboard is stored in the data structure. Each dashboard and/or its associated widgets can be internally linked to other widgets or dashboards. These link relationships are stored in the data structure. Each dashboard and/or its associated widgets can be externally linked to sources outside the dashboard display environment, such as web site or other network resource. A URL or other resource locator mechanism can be stored in the data structure. Any rules applying to a dashboard or an associated widget can be stored in the data structure, including but not limited to security rules relating to authentication, access, etc.). Various other metadata can be stored in the dashboard data structure, including but not limited to: metadata associated with the display of a dashboard or an associated widget (e.g., size, position, font, style, etc.). The dashboard data structures can be stored locally in any suitable computer-readable medium, such as memory, a hard disk and the like.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and graphics environments may be used, and that the present invention can be implemented using graphics tools and products other than those described above. In particular, the client/server approach is merely one example of an architecture for providing the dashboard functionality of the present invention; one skilled in the art will recognize that other, non-client/server approaches can also be used.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method, comprising:
providing a first dashboard layer including one or more first widgets;
providing a second dashboard layer including one or more second widgets, the second dashboard layer being distinct from the first dashboard layer, the first and second dashboard layers each being selectably displayed as an overlay to a desktop user interface; and
providing a transition for use when transitioning between the first dashboard layer and the second dashboard layer, wherein the desktop user interface is inactivated such that visible elements on the desktop user interface cannot be interacted with while the first or second dashboard layer is displayed, and wherein a visual effect indicates that the desktop user interface is inactivated.

2. A system comprising:
one or more processors configured to perform operations for generating a user interface, the user interface comprising:
a first display area associated with a first dashboard environment and configured for displaying at least one widget from a first set of widgets; and
a second display area associated with a second dashboard environment and configured for displaying at least one widget from a second set of widgets where the first display area and the second display area are distinct layers selectably and independently displayed over a desktop user interface, where display of either the first display area or the second display area includes presenting a visual effect to indicate that visible portions of the desktop user interface are inactive.

3. The system of claim 2, wherein at least one widget is in the first and second sets of widgets.

4. The system of claim 2, further comprising:
a transition engine configured for transitioning from the first display area to the second display area.

5. The system of claim 4, wherein the transition occurs without closing or hiding the first display area.

6. A method comprising:
identifying a widget for installation in a dashboard environment;
selecting the dashboard environment from a number of dashboard environments, each dashboard environment having a layer relative to a desktop and each configured to be separately or concurrently displayed over the desktop in response to a selection and where the desktop is inactivated such that visible elements on the desktop cannot be interacted with when the selected dashboard environment is displayed; and
installing the widget in the selected dashboard environment.

7. The method of claim 6, wherein selecting a dashboard environment includes:
evaluating the widget to determine a theme associated with the widget;
selecting a dashboard environment based on the theme; and
installing the widget in the selected dashboard environment.

8. The method of claim 6, wherein the selecting includes receiving a user selection of the dashboard environment for installing the widget.

9. The method of claim 6, wherein the selecting includes inferring the dashboard environment to install the widget on.

10. A system, comprising:
a processor operable to interact with a user interface to provide:
a first dashboard environment configured to be invoked from the user interface; and
a second dashboard environment configured to be invoked from the first dashboard environment,
where each dashboard environment includes a layer relative to a desktop and being separately displayable over the desktop and where the desktop is inactivated such that visible elements on the desktop cannot be interacted with when the selected dashboard environment is displayed and wherein a visual effect indicates that the desktop is inactivated.

11. The system of claim 10, wherein the second dashboard environment is configured to be invoked from a display area associated with the first dashboard environment.

12. A method comprising:
defining a first dashboard environment configured to be invoked from a desktop user interface; and
defining a second dashboard environment configured to be invoked from the first dashboard environment,
where each dashboard environment includes a layer relative to a desktop and being separately displayable over the desktop user interface, where display of either the first dashboard environment or the second dashboard environment includes presenting a visual effect to indicate that visible portions of the desktop user interface are inactive.

13. The method of claim 12, further comprising managing a transition between a first display area associated with the first dashboard environment and a second display area associated with the second dashboard environment, including selecting a transition between the two.

14. A computer program tangibly embodied on a volatile or non-volatile medium including instructions, which, when executed by a processor, causes the processor to perform the operations of:
identifying a widget for installation in a dashboard environment;
selecting the dashboard environment from at least two dashboard environments, each dashboard environment having a layer relative to a desktop and each configured to be separately or concurrently displayed over the desktop in response to a selection and where the desktop is inactivated such that visible elements on the desktop cannot be interacted with when the selected dashboard is displayed; and
installing the widget in the selected dashboard environment.

15. The computer program of claim 14, wherein selecting a dashboard environment includes:
evaluating the widget to determine a theme associated with the widget;
selecting a dashboard environment based on the theme; and
installing the widget in the selected dashboard environment.

16. The computer program of claim 14, wherein determining includes receiving a user selection of the dashboard environment for installing the widget.

17. The computer program of claim 14, wherein determining includes inferring the dashboard environment to install the widget on.

18. A system for displaying widgets in multiple dashboard environments, comprising:
- a processor;
- a computer-readable medium coupled to the processor and having instructions contained thereon, which, when executed by the processor, causes the processor to perform the operations of:
    - identifying a widget for installation in a dashboard environment;
    - selecting the dashboard environment from at least two dashboard environments, each dashboard environment having a layer relative to a desktop and each configured to be separately or concurrently displayed being separately displayed over the desktop in response to a selection and where the desktop is inactivated such that visible elements on the desktop cannot be interacted with when the selected dashboard environment is displayed; and
    - installing the widget in the selected dashboard environment.

* * * * *

UNITED STATES PATENT AND TRADEMARK OFFICE
CERTIFICATE OF CORRECTION

PATENT NO. : 7,954,064 B2
APPLICATION NO. : 11/346603
DATED : May 31, 2011
INVENTOR(S) : Scott Forstall et al.

It is certified that error appears in the above-identified patent and that said Letters Patent is hereby corrected as shown below:

On Title page 4, item [56]; in column 1, under "Other Publications", line 15, delete "archivve.org" and insert -- archive.org --, therefor.

On Title page 4, item [56]; in column 1, under "Other Publications", line 17, delete "archivve.org" and insert -- archive.org --, therefor.

On Title page 4, item [56]; in column 2, under "Other Publications", line 26, delete "Writen" and insert -- Written --, therefor.

On Title page 5, item [56]; in column 1, under "Other Publications", line 21, delete "Comarison" and insert -- Comparison --, therefor.

On Title page 5, item [56]; in column 1, under "Other Publications", line 48, delete "Interent" and insert -- Internet --, therefor.

On Title page 5, item [56]; in column 2, under "Other Publications", line 6, delete "Mutli-Touch" and insert -- Multi-Touch --, therefor.

On Title page 5, item [56]; in column 2, under "Other Publications", line 13, delete "Intrenational" and insert -- International --, therefor.

On Title page 5, item [56]; in column 2, under "Other Publications", line 17, delete "Intrenational" and insert -- International --, therefor.

On Title page 5, item [56]; in column 2, under "Other Publications", line 50, delete "Partial Interntional" and insert -- Partial International --, therefor.

On Title page 5, item [56]; in column 2, under "Other Publications", line 50, delete "Rpeort" and insert -- Report --, therefor.

Signed and Sealed this
Tenth Day of January, 2012

David J. Kappos
*Director of the United States Patent and Trademark Office*

CERTIFICATE OF CORRECTION (continued)
U.S. Pat. No. 7,954,064 B2

On Title page 5, item [56]; in column 2, under "Other Publications", line 51, delete "Interntional" and insert -- International --, therefor.

On Title page 5, item [56]; in column 2, under "Other Publications", line 60, delete "Busieness" and insert -- Business --, therefor.

On Title page 5, item [56]; in column 2, under "Other Publications", line 65, delete "Archieved" and insert -- Archived --, therefor.

On Title page 6, item [56]; in column 2, under "Other Publications", line 5, delete "widipedia" and insert -- wikipedia --, therefor.

In column 4, line 11, after "bar" insert -- . --.

In column 14, line 7, delete "FIG. 41" and insert -- FIG. 4f --, therefor.

In column 18, line 1, delete "the a" and insert -- the --, therefor.

In column 36, line 5, in claim 18, before "over" delete "being separately displayed".